(12) United States Patent
Kimura et al.

(10) Patent No.: US 10,324,570 B2
(45) Date of Patent: Jun. 18, 2019

(54) INPUT DEVICE, INPUT/OUTPUT DEVICE, AND DATA PROCESSING DEVICE

(71) Applicant: Semiconductor Energy Laboratory Co., Ltd., Atsugi-shi, Kanagawa-ken (JP)

(72) Inventors: Hajime Kimura, Atsugi (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/404,402

(22) Filed: Jan. 12, 2017

(65) Prior Publication Data

US 2017/0205913 A1   Jul. 20, 2017

(30) Foreign Application Priority Data

Jan. 20, 2016   (JP) .................................. 2016-008612

(51) Int. Cl.
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G06F 2203/04103* (2013.01)

(58) Field of Classification Search
CPC ..... G06F 3/044; G06F 3/0416; G02F 1/13338
See application file for complete search history.

(56) References Cited

U.S. PATENT DOCUMENTS

| 7,859,521 | B2 | 12/2010 | Hotelling et al. |
| 7,995,041 | B2 | 8/2011 | Chang |
| 8,217,913 | B2 | 7/2012 | Hotelling et al. |
| 8,363,027 | B2 | 1/2013 | Hotelling et al. |
| 8,502,799 | B2 | 8/2013 | Hotelling et al. |
| 8,786,557 | B2 | 7/2014 | Nogushi et al. |

(Continued)

FOREIGN PATENT DOCUMENTS

| CN | 104820528 A | 8/2015 |
| CN | 105022523 A | 11/2015 |
| JP | 2003-099171 A | 4/2003 |
| JP | 2007-235222 A | 9/2007 |

(Continued)

OTHER PUBLICATIONS

International Search Report (Application No. PCT/IB2017/050099) dated Feb. 21, 2017.
Written Opinion (Application No. PCT/IB2017/050099) dated Feb. 21, 2017.

(Continued)

*Primary Examiner* — Liliana Cerullo
(74) *Attorney, Agent, or Firm* — Robinson Intellectual Property Law Office; Eric J. Robinson

(57) ABSTRACT

A novel input device that is highly convenient or reliable is provided. A novel input/output device that is highly convenient or reliable is provided. A semiconductor device is provided. The present inventors have reached an idea of a structure including a plurality of conductive films configured to be capacitively coupled to an approaching object, a driver circuit that selects a conductive film from a plurality of conductive films in a predetermined order, and a sensor circuit having a function of supplying a search signal and a sensing signal.

17 Claims, 44 Drawing Sheets

(56) References Cited

U.S. PATENT DOCUMENTS

| | | |
|---|---|---|
| 9,024,913 B1 | 5/2015 | Jung et al. |
| 9,134,560 B2 | 9/2015 | Hotelling et al. |
| 9,335,875 B2 | 5/2016 | Nogushi et al. |
| 9,542,047 B2 | 1/2017 | Noguchi et al. |
| 2008/0225015 A1* | 9/2008 | Hashida ............... G06F 3/0418 345/173 |
| 2008/0238880 A1 | 10/2008 | Miwa |
| 2011/0187677 A1* | 8/2011 | Hotelling ............. G06F 3/0412 345/174 |
| 2012/0218199 A1 | 8/2012 | Kim et al. |
| 2014/0176488 A1 | 6/2014 | Jo |
| 2015/0220204 A1 | 8/2015 | Noguchi et al. |
| 2015/0220208 A1* | 8/2015 | Noguchi ............... G06F 3/0412 345/174 |
| 2016/0282990 A1 | 9/2016 | Kimura et al. |
| 2016/0299601 A1 | 10/2016 | Yamazaki et al. |

FOREIGN PATENT DOCUMENTS

| | | |
|---|---|---|
| JP | 2008-097202 A | 4/2008 |
| JP | 2008-250804 A | 10/2008 |
| JP | 2009-244958 A | 10/2009 |
| JP | 2011-197685 A | 10/2011 |
| JP | 2015-143933 A | 8/2015 |
| JP | 2015-210811 A | 11/2015 |
| KR | 2015-0091241 A | 8/2015 |
| KR | 2015-0124507 A | 11/2015 |
| KR | 2015-0125104 A | 11/2015 |

OTHER PUBLICATIONS

Kim.C et al., "Advanced In-cell Touch Technology for Large Sized Liquid Crystal Displays", SID Digest '15 : SID International Symposium Digest of Technical Papers, Jun. 2, 2015, pp. 895-898.

* cited by examiner

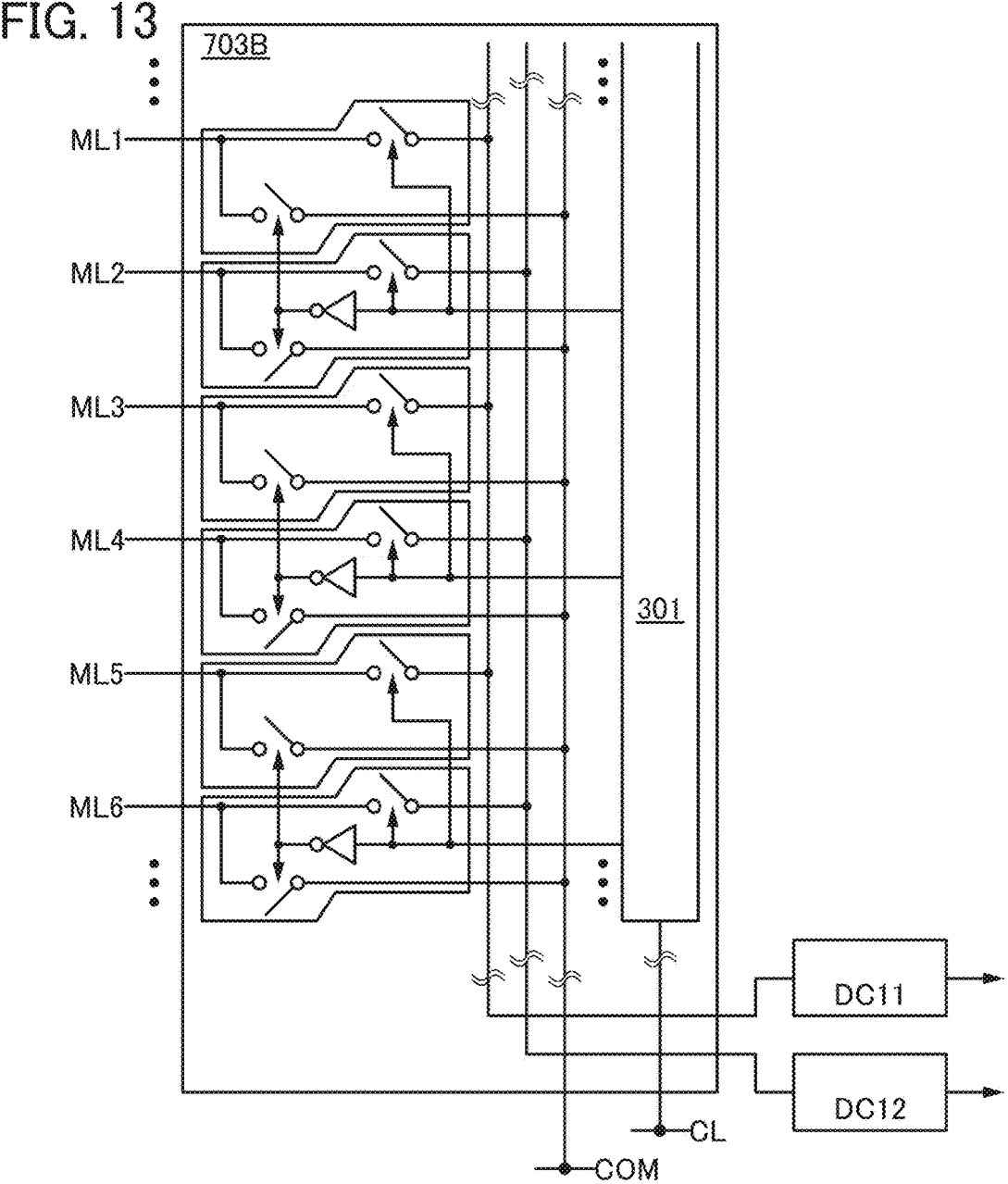

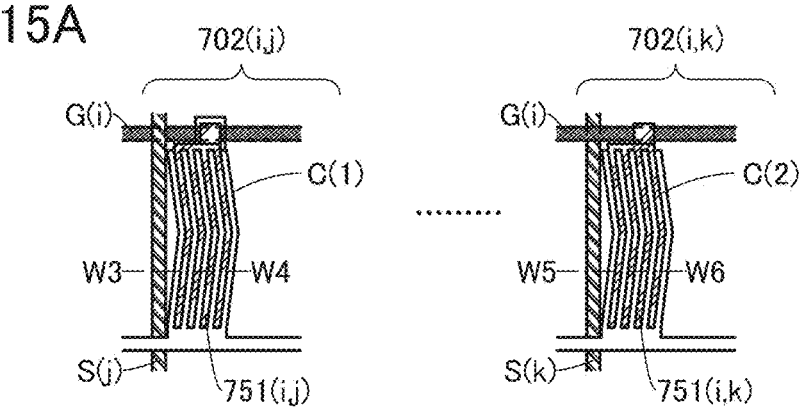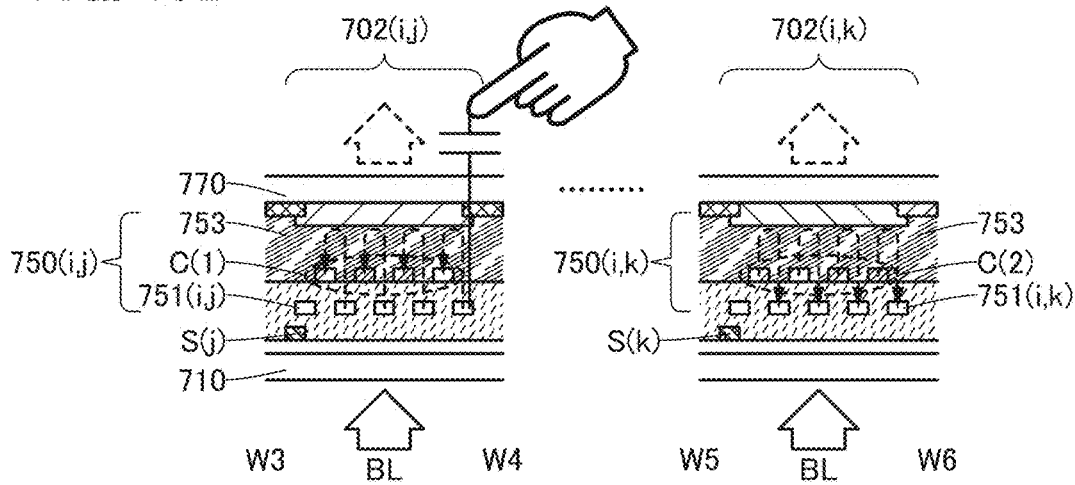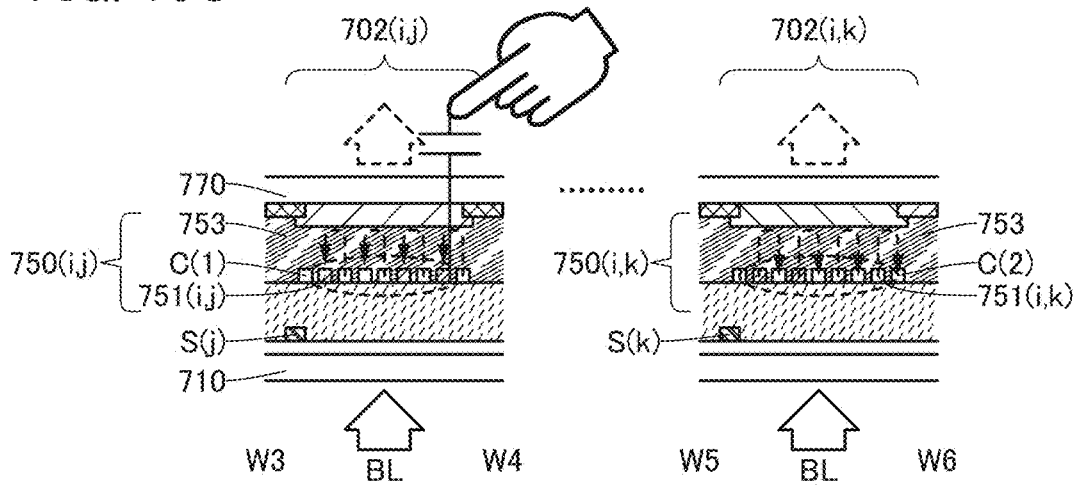

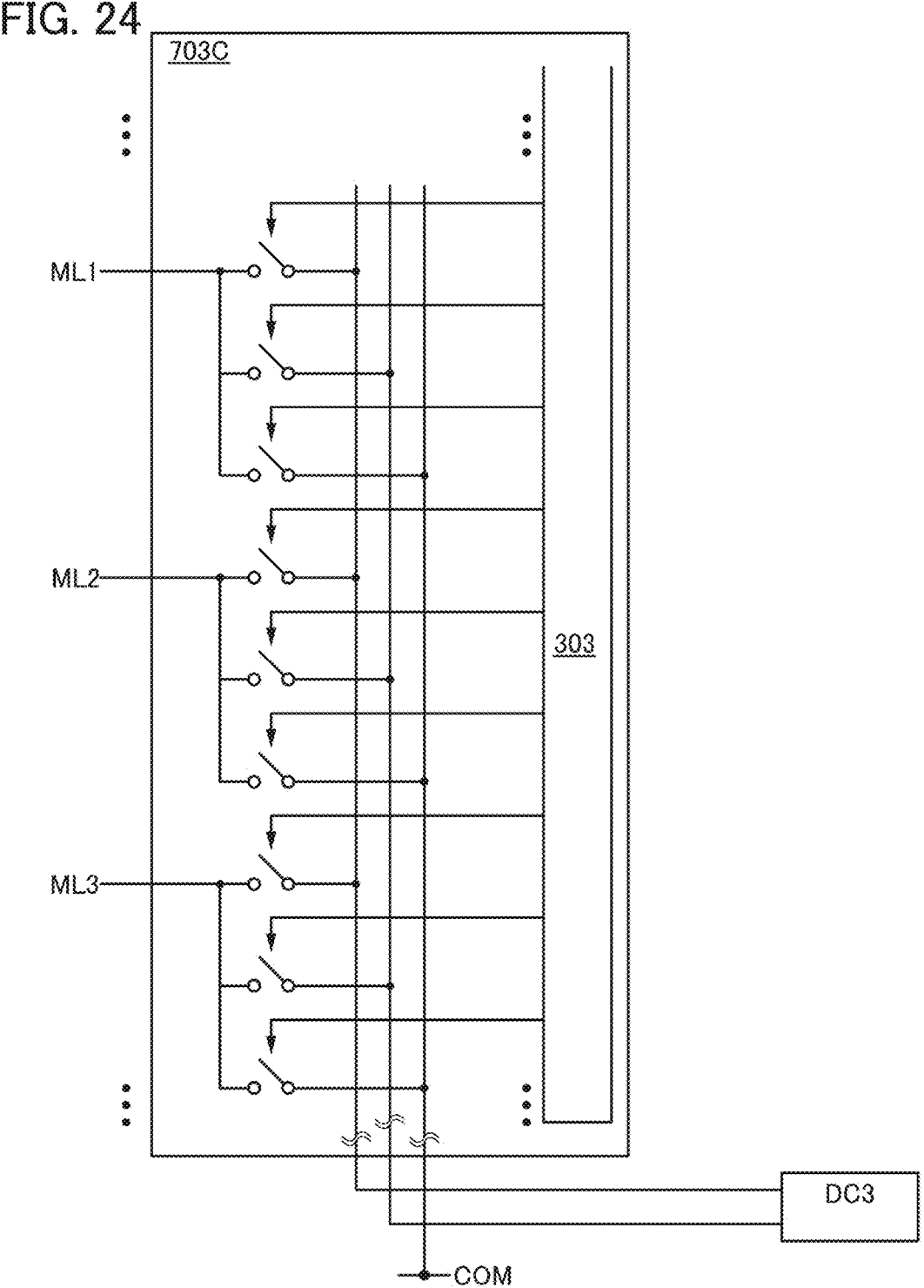

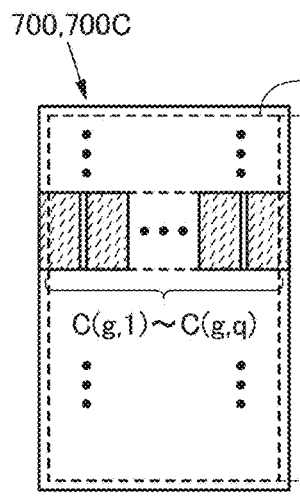
FIG. 26A1
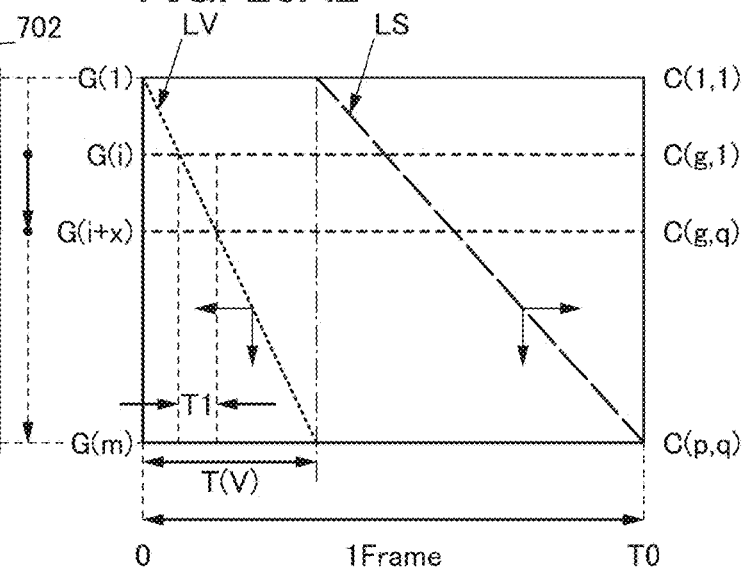
FIG. 26A2
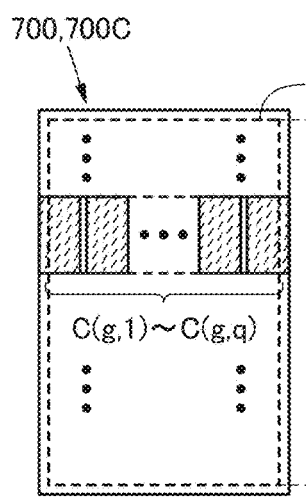
FIG. 26B1
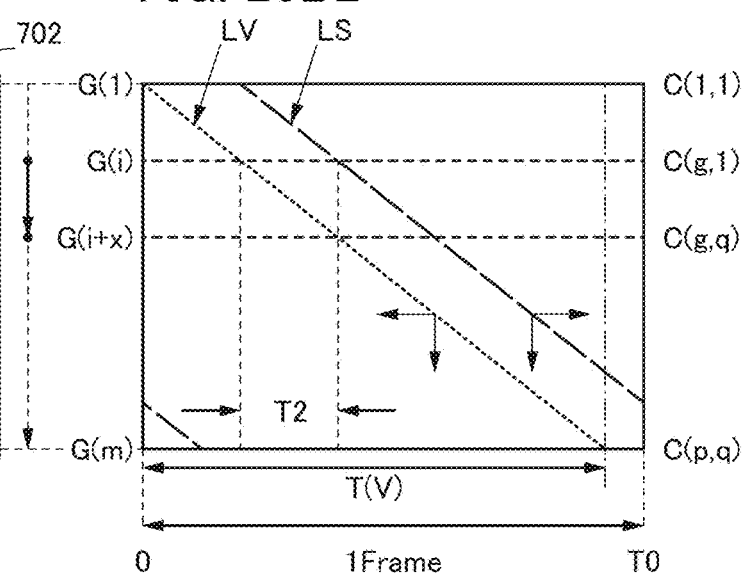
FIG. 26B2

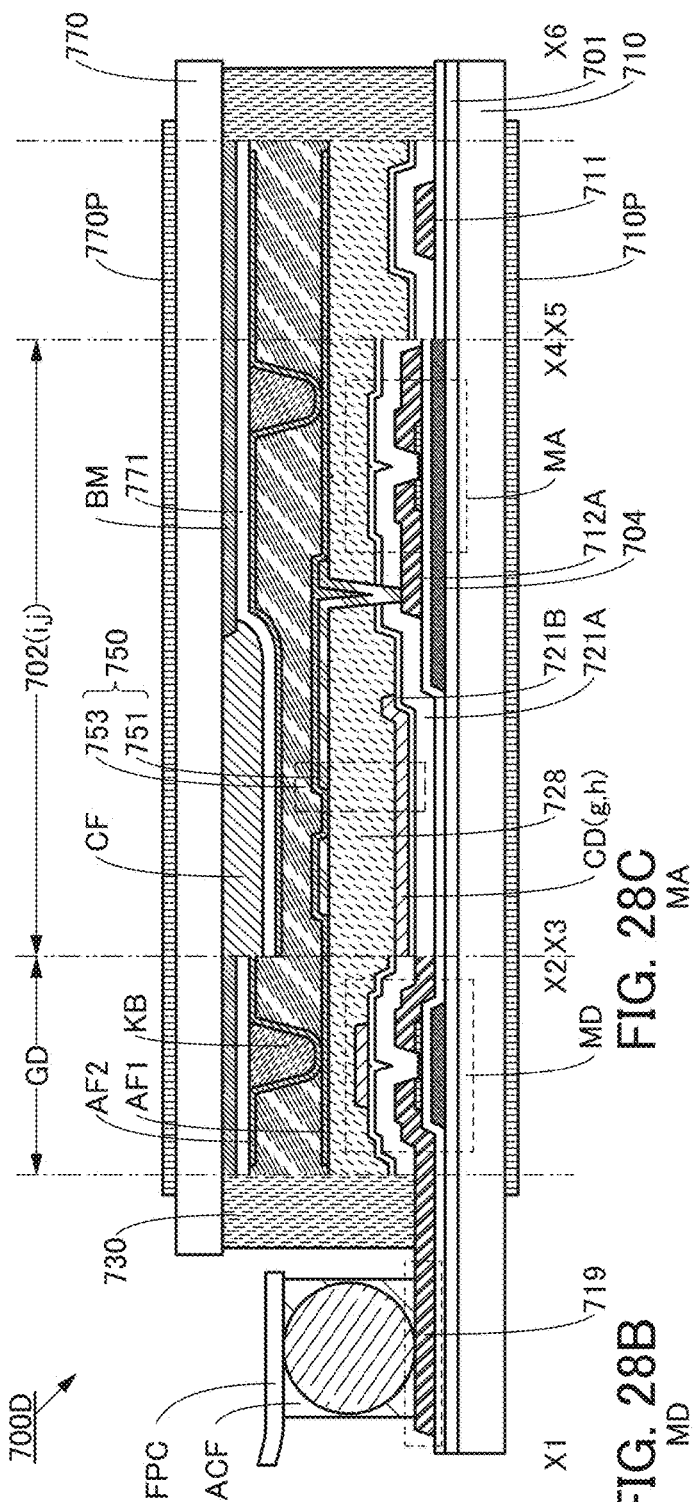

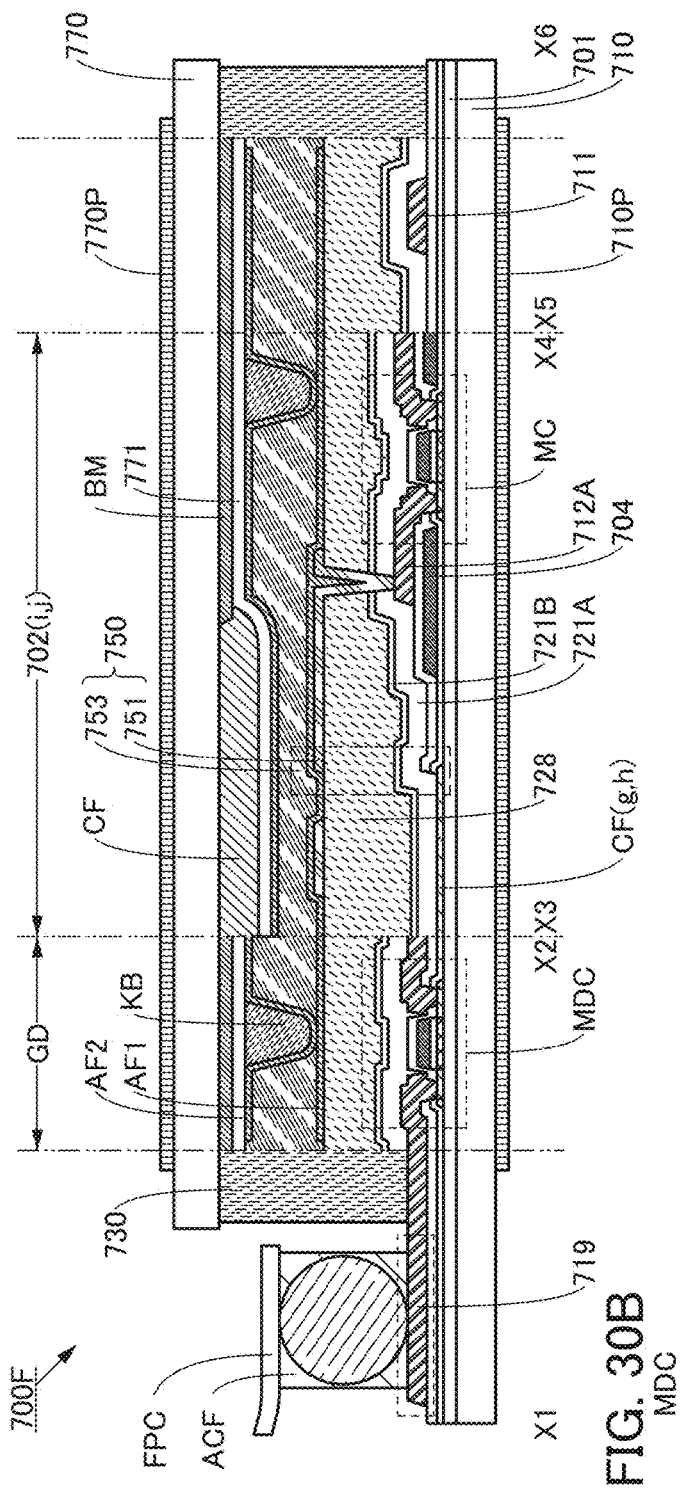
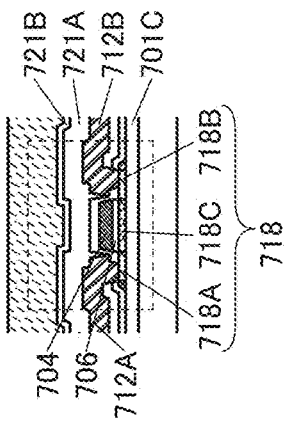
FIG. 30A
FIG. 30B

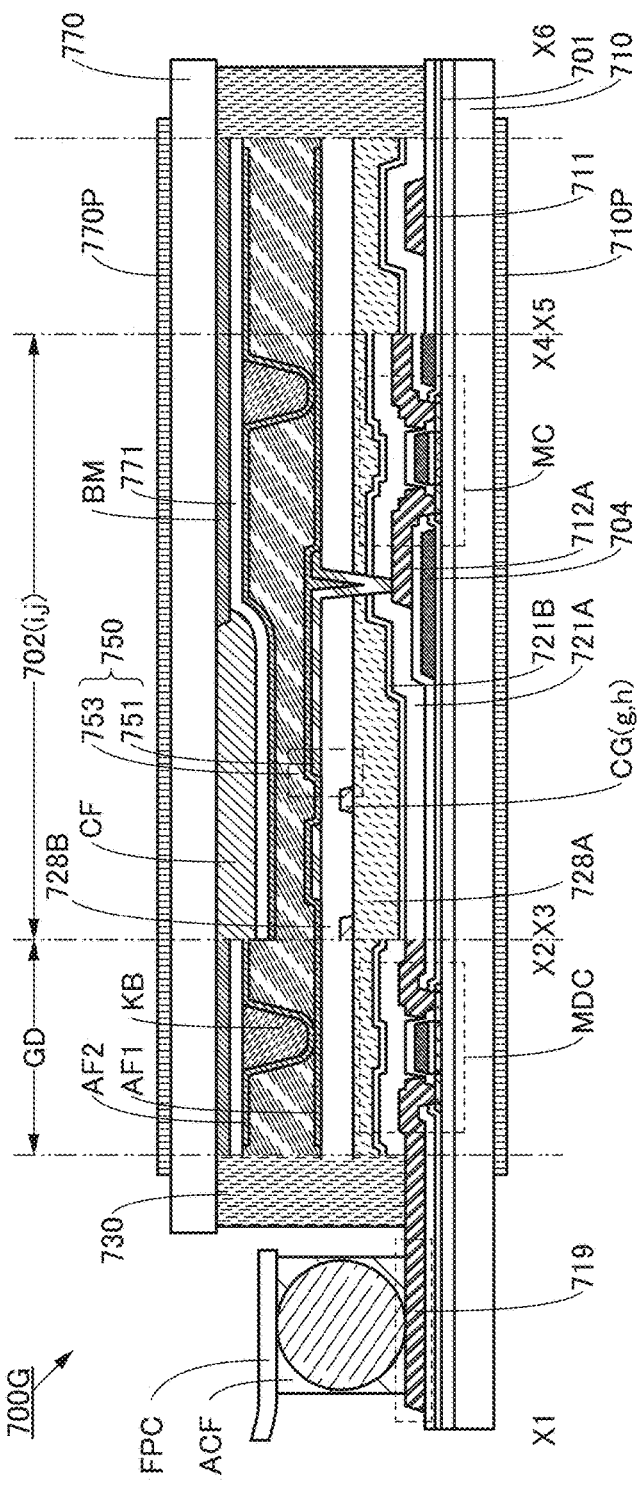
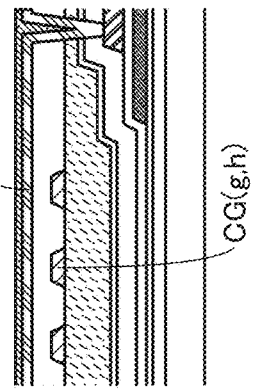
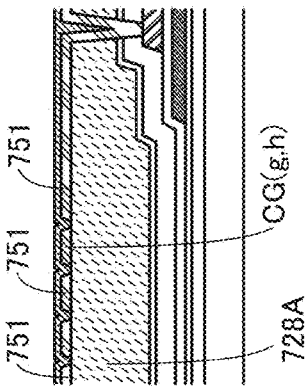
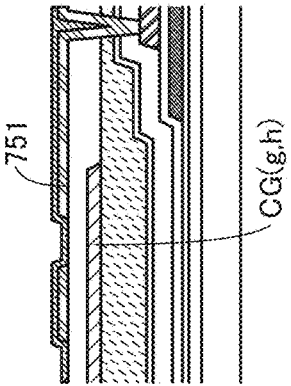
FIG. 31A
FIG. 31B
FIG. 31C
FIG. 31D

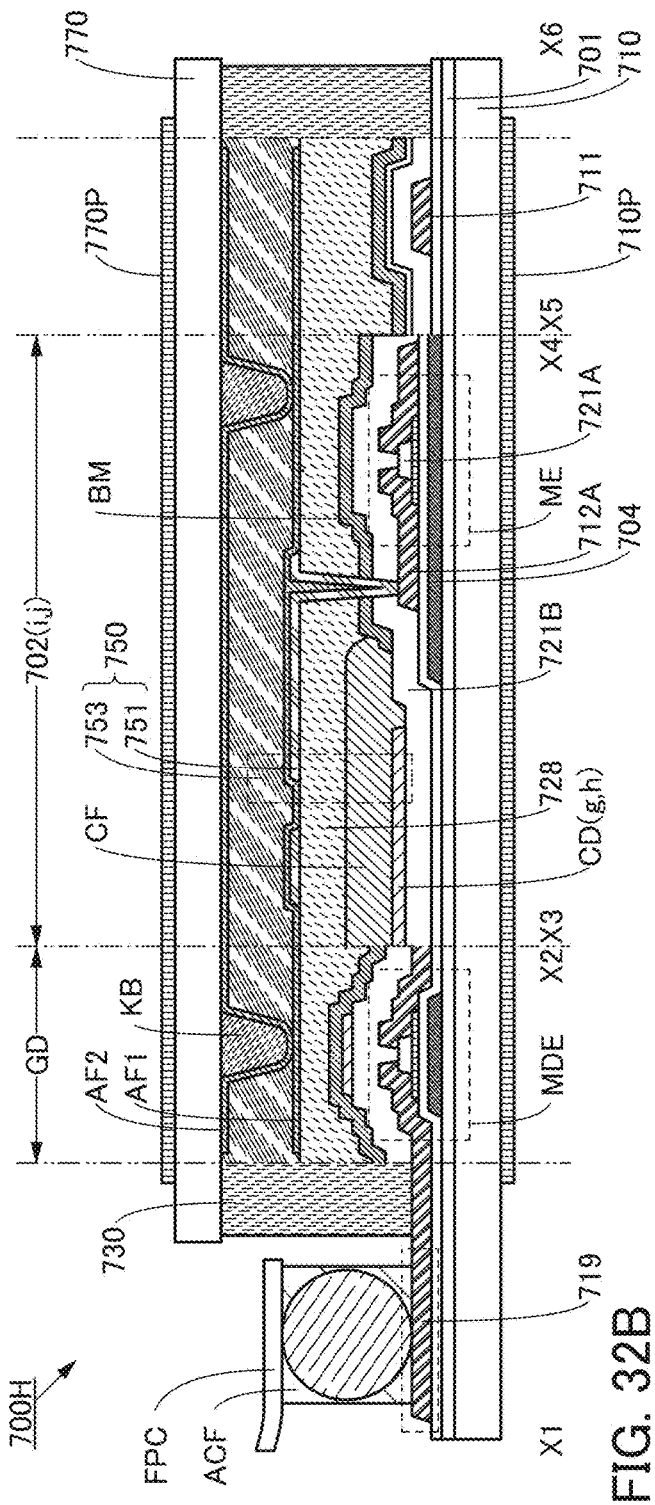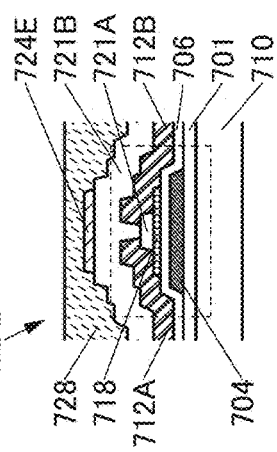
FIG. 32A
FIG. 32B

1400

INPUT DEVICE, INPUT/OUTPUT DEVICE, AND DATA PROCESSING DEVICE

TECHNICAL FIELD

One embodiment of the present invention relates to an input device, an input/output device, a touch sensor, a display device with an input function, an input device with a display function, a display device, or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

Touch sensing circuits in which circuit elements, such as touch signal lines (e.g., as drive lines and sense lines) and grounding regions, in display pixel stackups are grouped together, and which sense a touch on or near the display are known (Patent Document 1 and Patent Document 2).

A technique in which a common electrode that is for display and arranged for each liquid crystal display element is also used as one electrode (drive electrode) of a pair of touch sensor electrodes, and the other electrode (detection electrode for a sensor) is newly formed is known (Patent Document 3).

REFERENCE

Patent Document

[Patent Document 1] Japanese Published Patent Application No. 2011-197685
[Patent Document 2] United States Patent Application Publication No. 2012/0218199
[Patent Document 3] Japanese Published Patent Application No. 2009-244958

DISCLOSURE OF INVENTION

An object of one embodiment of the present invention is to provide a novel input device that is highly convenient or reliable. Another object is to provide a novel input/output device that is highly convenient or reliable. Another object is to provide a novel data processing device that is highly convenient or reliable. Another object is to provide a novel input device having a display function that is highly convenient or reliable. Another object is to provide a novel input device with high sensitivity. Another object is to provide an input device or the like that is highly reliable. Another object is to provide an input device or the like with less contact failure. Another object is to provide an input device or the like with a small circuit size. Another object is to provide an input device or the like capable of sensing multiple touches. Another object is to provide a novel input device, a novel input/output device, a novel display device, a novel display device having an input function, a novel input device having a display function, a novel data processing device, or a novel semiconductor device.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

(1) One embodiment of the present invention is an input device including a first conductive film, a second conductive film, a first signal line, and a second signal line.

The second conductive film has a region that does not overlap with the first conductive film.

The first signal line is electrically connected to the first conductive film, and the second signal line is electrically connected to the second conductive film.

The first conductive film is configured to be capacitively coupled to an approaching object, and the second conductive film is configured to be capacitively coupled to an approaching object.

(2) Another embodiment of the present invention is the input device described in (1) which includes a driver circuit and a sensor circuit.

The sensor circuit is electrically connected to the driver circuit.

The driver circuit is configured to select the first signal line or the second signal line.

The driver circuit is configured to electrically connect the first signal line to the sensor circuit in a period during which the first signal line is selected. The driver circuit is configured to electrically connect the second signal line to the sensor circuit in a period during which the second signal line is selected.

The sensor circuit is configured to supply a search signal.

The first signal line is configured to receive the search signal.

The first signal line is configured to supply a potential or a current that is changed in accordance with a capacitance coupled to the first conductive film and the search signal.

The sensor circuit is configured to supply a sensing signal based on the potential or the current.

The above-mentioned input device of one embodiment of the present invention includes a plurality of conductive films configured to be capacitively coupled to an approaching object, a driver circuit that selects one from the plurality of conductive films in a predetermined order, and a sensor circuit configured to supply a search signal and a sensing signal. Thus, the object approaching the conductive film can be sensed on the basis of a potential that is changed in accordance with the search signal and the capacitance coupled to the conductive film. Consequently, a novel input device that is highly convenient or reliable can be provided.

(3) Another embodiment of the present invention is an input/output device including a display device and the above-described input device.

The input device is configured to sense an object approaching a display surface side of the display device.

The display device includes a first pixel that has a region overlapping with the first conductive film.

The display device includes a second pixel that has a region overlapping with the second conductive film.

The first pixel includes a first display element. The second pixel includes a second display element.

The input/output device described in (3) includes a display device, a plurality of conductive films configured to be capacitively coupled to an object approaching a display surface side of the display device, a driver circuit that selects one from the plurality of conductive films in a predetermined order, and a sensor circuit configured to supply a search signal and a sensing signal. Thus, the object approaching the display surface side of the display device can be sensed on the basis of a potential that is changed in accordance with the search signal and the capacitance coupled to the conductive film. Consequently, a novel input/output device that is highly convenient or reliable can be provided.

(4) Another embodiment of the present invention is the input/output device described in (3) further including a wiring.

The wiring is configured to supply a predetermined potential. The driver circuit is configured to electrically connect the second signal line to the wiring in the period during which the first signal line is selected. The driver circuit is configured to electrically connect the first signal line to the wiring in the period during which the second signal line is selected.

The first display element includes a first pixel electrode and a layer containing a liquid crystal material. The first pixel electrode is disposed such that an electric field that controls orientation of the liquid crystal material is formed between the first conductive film and the first pixel electrode.

The second display element includes a second pixel electrode and the layer containing a liquid crystal material. The second pixel electrode is disposed such that an electric field that controls orientation of the liquid crystal material is formed between the second conductive film and the second pixel electrode.

The above-mentioned input/output device of one embodiment of the present invention includes a display device including a liquid crystal element, a plurality of conductive films configured to control the orientation of the liquid crystal material and be capacitively coupled to an object approaching a display surface side of the display device, a sensor circuit configured to supply a search signal and a sensing signal, and a driver circuit configured to select one from the plurality of conductive films in a predetermined order and be electrically connected to the sensor circuit or a wiring. Thus, pixels can be rewritten in a predetermined order, and the object approaching the display surface side of the display device including a liquid crystal element can be sensed on the basis of a potential that is changed in accordance with the search signal and the capacitance coupled to the conductive film. Consequently, a novel input/output device that is highly convenient or reliable can be provided.

(5) Another embodiment of the present invention is the input device described in (1) further including a driver circuit and a sensor circuit.

The sensor circuit is electrically connected to the driver circuit.

The second conductive film is disposed such that an electric field that is shielded by an approaching object is formed between the first conductive film and the second conductive film.

The driver circuit is configured to select the first signal line and the second signal line.

The driver circuit is configured to electrically connect the first signal line and the second signal line to the sensor circuit in a period during which the first signal line and the second signal line are selected.

The sensor circuit is configured to supply a search signal.

The first signal line is configured to receive the search signal.

The second signal line is configured to supply a potential that is changed in accordance with the search signal and the electric field formed between the first conductive film and the second conductive film.

The sensor circuit is configured to supply a sensing signal based on the potential.

The above-mentioned input device of one embodiment of the present invention includes one conductive film and another conductive film between which an electric field is formed, a driver circuit that selects these conductive films in a predetermined order, and a sensor circuit configured to supply a search signal to the one conductive film and supply a sensing signal based on a change in potential of the other conductive film. Thus, the object approaching the conductive film can be sensed on the basis of a potential that is changed in accordance with an electric field that is blocked between the plurality of conductive films and the search signal. Consequently, a novel input device that is highly convenient or reliable can be provided.

(6) Another embodiment of the present invention is an input/output device including a display device and the above-described input device.

The input device is configured to sense an object approaching a display surface side of the display device.

The display device includes a first pixel that has a region overlapping with the first conductive film.

The display device includes a second pixel that has a region overlapping with the second conductive film.

The first pixel includes a first display element. The second pixel includes a second display element.

The above-mentioned input/output device of one embodiment of the present invention includes a display device, one conductive film configured to be capacitively coupled to an object approaching a display surface side of the display device, another conductive film that form an electric field with the one conductive film, a driver circuit that selects these conductive films in a predetermined order, and a sensor circuit configured to supply a search signal to the one conductive film and supply a sensing signal based on a change in potential of the other conductive film. Thus, the object approaching the display surface side of the display device can be sensed on the basis of a potential that is changed in accordance with an electric field that is blocked between the plurality of conductive films and the search signal. Consequently, a novel input/output device that is highly convenient or reliable can be provided.

(7) Another embodiment of the present invention is the input/output device described in (6) further including a wiring.

The wiring is configured to supply a predetermined potential.

In the period during which the first signal line and the second signal line are selected, the driver circuit is configured to electrically connect another signal line to the wiring. The driver circuit is configured to electrically connect the first signal line and the second signal line to the wiring in a period during which another signal line is selected.

The first display element includes a first pixel electrode and a layer containing a liquid crystal material. The first pixel electrode is disposed such that an electric field that controls orientation of the liquid crystal material is formed between the first conductive film and the first pixel electrode.

The second display element includes a second pixel electrode and the layer containing a liquid crystal material. The second pixel electrode is disposed such that an electric field that controls orientation of the liquid crystal material is formed between the second conductive film and the second pixel electrode.

The above-mentioned input/output device of one embodiment of the present invention includes a display device including a liquid crystal element, one conductive film configured to control the orientation of the liquid crystal material and be capacitively coupled to an object approaching a display surface side of the display device, another conductive film that forms an electric field with the one conductive film, a sensor circuit configured to supply a search signal to the one conductive film and supply a sensing signal based on a change in potential of the other conductive film, and a driver circuit configured to select the one conductive film and the other conductive film in a predetermined order and be electrically connected to the sensor circuit or a wiring. Thus, pixels can be rewritten in a predetermined order, and the object approaching the display surface side of the display device including a liquid crystal element can be sensed on the basis of a potential that is changed in accordance with the search signal and the capacitance coupled to the conductive film. Consequently, a novel input/output device that is highly convenient or reliable can be provided.

(8) Another embodiment of the present invention is a data processing device including an arithmetic device and the above-mentioned input/output device described in any of (3), (4), (6), and (7).

The arithmetic device is configured to receive positional data and supply image data and control data. The arithmetic device is configured to determine the moving speed of a pointer in accordance with the positional data. The arithmetic device is configured to determine the contrast or brightness of image data in accordance with the moving speed of the pointer.

With this structure, eyestrain on a user caused when the display position of image data is moved can be reduced, that is, eye-friendly display can be achieved. As a result, a novel data processing device that is highly convenient or reliable can be provided.

(9) Another embodiment of the present invention is the data processing device described in (8) further including an input portion. The input portion includes at least one of a keyboard, a hardware button, a pointing device, a touch sensor, an illuminance sensor, an imaging device, an audio input device, a viewpoint input device, and a posture detection device.

Thus, the positional data of the object approaching the conductive film can be supplied on the basis of a potential that is changed in accordance with the search signal and the capacitance coupled to the conductive film. Consequently, a novel data processing device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called source, and a terminal to which a higher potential is applied is called drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, the term "source" of a transistor means a source region that is part of a semiconductor film functioning as an active layer or a source electrode connected to the semiconductor film. Similarly, the term "drain" of a transistor means a drain region that is part of the semiconductor film or a drain electrode connected to the semiconductor film. The term "gate" means a gate electrode.

In this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, voltage, or a potential or can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel input device that is highly convenient or reliable can be provided. According to another embodiment of the present invention, a novel input/output device that is highly convenient or reliable can be provided. According to another embodiment of the present invention, a novel data processing device that is highly convenient or reliable can be provided. According to another embodiment of the present invention, a novel input device having a display function that is highly convenient or reliable can be provided. According to another embodiment of the present invention, a novel input device with high sensitivity or the like can be provided. According to another embodiment of the present invention, an input device or the like that is highly reliable. According to another embodiment of the present invention, an input device with less contact failure can be provided. According to another embodiment of the present invention, an input device or the like with a small circuit size can be provided. According to another embodiment of the present invention, an input device or the like capable of sensing multiple touches can be provided. According to another embodiment of the present invention, a novel input device, a novel input/output device, a novel display device, a novel display device having an input function, an novel input device having a display function, a novel data processing device, or a novel semiconductor device can be provided.

Note that the descriptions of these effects do not preclude the existence of other effects. One embodiment of the present invention does not necessarily achieve all the effects listed above. Other effects will be apparent from and can be derived from the descriptions of the specification, the drawings, the claims, and the like.

BRIEF DESCRIPTION OF DRAWINGS

FIG. 13 illustrates a structure of an input/output device of an embodiment.
FIGS. 15A to 15C illustrate structures of an input device of an embodiment.
FIG. 24 illustrates a structure of an input device of an embodiment.
FIGS. 26A1, 26A2, 26B1, and 26B2 illustrate methods of driving an input/output device of an embodiment.
FIGS. 28A to 28C illustrate a structure of an input/output device of an embodiment.
FIGS. 30A and 30B illustrate a structure of an input/output device of an embodiment.
FIGS. 31A to 31D illustrate structures of an input/output device of an embodiment.
FIGS. 32A and 32B illustrate a structure of an input/output device of an embodiment.

BEST MODE FOR CARRYING OUT THE INVENTION

Figure 1A:
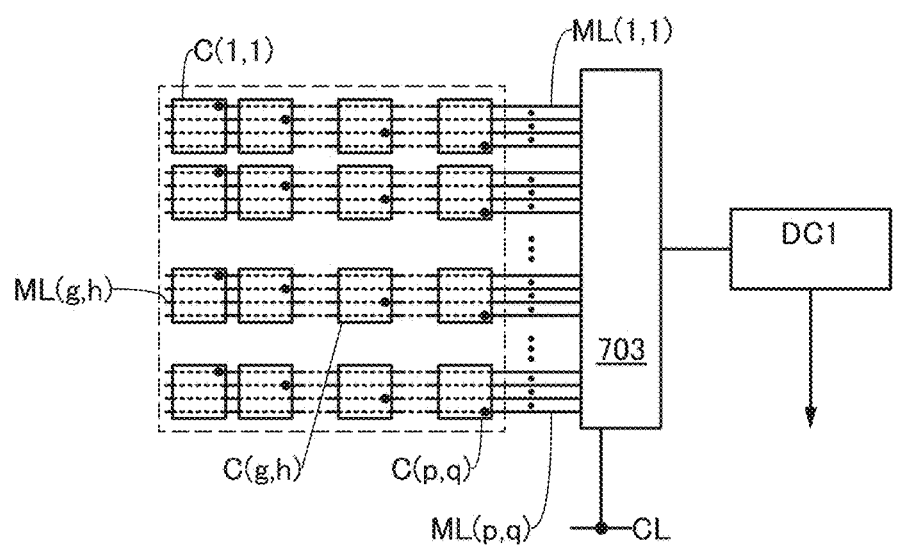
FIGS. 1A to 1C illustrate a structure of an input device of an embodiment.

An input device of one embodiment of the present invention includes a plurality of conductive films configured to be capacitively coupled to an approaching object, a driver circuit that selects one from the plurality of conductive films in a predetermined order, and a sensor circuit configured to supply a search signal and a sensing signal.

Thus, the object approaching the conductive film can be sensed on the basis of a potential that is changed in accordance with the search signal and the capacitance coupled to the conductive film. Consequently, a novel input device that is highly convenient or reliable can be provided.

Hereinafter, embodiments will be described with reference to drawings. Note that the embodiments can be implemented with various modes. It will be readily appreciated by those skilled in the art that modes and details can be changed in various ways without departing from the spirit and scope of the present invention. Therefore, the present invention should not be construed as being limited to the following description of the embodiments. Note that in structures of the invention described below, the same portions or portions having similar functions are denoted by the same reference numerals, and descriptions thereof are not repeated. Furthermore, the same hatching pattern is applied to portions having similar functions, and the portions are not especially denoted by reference numerals in some cases.

Note that a content (or part thereof) described in one embodiment can be applied to, combined with, or replaced with another content (or part thereof) described in the same embodiment and/or a content (or part thereof) described in another embodiment or other embodiments.

Note that in each embodiment, a content described in the embodiment is a content described with reference to a variety of diagrams or a content described with a text in this specification.

By combining a diagram (or part thereof) described in one embodiment with another part of the diagram, a different diagram (or part thereof) described in the embodiment, and/or a diagram (or part thereof) described in another embodiment or other embodiments, much more diagrams can be formed.

Embodiment 1

In this embodiment, structures of an input device of one embodiment of the present invention are described with reference to FIGS. 1A to 1C to FIG. 10.

Figure 1B:
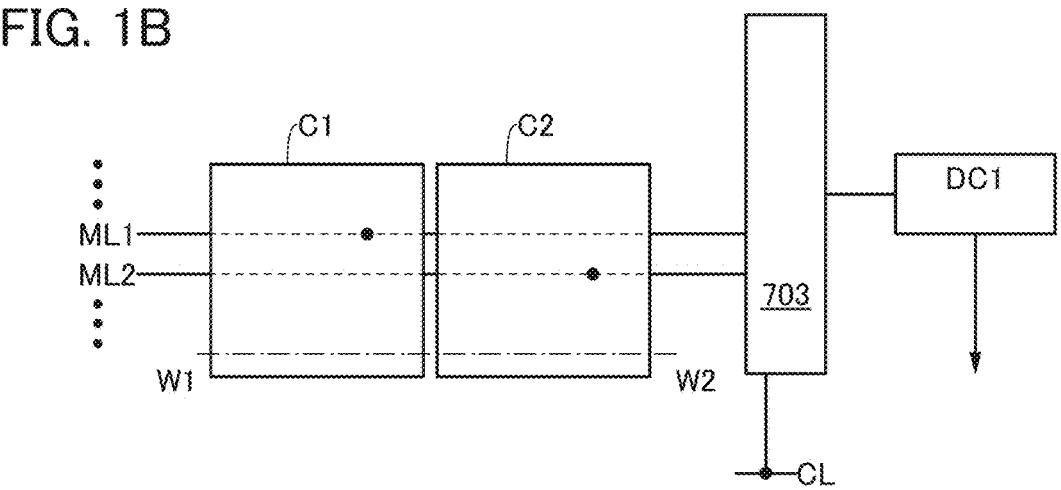
Figure 1C:
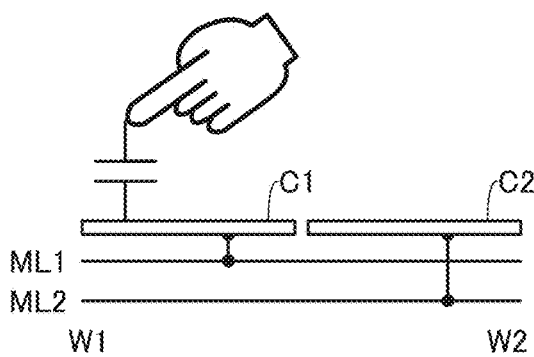

FIGS. 1A to 1C illustrate a structure of an input device 700T of one embodiment of the present invention. FIG. 1A is an example of a block diagram illustrating the structure of the input device 700T of one embodiment of the present invention. FIG. 1B is an example of a block diagram illustrating part of the input device 700T in FIG. 1A in detail. FIG. 1C is an example of a schematic cross section of the input device 700T taken along the cutting plane line W1-W2 in FIG. 1B.

Figure 2A:
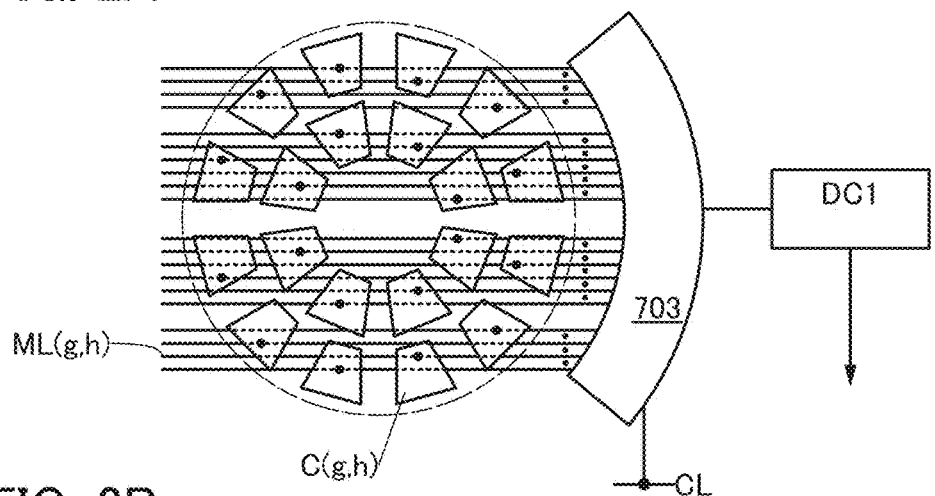
FIGS. 2A to 2C illustrate arrangement of conductive films in an input device of an embodiment.
Figure 2B:
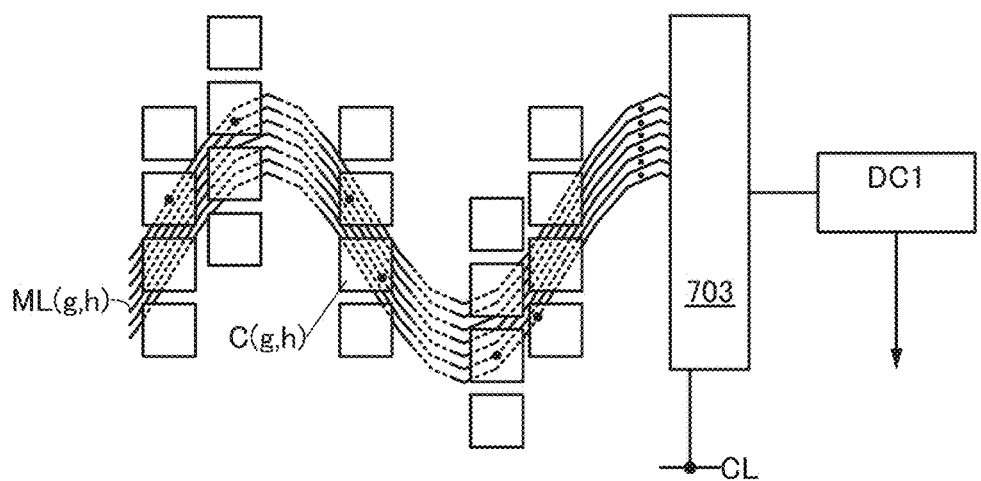
Figure 2C:
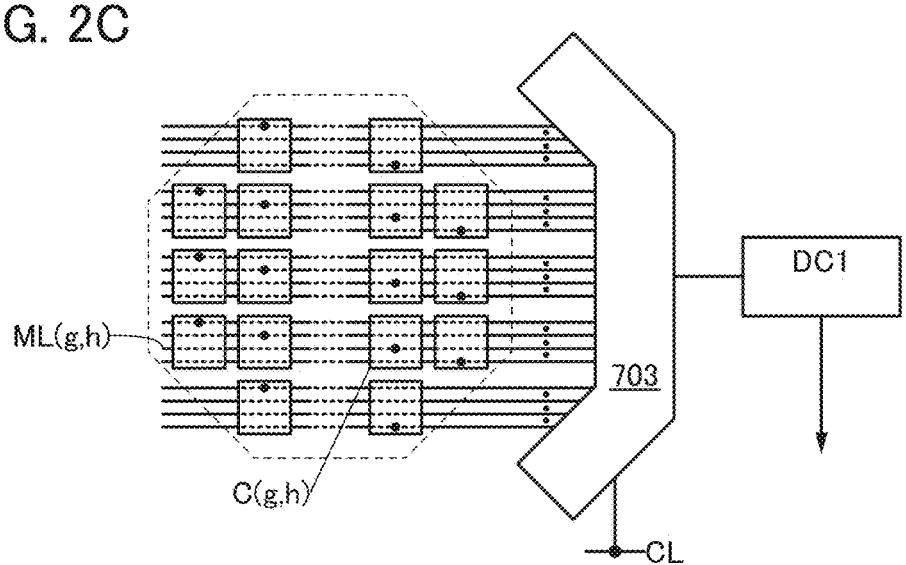

FIGS. 2A to 2C are schematic diagrams illustrating a layout of conductive films in the input device of one embodiment of the present invention. FIG. 2A illustrates the conductive films arranged in a circle. FIG. 2B illustrates the conductive films arranged in a curved line. FIG. 2C illustrates the conductive films arranged in a polygon.

Figure 3A:
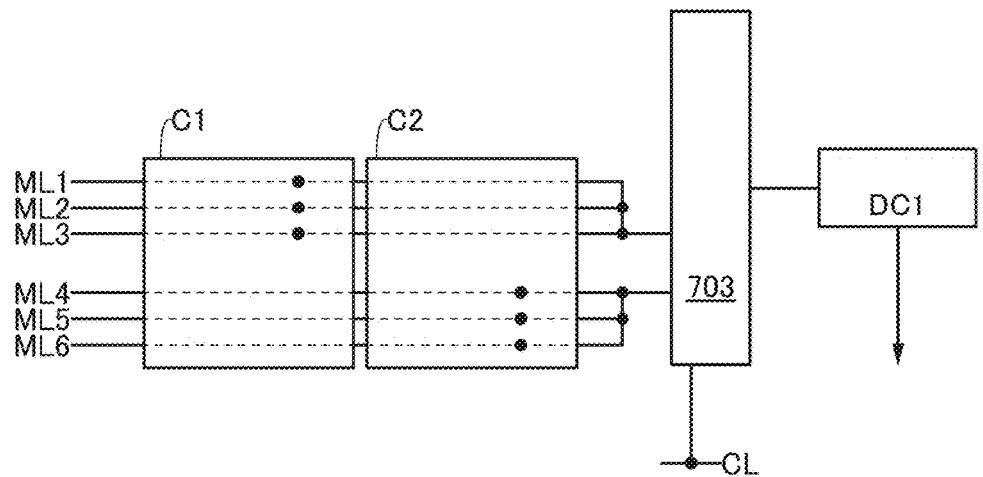
FIGS. 3A and 3B illustrate a structure of an input device of an embodiment.
Figure 3B:
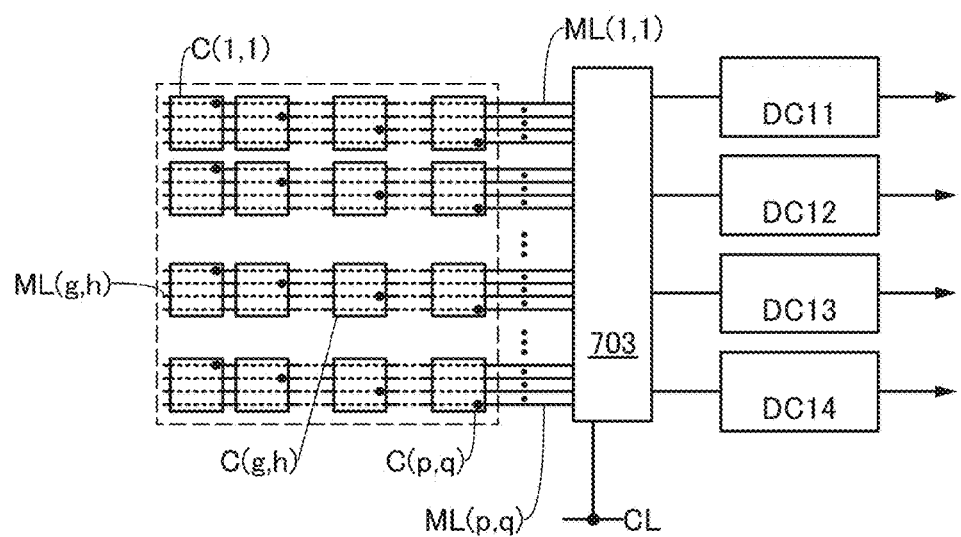

FIGS. 3A and 3B are schematic diagrams each illustrating the input device of one embodiment of the present invention. FIG. 3A schematically illustrates a structure of the input device including conductive films to which a plurality of signal lines is connected. FIG. 3B schematically illustrates a structure of an input device including a plurality of sensor circuits.

Figure 4A:
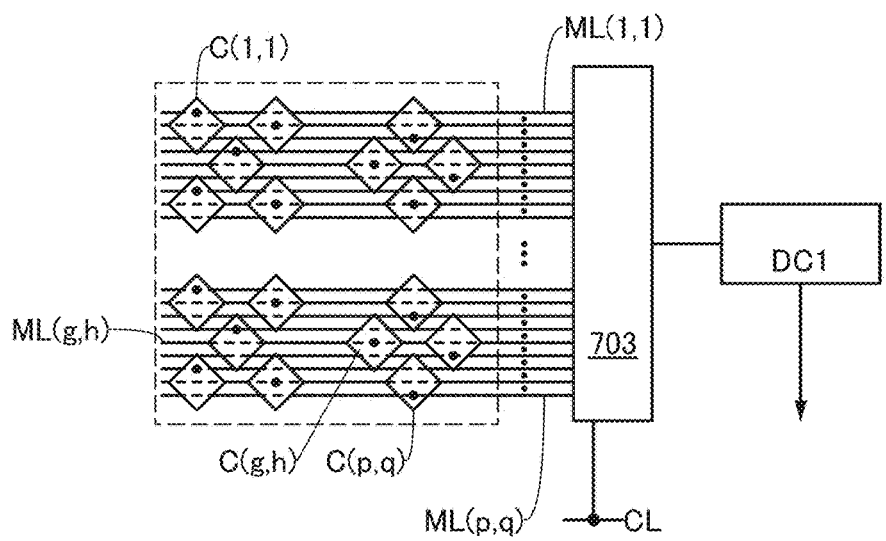
FIGS. 4A to 4C illustrate shapes of conductive films in an input/output device of an embodiment.
Figure 4B:
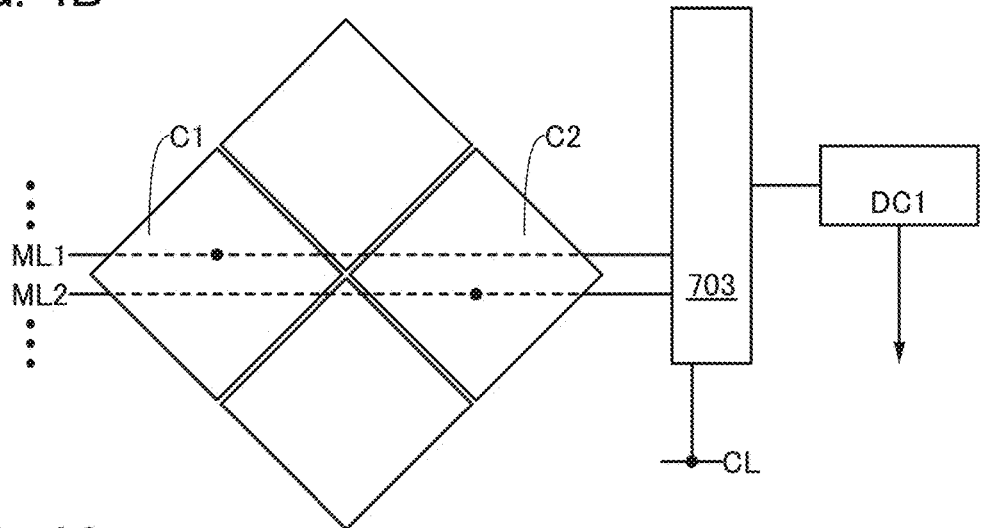
Figure 4C:
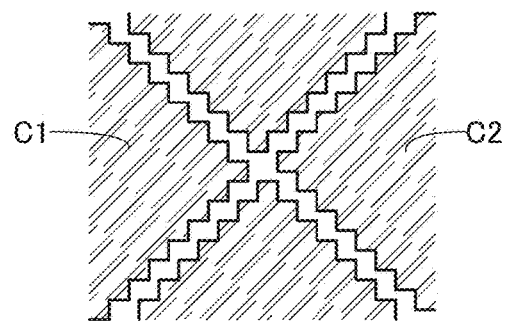

FIGS. 4A to 4C are schematic diagrams illustrating shapes of conductive films of the input device of one embodiment of the present invention. FIGS. 4A and 4B schematically illustrate a structure of an input device in which a plurality of rhombic conductive films is arranged. FIG. 4C schematically illustrates a shape of a side of each rhombic conductive film.

Figure 5A:
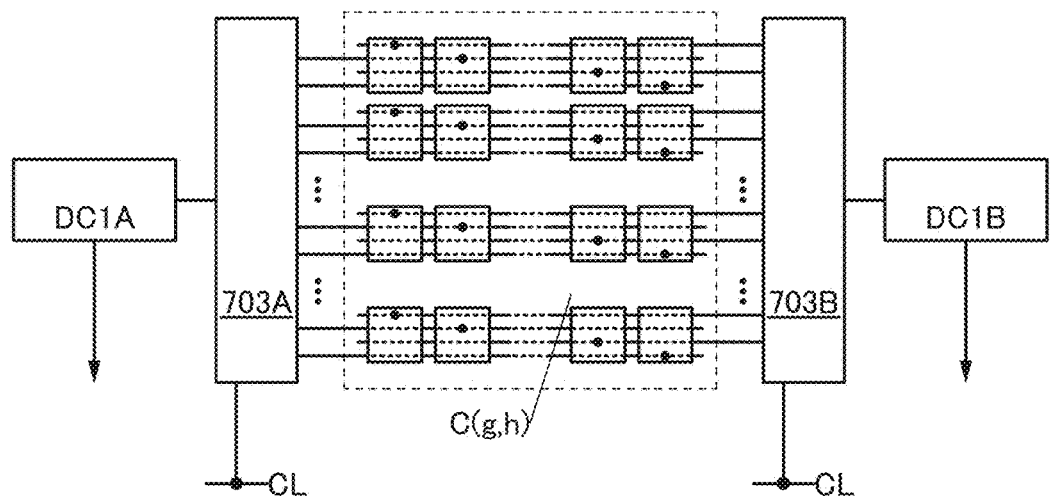
FIGS. 5A and 5B illustrate structures of an input device of an embodiment.
Figure 5B:
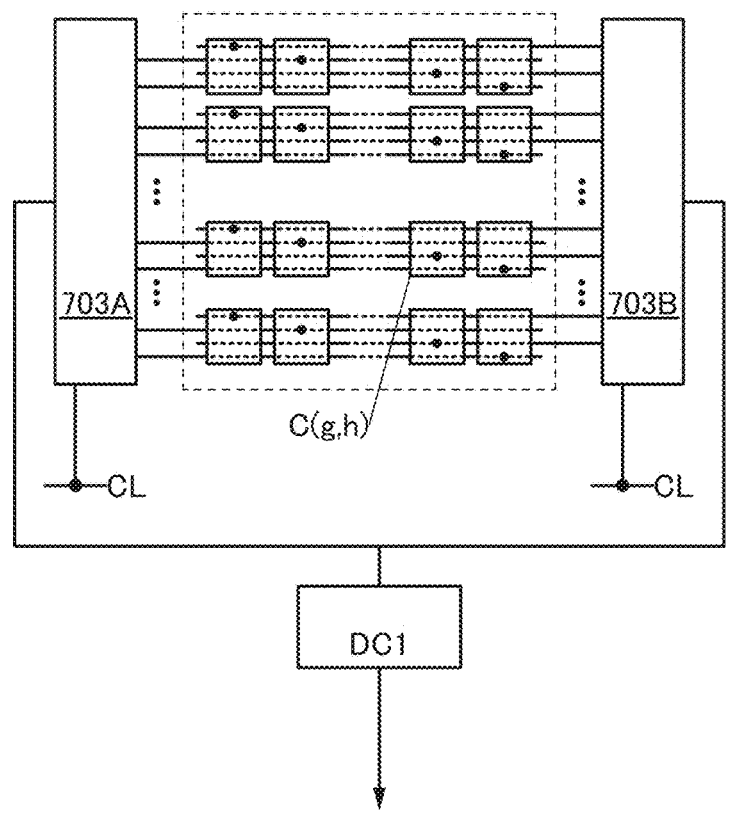
Figure 6A:
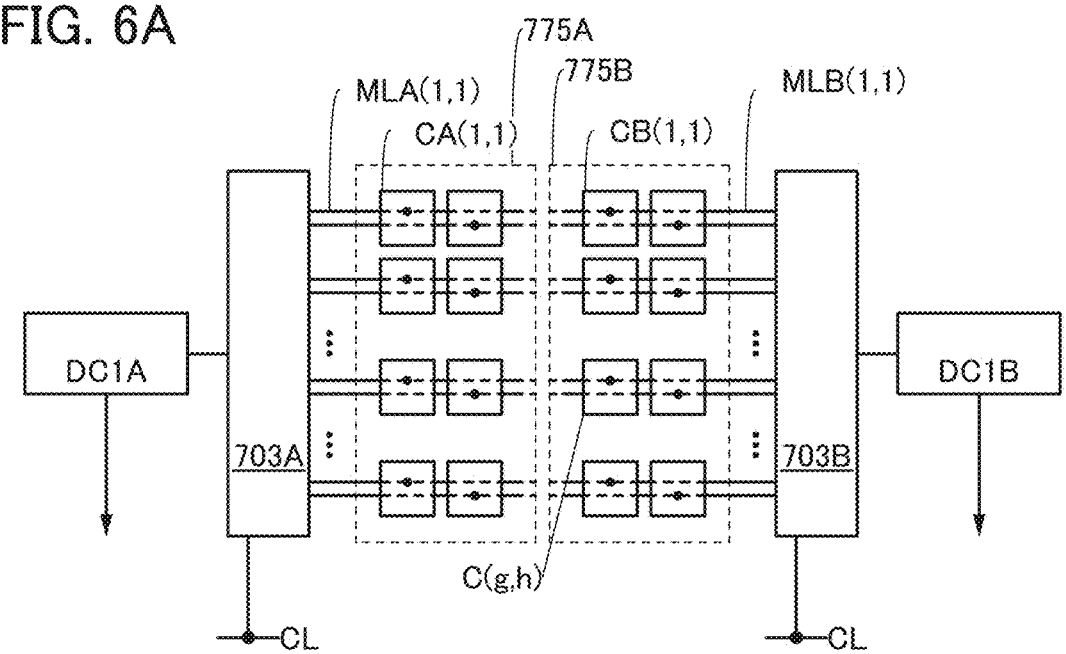
FIGS. 6A and 6B illustrate structures of an input device of an embodiment.
Figure 6B:
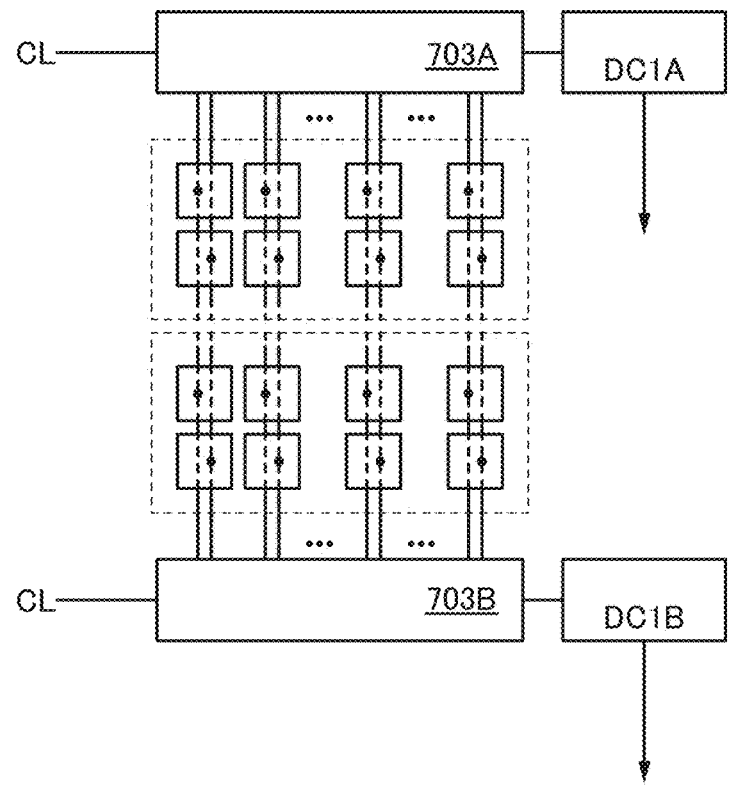

FIGS. 5A and 5B and FIGS. 6A and 6B are schematic diagrams each illustrating a structure of the input device of one embodiment of the present invention which includes two driver circuits. FIG. 5A schematically illustrates a structure including two driver circuits and two sensor circuits. FIG. 5B schematically illustrates a structure including two driver circuits and one sensor circuit. FIG. 6A schematically illustrates a structure including two driver circuits and two input regions provided in the lateral direction. FIG. 6B schematically illustrates a structure including two driver circuits and two input regions provided in the vertical direction.

Figure 7:
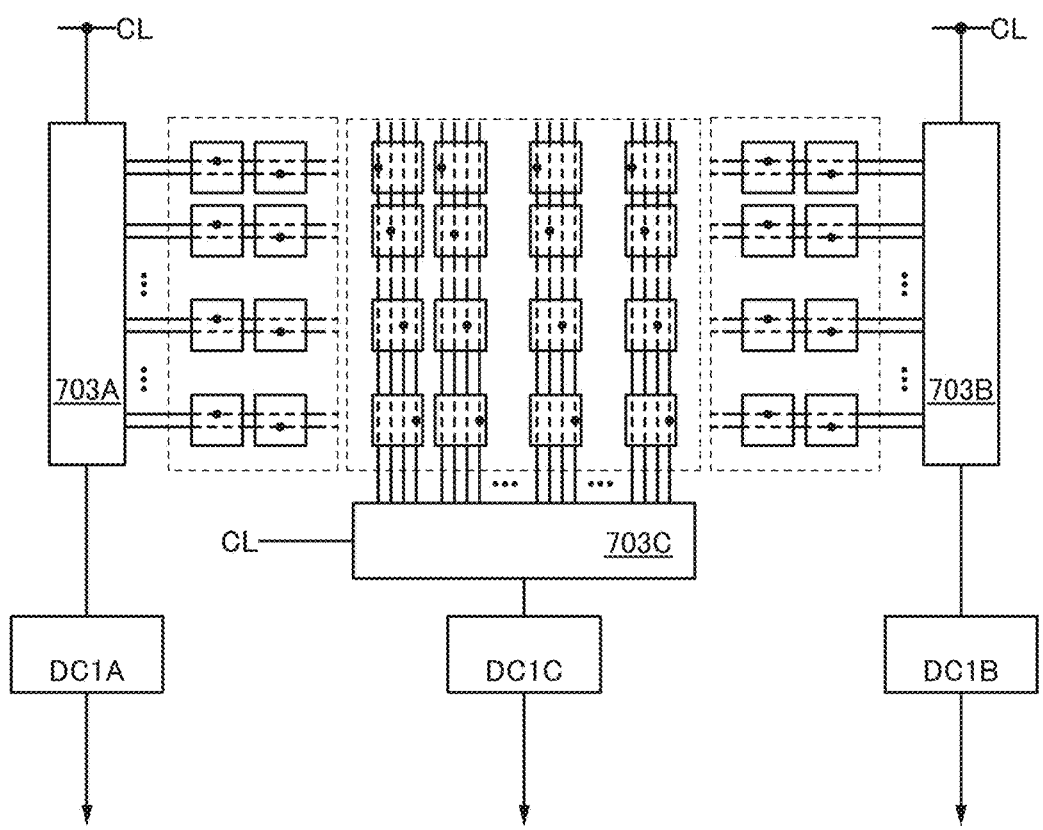
FIG. 7 illustrates a structure of an input device of an embodiment.

FIG. 7 is a schematic diagram illustrating a structure of the input device of one embodiment of the present invention which includes three driver circuits and three input regions.

Figure 8A:
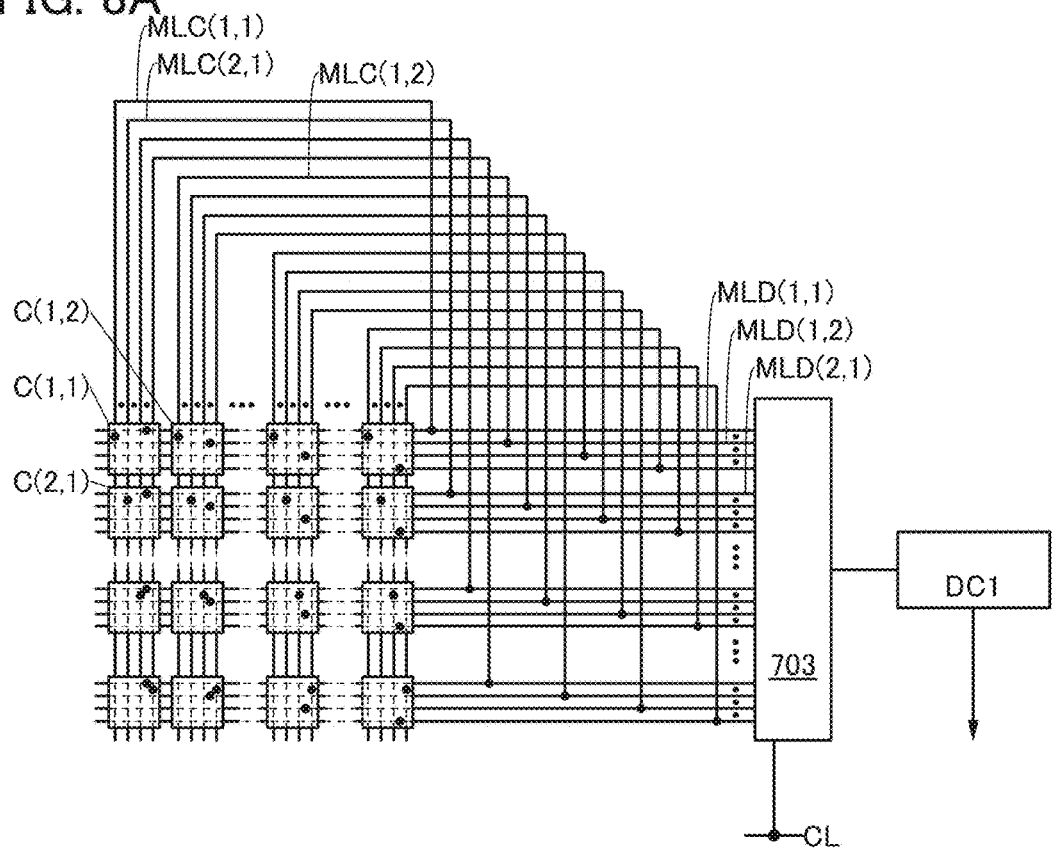
FIGS. 8A and 8B illustrate structures of an input device of an embodiment.
Figure 8B:
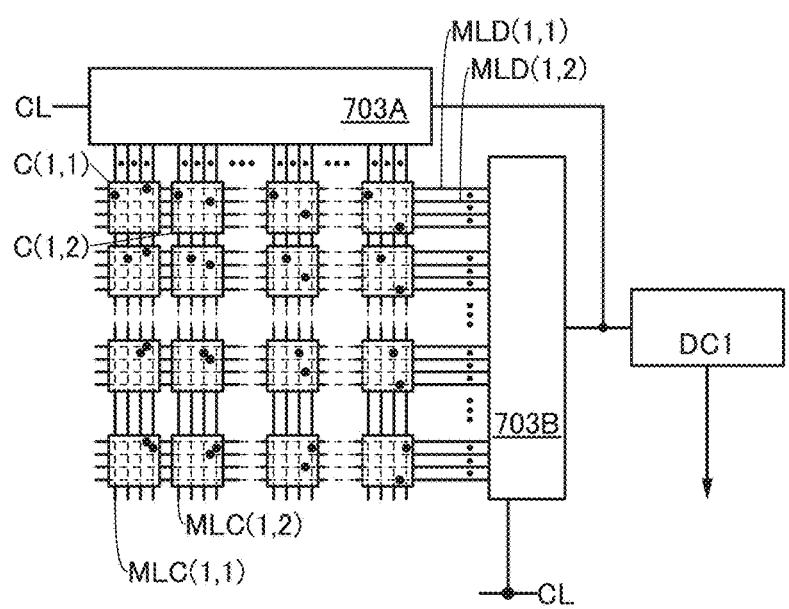

FIGS. 8A and 8B are schematic diagrams illustrating structures of the input device of one embodiment of the present invention including signal lines arranged in different directions. FIG. 8A schematically illustrates a structure of an input device including signal lines arranged in different directions and a driver circuit. FIG. 8B schematically illustrates a structure of an input device including signal lines arranged in different directions and two driver circuits.

Figure 9A:
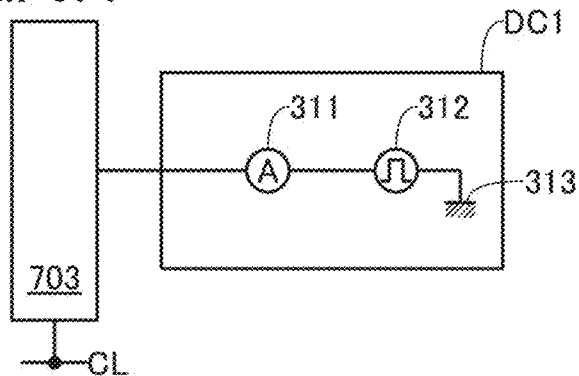
FIGS. 9A to 9C illustrate structures of a sensor circuit of an embodiment.
Figure 9B:
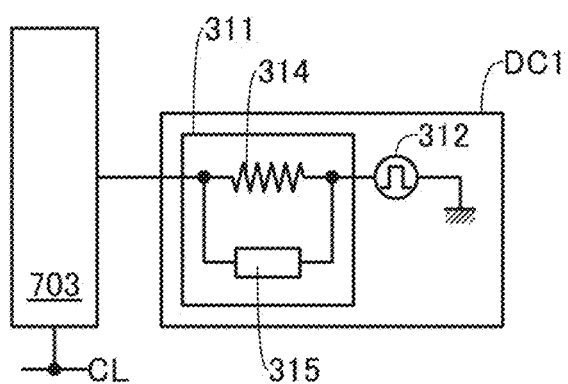
Figure 9C:
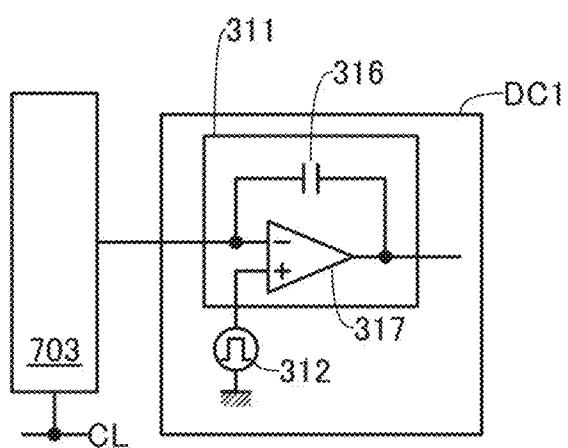

FIGS. 9A to 9C are circuit diagrams each illustrating a structure of a sensor circuit in the input device of one embodiment of the present invention.

Figure 10:
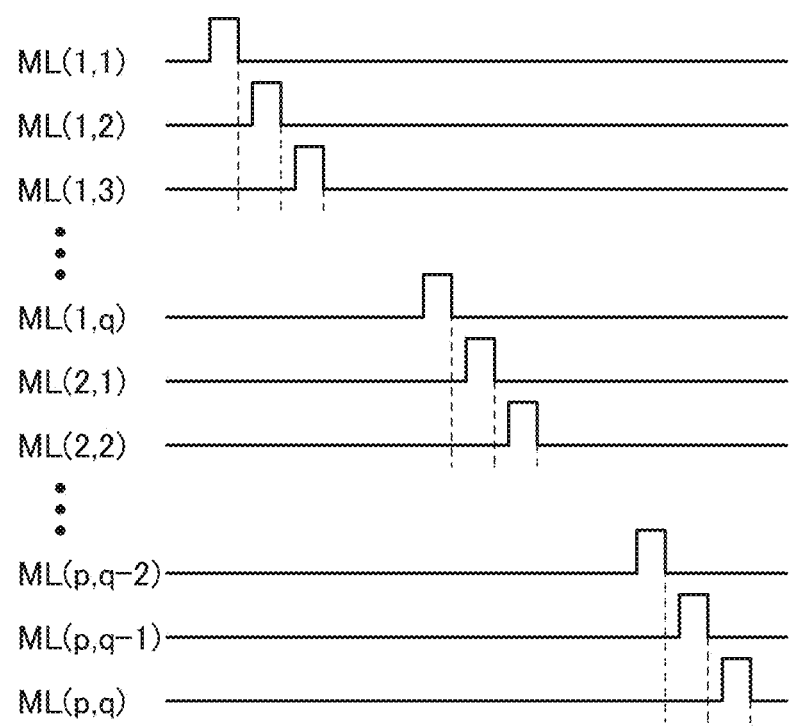
FIG. 10 is a timing chart showing a method of driving an input device of an embodiment.

FIG. 10 is a timing chart showing a method of driving the input device of one embodiment of the present invention.

<Structure Example of Input Device>

The input device 700T described in this embodiment includes, for example, a conductive film C1, a conductive film C2, a signal line ML1, and a signal line ML2 (see FIG. 1B).

Note that the conductive film C1 and the conductive film C2 can be selected from a plurality of conductive films C including a conductive film C (g, h) (see FIG. 1A). Furthermore, the signal line ML1 and the signal line ML2 can be selected from a plurality of signal lines ML including a signal line ML (g, h) (see FIG. 1A).

Note that each of g and h represents a variable and an integer of 1 or larger.

For example, the signal line ML (g, h) is connected to the conductive film C (g, h), and a signal line ML (1, 1) is connected to a conductive film C (1, 1). That is, numbers in parentheses are used to facilitate understanding of connection. Note that the layout of the conductive films C can be, for example, a matrix, but the layout is not necessarily a matrix.

Each of the conductive films C1 and C2 represents a conductive film selected from the plurality of conductive films C. Each of the signal line ML1, the signal line ML2, a signal line ML3, a signal line ML4, a signal line ML5, and a signal line ML6 represents a signal line selected from the plurality of signal lines ML.

As an example, the plurality of conductive films C and the plurality of signal lines ML are preferably provided over the same substrate, in which case the manufacturing cost can be reduced and connection can be facilitated, for example. Note that one embodiment of the present invention is not limited thereto. For example, some of the conductive films C may be provided over a substrate and some of the conductive films C may be formed over another substrate.

For example, the conductive film C2 and the conductive film C1 have a region where they do not overlap with each other. For example, a conductive film adjacent to the conductive film C1 can be used as the conductive film C2. Alternatively, a conductive film may be provided between the conductive film C1 and the conductive film C2.

For example, the signal line ML1 is electrically connected to the conductive film C1. In addition, the signal line ML2 is electrically connected to the conductive film C2 (see FIG. 1B). Note that for example, in a region of the conductive film C1, a black dot that overlaps with the signal line ML1 indicates connection between the signal line ML1 and the conductive film C1. Similarly, in a region of the conductive film C2, a black dot that overlaps with the signal line ML2 indicates connection between the signal line ML2 and the conductive film C2.

For example, each of the conductive films C1 and C2 has is configured to be capacitively coupled to an approaching object (see FIG. 1C). Note that, the signal line ML1 and the signal line ML2 seem to have different heights in FIG. 1C, but one embodiment of the present invention is not limited to this. In the cross-sectional view, the signal line ML1 and the signal line ML2 may be provided at the same height or different heights.

Note that capacitance can be formed between the plurality of conductive films C (including the conductive films C1 and C2) and an object such as a finger or a pen. Therefore, each of the conductive films C can function as one of electrodes of a capacitor (for example, self capacitance of the conductive film C1 or self capacitance of the conductive film C2).

Note that capacitance formed between the conductive film C1 and the object such as a finger or a pen is called self capacitance of the conductive film C1, and capacitance formed between the conductive film C2 and the object such as a finger or a pen is called self capacitance of the conductive film C2 in some cases.

The object such as a finger or a pen approaching the conductive film C1 functions as the other of the electrodes of the capacitor (for example, the self capacitance of the conductive film C1). Thus, capacitance (i.e., the self capacitance of the conductive film C1) between the conductive film C1 or the like and the object such as a finger or a pen varies.

Alternatively, capacitive coupling may be formed between the plurality of conductive films C, for example, between the conductive films C1 and C2. In other words, a change in the value of capacitance between the conductive film C1 and the conductive film C2 caused by the approaching object, such as a finger or a pen, may be sensed. Note that capacitance formed between the conductive films C1 and C2 is called mutual capacitance between the conductive films C1 and C2.

Consequently, it can be said that each of the conductive films C is configured to serve as an electrode for a touch sensor, for example.

Note that, for example, each of the conductive films C may have a function of an electrode of a display element (e.g., a common electrode) in addition to a function of an electrode of a touch sensor. Accordingly, each of the conductive films C (e.g., the conductive film C1, the conductive film C2, or the conductive film C (g, h)) is called common electrode, sensor electrode, capacitance electrode, electrode, first electrode, second electrode, or the like in some cases.

The input device 700T includes, for example, a driver circuit 703 and a sensor circuit DC1 (see FIG. 1A). Note that a structure in which the input device 700T does not include the driver circuit 703, the sensor circuit DC1, and the like and another device or another module includes the driver circuit 703, the sensor circuit DC1, and the like may be employed.

Note that in the case where the plurality of signal lines ML is provided over a substrate different from a substrate provided with the driver circuit 703, each of the signal lines ML is connected to the driver circuit 703 through a connection terminal, a wiring, an anisotropic conductive particle, a silver paste, a flexible printed circuit (FPC), or a bump, for example.

In the case where the plurality of signal lines ML is provided over the substrate provided with the driver circuit 703, a special connection portion is not needed. Therefore, in the case where the driver circuit 703 and the plurality of conductive films C or the plurality of signal lines ML are provided over the same substrate, the possibility of generation of contact failure can be reduced, leading to an improvement in reliability.

As an example, the driver circuit 703 may be formed over the substrate over which the plurality of conductive films C or the plurality of signal lines ML is formed. In that case, they can be formed through the same manufacturing process, which can reduce the manufacturing cost. Note that one embodiment of the present invention is not limited to these structures.

For example, the sensor circuit DC1 may be formed over a substrate different from the substrate over which the plurality of conductive films C or the plurality of signal lines ML is formed. Alternatively, the sensor circuit DC1 may be formed over a substrate different from the substrate over which the driver circuit 703 is formed.

For example, the sensor circuit DC1 may be formed over a single crystal silicon substrate or an SOI substrate. Alternatively, the sensor circuit DC1 may be formed over an IC chip. Consequently, with the use of transistors with high current drive capability and small characteristic variations, a circuit with high sensing accuracy can be formed. Note that one embodiment of the present invention is not limited to this structure.

For example, the sensor circuit DC1 may be connected to the plurality of signal lines ML not through the driver circuit 703. In that case, the number of sensor circuits DC1 may be two or more. In addition, the driver circuit 703 is not necessarily provided.

For example, the driver circuit 703 has a function of selecting at least one of the plurality of signal lines ML. Alternatively, for example, the driver circuit 703 has a function of sequentially selecting at least one of the plurality of signal lines ML. Alternatively, for example, the driver circuit 703 has a function of selecting at least one of the plurality of signal lines ML in an arbitrary order.

For example, the driver circuit 703 has a function of selecting either the signal line ML1 or the signal line ML2.

For example, the driver circuit 703 has a function of selecting at least one of the plurality of conductive films C. Specifically, the driver circuit 703 has a function of selecting, for example, the conductive film C1 or the conductive film C2.

For example, the driver circuit 703 has a function of a multiplexer or a demultiplexer.

For example, the driver circuit 703 has a function of letting current flow between the signal line ML1 and the sensor circuit DC1 in a period during which the signal line ML1 is selected.

For example, the driver circuit 703 has a function of letting current flow between the signal line ML2 and the sensor circuit DC1 in a period during which the signal line ML2 is selected.

For example, the driver circuit 703 has a function of preventing current from flowing between the signal line ML1 and the sensor circuit DC1 in a period during which the signal line ML1 is not selected. Alternatively, for example, the driver circuit 703 has a function of preventing current from flowing between the signal line ML2 and the sensor circuit DC1 in a period during which the signal line ML2 is not selected.

For example, the driver circuit 703 has a function of bringing the signal line ML1 into a floating state in the period during which the signal line ML1 is not selected. Alternatively, for example, the driver circuit 703 has a function of bringing the signal line ML2 into a floating state in the period during which the signal line ML2 is not selected.

For example, the driver circuit 703 has a function of supplying a predetermined voltage (e.g., a constant voltage) to the signal line ML1 in the period during which the signal line ML1 is not selected. Alternatively, for example, the driver circuit 703 has a function of supplying a predetermined voltage (e.g., a constant voltage) to the signal line ML2 in the period during which the signal line ML2 is not selected.

For example, in the case where the plurality of signal lines ML is connected to the sensor circuit DC1 not through the driver circuit 703, each signal line ML needs a circuit for supplying a signal or a circuit for reading a signal in the sensor circuit DC1. Alternatively, one sensor circuit DC1 needs to be connected to each of the signal lines ML.

The driver circuit 703 has a function of selecting one or more signal lines from a plurality of signal lines and a function of switching the signal lines ML every certain period. For example, the driver circuit 703 has a function of selecting only one signal line from the plurality of signal lines ML in a predetermined order. This structure can reduce the number of circuits for supplying a signal or circuits for reading a signal in the sensor circuit DC1. Specifically, the number of circuits can be reduced from the number corresponding to the number of signal lines ML to one corresponding to the one selected signal line ML. Alternatively, the number of sensor circuits DC1 can be reduced from the plurality of signal lines ML to one corresponding to the one selected signal line ML. In other words, the number of circuits in the sensor circuit DC1 or the scale of the circuit can be reduced by providing the driver circuit 703. Alternatively, the number of sensor circuits DC1 can be reduced.

Note that the driver circuit 703 is simply called circuit, first circuit, second circuit, or the like in some cases.

The sensor circuit DC1 is electrically connected to the driver circuit 703, for example. The sensor circuit DC1 has a function of, for example, supplying a search signal. Here, the search signal refers to, for example, a signal supplied for sensing to the signal line ML (g, h) or the conductive film C (g, h).

For example, the sensor circuit DC1 has a function of supplying a square wave search signal. Alternatively, the sensor circuit DC1 has a function of supplying or outputting a pulse signal. Alternatively, the sensor circuit DC1 has a function of supplying or outputting a signal to a sensor.

For example, the sensor circuit DC1 has a function of sensing a change in a capacitance value. Alternatively, the sensor circuit DC1 has a function of detecting a current value. Alternatively, the sensor circuit DC1 has a function of detecting the amount of charge. Alternatively, the sensor circuit DC1 has a function of integrating a signal. Alternatively, the sensor circuit DC1 has a function of converting current into voltage. Alternatively, the sensor circuit DC1 has a function of detecting a voltage value. Alternatively, the sensor circuit DC1 has a function of converting an analog signal into a digital signal.

For example, the sensor circuit DC1 has a function of reading a signal from the sensor. Accordingly, the sensor circuit DC1 is simply called circuit, first circuit, second circuit, or the like.

For example, each of the signal lines ML, such as the signal line ML1, has a function of supplying the search signal or the like to the conductive film C1.

For example, each of the signal lines ML, such as the signal line ML1, has a function of supplying a predetermined voltage, for example, a common voltage to the conductive film C1. Alternatively, each of the signal lines ML, such as the signal line ML1, has a function of receiving the search signal from the driver circuit 703 or the sensor circuit DC1.

For example, in order to detect the capacitance coupled to the conductive film C1 (i.e., the self capacitance of the conductive film C1), the signal line ML1 has a function of supplying a potential changed in accordance with the search signal to the conductive film C1 (see FIG. 1C).

For example, in order to detect the capacitance coupled to the conductive film C1 (i.e., the self capacitance of the conductive film C1), the signal line ML1 has a function of supplying current for charging and discharging the self capacitance of the conductive film C1 to the conductive film C1.

For example, the plurality of signal lines ML have a function of extracting potential or current of the plurality of conductive films C to the outside of regions where the conductive films are provided (e.g., the driver circuit 703 or the sensor circuit DC1).

For example, the plurality of signal lines ML have a function of electrically connecting the plurality of conductive films C to the outside of the regions where the conductive films are provided (e.g., the driver circuit 703 or the sensor circuit DC1).

For example, the plurality of signal lines ML have a function of supplying a signal for a sensor to the plurality of conductive films C or the like.

For example, the plurality of signal lines ML have a function of reading the signal for a sensor from the plurality of conductive films C or the like.

For example, the plurality of signal lines ML may have a function of supplying a common voltage to a common electrode of a display element. Accordingly, the signal line ML (e.g., the signal line ML1, the signal line ML2, or the signal line ML (g, h)) is simply called wiring, first wiring, second wiring, or the like in some cases.

For example, when a user of the input device brings an object such as a finger close to the conductive film C1, the capacitance coupled to the conductive film C1 (i.e., the self capacitance of the conductive film C1) is changed. For example, the value of the self capacitance of the conductive film C1 is larger when the object such as a finger is close to the conductive film C1 than when the object is not close to. For this reason, in the case where the self capacitance of the conductive film C1 is charged and discharged, that is, in the case where a pulse signal is supplied to the conductive film C1, the amount of current or charge needed for a steady potential state of the conductive film C1 is changed depending on the self capacitance value. For example, when the object such as a finger is close to the conductive film C1, the self capacitance value is large, so that the amount of current or charge needed for the steady potential state of the conductive film C1 is large. Consequently, for example, current flowing through the signal line ML1 is changed by the influence of a finger approaching the conductive film C1.

The sensor circuit DC1 has a function of sensing a sensing signal. The value of the sensing signal is in accordance with the self capacitance value of the plurality of conductive films C.

For example, the sensor circuit DC1 can change the potential of the signal line ML1 in order to sense the self capacitance value. In addition, at this time, the sensor circuit DC1 can detect the value of the current flowing through the signal line ML1, the integral value of the current, the peak value of the current, or the amount of charge. As a result, the sensor circuit DC1 can detect the amount of change in the self capacitance influenced by the finger approaching the conductive film C1. Thus, the sensor circuit DC1 can sense a finger of a user or the like approaching the conductive film C1. Moreover, the sensor circuit DC1 can output the sensing result to an external circuit.

In particular, in the input device 700T of one embodiment of the present invention, the conductive films C can be independently controlled. That is, to the conductive films C, the respective signal lines ML are connected. Therefore, the plurality of conductive films C can be independently controlled by independently controlling the plurality of signal lines ML. When two or more objects (e.g., a finger or a pen) approach the input device 700T at the same time, the objects can be independently detected. Thus, the input device 700T enables a multi-touch function.

The above-mentioned input device 700T of one embodiment of the present invention includes a plurality of conductive films configured to be capacitively coupled to an approaching object, a driver circuit that selects one from the plurality of conductive films in a predetermined order, and a sensor circuit configured to supply a search signal and a sensing signal. Thus, the object approaching the conductive film can be sensed on the basis of a potential that is changed in accordance with the search signal and the capacitance coupled to the conductive film. Consequently, a novel input device that is highly convenient or reliable can be provided.

Note that the input device 700T can be used in, for example, a self-capacitance touch panel.

The input device 700T can include the plurality of conductive films C arranged in a line, a straight line, a curved line, a circle, a polygon, or a matrix, for example. Specifically, as an example of arrangement in a matrix, q conductive films C in the row direction and p conductive films C in the column direction that intersects the row direction can be arranged (see FIG. 1A).

Note that g is a variable and an integer greater than or equal to 1 and less than or equal to p. Similarly, h is a variable and an integer greater than or equal to 1 and less than or equal to q. In addition, p represents the number of conductive films C in the vertical direction, and q represents the number of conductive films C in the horizontal direction. Therefore, each of p and q is an integer greater than or equal to 1.

For example, in the case where the conductive films C are arranged in a matrix of p rows and q columns, p conductive films C are arranged in the vertical direction and q conductive films C are arranged in the horizontal direction; thus, p×q conductive films C are disposed in total. That is, here, p represents the number of conductive films C arranged in the vertical direction and q represents the number of conductive films C arranged in the horizontal direction.

Note that a conductive film selected from the plurality of conductive films C can be used as the conductive film C1, and another conductive film selected from the plurality of conductive films C can be used as the conductive film C2.

Instead of the arrangement in a matrix, FIG. 2A shows an example of arrangement in a circle, and FIG. 2B shows an example of arrangement in a curved line, and FIG. 2C shows an example of arrangement in a polygon.

The input device 700T includes the signal line ML (g, h) electrically connected to the conductive film C (g, h) (see FIG. 1B). Here, in the case where one signal line ML is connected to the conductive film C (g, h), the reference numeral of the signal line ML is also (g, h). For example, a wiring extends in the row direction or a wiring extends in the column direction can be used as the signal line ML (g, h). For example, the signal line ML (1, 1) is connected to the conductive film C (1, 1), and a signal line ML (p, q) is connected to a conductive film C (p, q). For example, in the case where the conductive films C are arranged in a matrix of p rows and q columns, p×q signal lines ML are disposed in total.

Specifically, for example, in the case where 405 conductive films C are arranged in total in a matrix of 27 rows and 15 columns, 405 signal lines ML are used in total in the input device 700T.

The driver circuit 703 has, for example, a function of selecting one signal line ML from the plurality of signal lines ML in a predetermined order. For example, the signal line ML1 is selected from the p×q signal lines ML, and then the signal line ML2 is selected.

For example, FIG. 3A shows an example in which a plurality of signal lines is connected to one conductive film. Specifically, three signal lines ML are connected to one conductive film C. For example, with respect to the conductive films C arranged in a matrix of 27 rows and 15 columns (405 conductive films C in total), 1215 (=405×3) signal lines ML are used in the input device 700T. Note that the number of signal lines connected to one conductive film is not limited to three. Connecting a plurality of signal lines to one conductive film can reduce wiring resistance. As a result, the sensitivity of a sensor can be improved. Note that the case where a plurality of signal lines which extend in the same direction is connected to one conductive film is described, but one embodiment of the present invention is not limited to this.

Note that in FIG. 3A, the signal line ML1, the signal line ML2, and the signal line ML3 are connected to one another outside the driver circuit 703. Similarly, the signal line ML4, the signal line ML5, and the signal line ML6 are connected to one another outside the driver circuit 703. With such a connection, the circuit configuration of the driver circuit 703 can be simplified, or the number of output terminals of the driver circuit 703 can be reduced. Note that one embodiment of the present invention is not limited thereto. Each of the signal lines ML1 to ML6 may be separately connected to the driver circuit 703.

The input device 700T can include a control line CL, for example. The control line CL can be electrically connected to the driver circuit 703, and can have a function of supplying a control signal to the driver circuit 703. For example, a start pulse signal, a clock signal, an enable signal, a pulse width control signal, or the like which controls the operation of the driver circuit 703 can be used as the control signal.

Note that FIGS. 1A to 1C and the like illustrate an example in which the conductive film C (g, h) has a square shape, but one embodiment of the present invention is not limited to this. The conductive film C (g, h) can have a variety of shapes such as a rectangular shape, a parallelogram shape, a rhombic shape, a star shape, a polygonal shape, a circular shape, or an ellipsoidal shape. FIG. 4A illustrates an example in which the shape of the conductive film C (g, h) is different from that in FIGS. 1A to 1C.

In addition, a smooth line such as a straight line or a curved line is illustrated as each side of the conductive film C (g, h), but one embodiment of the present invention is not limited to this. For example, each side of the conductive film C (g, h) may have a sawtooth shape (a zigzag line) as illustrated in FIG. 4C. With such a stepwise shape, a boundary between the conductive films C can conform to a boundary between pixels.

Note that FIGS. 1A to 1C and the like illustrate an example in which one driver circuit 703 is provided, but one embodiment of the present invention is not limited to this. For example, the number of driver circuits 703 may be two or more. In that case, the sensor circuit DC1 may be provided for each driver circuit 703. Alternatively, one sensor circuit DC1 may be provided for the plurality of driver circuits 703.

For example, FIGS. 5A and 5B illustrate the input device in which two driver circuits are provided. The input device illustrated in FIG. 5A includes a driver circuit 703A, a driver circuit 703B, a sensor circuit DC1A electrically connected to the driver circuit 703A, and a sensor circuit DC1B electrically connected to the driver circuit 703B.

For example, signal lines ML in odd-number rows can be connected to one driver circuit and signal lines ML in even-number rows can be connected to the other driver circuit. With such a connection, the driver circuit 703 can be divided to the right and left sides, resulting in an efficient layout. Alternatively, the sizes of the driver circuits can be small by the driver circuit division, which enables a narrower frame.

The input device illustrated in FIG. 5B includes the driver circuit 703A, the driver circuit 703B, and the sensor circuit DC1 electrically connected to the driver circuit 703A and the driver circuit 703B. Note that in the case where one sensor circuit DC1 is shared by the plurality of driver circuits 703, it is necessary to control the operation of each driver circuit 703 in order to avoid crosstalk.

Note that a method of extracting the signal lines ML from an input region where the plurality of conductive films C is provided is not limited to the method of extracting the signal lines ML from one side of the input region as in FIGS. 1A to 1C. For example, the input region may be divided into two or more regions and the signal lines ML may be extracted from the regions.

For example, FIG. 6A illustrates an example in which the input region is divided into a right region and a left region, and a signal line MLA (1, 1) is extracted from a region 775A and a signal line MLB (1, 1) is extracted from a region 775B.

For example, the signal line MLA (1, 1) and the signal line MLB (1, 1) are disconnected near the center of the input region. A conductive film CA (1, 1) is connected to the signal line MLA (1, 1), and a conductive film CB (1, 1) is connected to the signal line MLB (1, 1); thus, the conductive film CA (1, 1) and the conductive film CB (1, 1) can be separately operated.

Note that in the case where the input region is horizontally long, for example, the input region is preferably divided into a right region and a left region as illustrated in FIG. 6A; and in the case where the input region is vertically long, for example, the input region is preferably divided into an upper region and a lower region illustrated in FIG. 6B. Thus, the lengths of the signal line MLA and the signal line MLB can be shortened. Consequently, parasitic capacitance or wiring resistance of the signal line MLA and the signal line MLB can be reduced, so that the sensitivity of a sensor can be improved.

For example, when the diagonal of the horizontally-long input region is greater than or equal to 10 inches, more preferably greater than or equal to 14 inches, the input region may be divided into an upper region and a lower region as illustrated in FIG. 6B; and when the diagonal of the vertically-long input region is greater than or equal to 10 inches, more preferably greater than or equal to 14 inches, the input region may be divided into a right region and a left region as illustrated in FIG. 6A. With such a structure, although the total number of signal lines is increased, parasitic capacitance or wiring resistance for each signal line can be reduced. Consequently, even with a large input region, a sensor with high sensitivity can be achieved.

Note that the number of divided input regions is not limited to two, and may be three or more. FIG. 7 illustrates the case where the input region is divided into three regions. In that case, the driver circuit 703A, the driver circuit 703B, and a driver circuit 703C may be provided for the divided input regions. Similarly, the input region may be divided into four regions and the signal lines may extracted from four sides. Note that one embodiment of the present invention is not limited to the above examples.

For example, a plurality of signal lines which extend in different directions may be connected to one conductive film as illustrated in FIGS. 8A and 8B. For example, both a signal line that extends in the vertical direction and a signal line that extends in the horizontal direction may be connected to one conductive film.

For example, as illustrated in FIG. 8A, the conductive film C (1, 1) is connected to a signal line MLC (1, 1) that extends in the vertical direction and a signal line MLD (1, 1) that extends in the horizontal direction. For example, a conductive film C (1, 2) is connected to a signal line MLC (1, 2) that extends in the vertical direction and a signal line MLD (1, 2) that extends in the horizontal direction. For example, a conductive film C (2, 1) is connected to a signal line MLC (2, 1) that extends in the vertical direction and a signal line MLD (2, 1) that extends in the horizontal direction.

With such a structure, wiring resistance of the signal lines can be reduced, and thus the sensitivity of a sensor can be improved. In addition, even with a large input region, a sensor with high sensitivity can be achieved.

Furthermore, for example, signal lines ML connected to the same conductive film may be connected to each other. For example, the signal line MLC (1, 1) and the signal line MLD (1, 1) may be connected to each other. For example, the signal line MLC (2, 1) and the signal line MLD (2, 1) may be connected to each other. Note that one embodiment of the present invention is not limited thereto. For example, the signal line MLC (1, 1) and the signal line MLD (1, 1) are not necessarily connected to each other.

For example, as illustrated in FIG. 8B, the driver circuit 703A may be disposed such that the signal line MLC (1, 1) and the like that extend in the vertical direction are easily connected to the driver circuit 703A, and the driver circuit 703B may be disposed such that the signal line MLD (1, 1) and the like that extend in the horizontal direction are easily connected to the driver circuit 703B. In that case, for example, a signal line MLC that extends in the vertical direction and a signal line MLD that extends in the horizontal direction which are connected to the same conductive film are preferably selected at the same time.

For example, the signal line MLC (1, 1) and the signal line MLD (1, 1) are selected at the same time. Thus, current flows between the conductive film C (1, 1) and the sensor circuit DC1 via the signal line MLC (1, 1) and the signal line MLD (1, 1).

For example, the signal line MLC (1, 2) and the signal line MLD (1, 2) are selected at the same time. Thus, current flows between the conductive film C (1, 2) and the sensor circuit DC1 via the signal line MLC (1, 2) and the signal line MLD (1, 2).

The number of sensor circuits DC1 can be reduced by controlling the driver circuit 703A and the driver circuit 703B in this manner. Note that one embodiment of the present invention is not limited thereto. For example, depending on circumstance, driving may be performed in such a manner that one of the driver circuit 703A and the driver circuit 703B is operated and the other is not operated.

Note that the input device 700T of one embodiment of the present invention can be disposed over a dedicated substrate or over a surface of a counter substrate or a sealing substrate of the display device. Alternatively, the input device 700T can be disposed on a rear surface of a protective substrate such as a cover glass substrate. Alternatively, the input device 700T integrated with a display element or a pixel can be disposed over a TFT substrate, an element substrate, or the like of the display device.

<<Structure Example>>

The input device of one embodiment of the present invention includes the conductive film C1, the conductive film C2, and the signal line ML1 or the signal line ML2. The input device of one embodiment of the present invention can include the conductive film C (g, h) or the signal line ML (g, h). The input device of one embodiment of the present invention can include the driver circuit 703, the sensor circuit DC1, or the control line CL.

<<Conductive film C1, conductive film C2, conductive film C (g, h), signal line ML1, signal line ML2, signal line ML (g, h), control line CL>>

A conductive material can be used for the conductive film C1, the conductive film C2, the conductive film C (g, h), the signal line ML1, the signal line ML2, the signal line ML (g, h), the control line CL, or the like.

For example, an inorganic conductive material, an organic conductive material, a metal material, or a conductive ceramic material can be used for the conductive film C1, the conductive film C2, the conductive film C (g, h), the signal line ML1, the signal line ML2, the signal line ML (g, h), the control line CL, or the like.

As an example of a material of the conductive film C1, the conductive film C2, the conductive film C (g, h), the signal line ML1, the signal line ML2, the signal line ML (g, h), and the control line CL, a metal element selected from aluminum, gold, platinum, silver, copper, chromium, tantalum, titanium, molybdenum, tungsten, nickel, iron, cobalt, palladium, and manganese is given. Alternatively, an alloy containing any of the metal elements described above can be used for the conductive film C1, the conductive film C2, the conductive film C (g, h), the signal line ML1, the signal line ML2, the signal line ML (g, h), the control line CL, and the like. In particular, an alloy of copper and manganese is suitable for microfabrication by a wet etching method.

Note that these conductive films and wirings may have a mesh pattern or a nanowire structure in order to have improved light transmitting property. Alternatively, the conductive films or the wiring may contain a conductive material having a mesh pattern or a nanowire structure. In that case, even when the material itself does not have a light-transmitting property, the material can transmit light because of having many spaces. Accordingly, the films, wirings, or materials having a mesh pattern or a nanowire structure can increase conductivity and a light-transmitting property.

For example, a single-layer film or a multilayer film can be used. Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the conductive film C1, the conductive film C2, the conductive film C (g, h), the signal line ML1, the signal line ML2, the signal line ML (g, h), the control line CL, or the like.

Note that a light-transmitting material may be used in one embodiment of the present invention. For example, a conductive oxide to which indium oxide, indium tin oxide, indium zinc oxide, zinc oxide, or gallium is added, such as zinc oxide, can be used for the conductive film C1, the conductive film C2, the conductive film C (g, h), the signal line ML1, the signal line ML2, the signal line ML (g, h), the control line CL, or the like. In particular, the conductive film C1, the conductive film C2, and the conductive film C (g, h) are preferably formed with any of these materials because these conductive films preferably have a light-transmitting property in the case where they are integrated with a display device, for example.

Note that a single conductive layer or a multi-layer conductive layer formed with a metal element selected from aluminum, gold, platinum, silver, copper, chromium, tantalum, titanium, molybdenum, tungsten, nickel, iron, cobalt, palladium, and manganese may be formed over or under the conductive film C1, the conductive film C2, and the conductive film C (g, h) to overlap with the conductive films. This structure can reduce the resistance value. In the case where a light-transmitting property is needed, these conductive films may be provided only in a region that does not need a light-transmitting property and not in a light-transmitting region. Thus, both a reduction in resistance value and a light-transmitting property can be achieved.

For example, a film containing graphene or graphite can be used as the conductive film C1, the conductive film C2, the conductive film C (g, h), the signal line ML1, the signal line ML2, the signal line ML (g, h), the control line CL, or the like.

Specifically, a film containing graphene oxide is formed and is reduced, so that a film containing graphene can be formed. As a reducing method, a method with application of heat, a method using a reducing agent, or the like can be employed.

For example, a conductive polymer can be used for the conductive film C1, the conductive film C2, the conductive film C (g, h), the signal line ML1, the signal line ML2, the signal line ML (g, h), the control line CL, or the like.

<<Driver Circuit 703>>

For example, any of a variety of sequential circuits, such as a selection circuit, a decoder, or a shift register, can be used in the driver circuit 703. Alternatively, a circuit in which a large number of switches are provided and which controls the conduction (on/off) states of the switches can be used in the driver circuit 703.

Specifically, a shift register that includes a plurality of selection circuits and has a function of supplying selection signals, or the like may be used in the driver circuit 703. Accordingly, one signal line can be selected from the plurality of signal lines in a predetermined order.

Note that the number of sensor circuits DC1 connected to the driver circuit 703 may be changed in accordance with the structure of the driver circuit 703. For example, one sensor circuit DC1 is connected to the driver circuit 703 in FIG. 1A, but one embodiment of the present invention is not limited to this. Two or more sensor circuits DC1 may be connected to one driver circuit 703. FIG. 3B illustrates an example in which a sensor circuit DC11, a sensor circuit DC12, a sensor circuit DC13, and a sensor circuit DC14 are connected to one driver circuit 703. In the case where the plurality of sensor circuits DC1 is connected to one driver circuit 703, the plurality of sensor circuits DC1 can be operated at the same time, which enables parallel processing and increases the reading speed of the sensor. Alternatively, the reading time can be longer, and thus the reading accuracy of the sensor can be increased.

For example, a transistor can be used in the driver circuit 703 or the sensor circuit DC1.

<<Transistor>>

For example, a bottom-gate transistor or a top-gate transistor can be used in the driver circuit 703.

For example, a transistor including a semiconductor containing an element belonging to Group 14 can be used. Specifically, a semiconductor containing silicon can be used for a semiconductor film. For example, single crystal silicon, polysilicon, microcrystalline silicon, or amorphous silicon can be used for the semiconductor film of the transistor. In addition, germanium, gallium, arsenic, or the like can be used for the semiconductor film of the transistor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor for a semiconductor film can be used.

Alternatively, for example, a transistor including a compound semiconductor can be used. Specifically, a semiconductor containing gallium arsenide can be used for a semiconductor film.

For example, a transistor including an organic semiconductor can be used. Specifically, an organic semiconductor containing any of polyacenes and graphene can be used for the semiconductor film.

<<Sensor Circuit DC1>>

For example, an oscillator circuit, a pulse signal output circuit, a current measuring circuit, a peak current measuring circuit, a current-voltage converter circuit, an integrating circuit, an AD converter circuit, or an amplifier circuit can be used for the sensor circuit DC1.

A current value measurement circuit, a peak current measurement circuit, a current voltage conversion circuit, an integrator circuit, an AD conversion circuit, or the like can be used as the sensor circuit DC1. Thus, whether a finger or a pen approaches a conductive film is sensed from a current value, for example. The sensed result can be given to the external circuit as a sensing signal.

For example, a pulse signal output circuit or an oscillator circuit capable of generating a square wave, a sawtooth wave, or a triangular wave can be used as the sensor circuit DC1. Accordingly, a signal generated from the sensor circuit DC1 can be used as the search signal.

The sensor circuit DC1 is configured to output a signal needed for reading a signal from a sensor, to the sensor when the signal line ML is selected.

In a period during which the signal line ML is not selected, the sensor circuit DC1 can bring the signal line ML into, for example, a floating state or can output a constant voltage to the signal line ML. Note that the constant voltage corresponds to, for example, a common voltage that is supplied to the display element in some cases.

The value of the self capacitance of the conductive film C (g, h), the conductive film C1, or the conductive film C2 is larger when an object such as a finger or a pen approaches the conductive film C (g, h), the conductive film C1, or the conductive film C2 than when the object does not approach.

For example, a current measurement unit 311 and a pulse signal output circuit 312 can be used in the sensor circuit DC1 (see FIG. 9A). The current measurement unit 311 and the pulse signal output circuit 312 are connected in series between the driver circuit 703 and a ground line 313, for example. Note that the potential supplied to the ground line 313 is not necessarily 0 V.

The pulse signal output circuit 312 outputs a pulse signal to the conductive film C (g, h), the conductive film C1, the conductive film C2, or the like through the driver circuit 703. For example, the current measurement unit 311 senses the amount of current. Thus, a touch can be sensed.

For example, a resistor 314 and a voltage measurement unit 315 can be used in the current measurement unit 311 (see FIG. 9B). Voltage between both terminals of the resistor 314 is measured by the voltage measurement unit 315, so that the value of current flowing through the current measurement unit 311 can be measured. Note that the current value is measured here, but one embodiment of the present invention is not limited to this.

For example, a circuit having a function of measuring an integral value of current can be used in the sensor circuit DC1. Specifically, an integrator circuit can be formed with an operational amplifier 317. For example, a capacitor 316 and the operational amplifier 317 can be used in the sensor circuit DC1 (see FIG. 9C).

For example, an amplifier circuit capable of amplifying a change in potential can be used in the sensor circuit DC1. Thus, the amplifier circuit can amplify the change in potential in accordance with the amount of the current flowing through the signal line ML (g, h). Consequently, current can be converted into potential, and a change in the converted potential can be amplified and supplied to an external circuit as a sensing signal.

Data sensed by the sensor circuit DC1 is sent to a next circuit. Examples of the next circuit include a memory circuit and a signal processing circuit. The next circuit can determine which position is touched. Note that the next circuit may be placed in the sensor circuit DC1.

Next, timing when a signal is supplied to the plurality of conductive films C or the plurality of signal lines ML is described (see FIG. 10). For example, signals are sequentially supplied to the plurality of signal lines ML from the pulse signal output circuit 312 in the sensor circuit DC1 through the driver circuit 703.

For example, a signal line ML is selected from the top to the bottom. In other words, the signal lines ML are sequentially selected from the signal line ML (1, 1) in the first row to the signal line ML (p, q) in the last row, and the conductive films C are sequentially selected one by one. Current flows between the sensor circuit DC1 and the selected signal line ML (g, h) and between the sensor circuit DC1 and the selected conductive film C (g, h).

The sensor circuit DC1 outputs a pulse signal to the signal line ML (g, h) and the conductive film C (g, h) and senses current flowing at the time, whereby sensing can be performed.

In Embodiment 1, one embodiment of the present invention has been described. Other embodiments of the present invention are described in Embodiments 2 to 12. Note that one embodiment of the present invention is not limited thereto. In other words, various embodiments of the invention are described in this embodiment and the other embodiments, and one embodiment of the present invention is not limited to a particular embodiment. Although the example in which one embodiment of the present invention is applied to the touch sensor has been described, one embodiment of the present invention is not limited thereto. Depending on circumstances or conditions, one embodiment of the present invention may be applied to various sensors, for example. Alternatively, depending on circumstances or conditions, one embodiment of the present invention is not necessarily applied to a touch sensor.

This embodiment shows an example of a basic principle. Thus, part or the whole of this embodiment can be freely combined with, applied to, or replaced with part or the whole of any of the other embodiments.

Embodiment 2

The structures of the input device are described in Embodiment 1. The input device can be combined with various devices. For example, it is possible to form an in-cell display device in which the input device and a display element or a TFT are integrated in an element substrate (TFT substrate). In that case, the device has an output function of displaying an image and an input function of reading a signal from a sensor.

In this embodiment, a structure of an input/output device of one embodiment of the present invention is described with reference to FIGS. 11A to 11D. Note that description of the same portions as those in Embodiment 1 is omitted in some cases.

FIGS. 11A to 11D illustrate the structure of an input/output device 700 of one embodiment of the present invention.

Figure 11A:
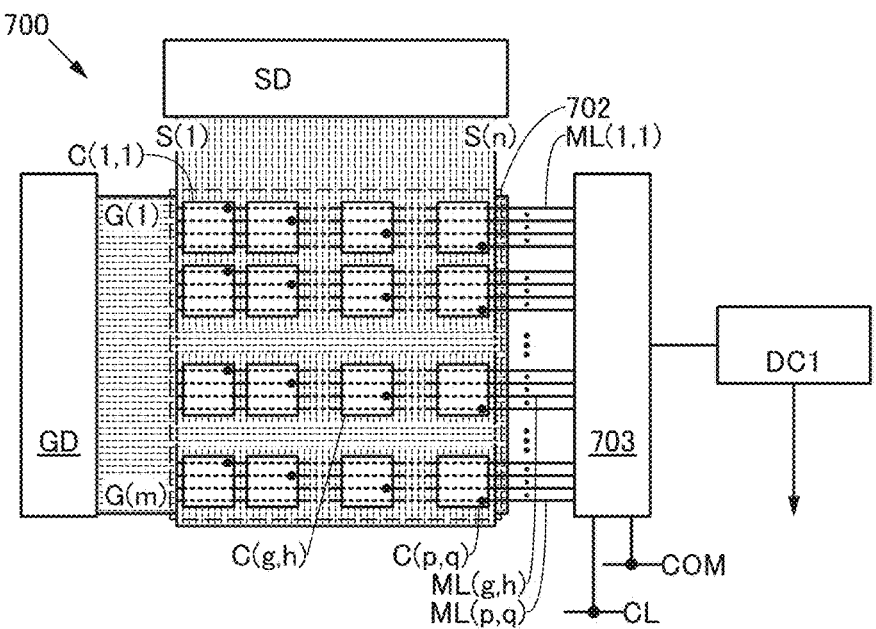
FIGS. 11A to 11D illustrate a structure of an input/output device of an embodiment.

FIG. 11A is an example of a block diagram illustrating the structure of the input/output device 700 one embodiment of the present invention.

Figure 11B:
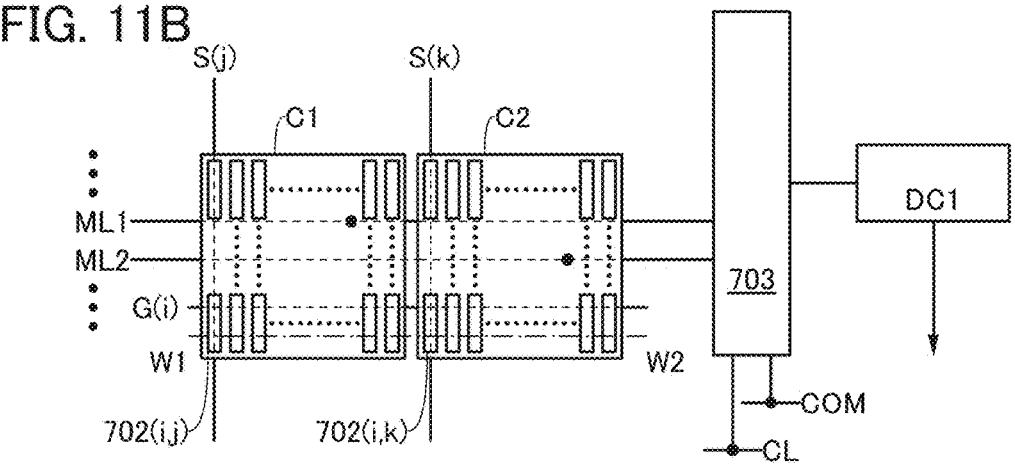

FIG. 11B is an example of a block diagram for explaining details of part of the input/output device 700 illustrated in FIG. 11A.

Figure 11C:
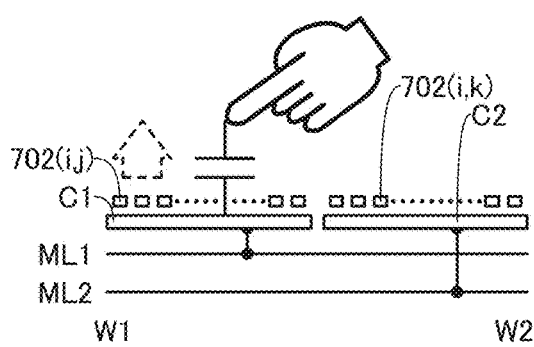

FIG. 11C is an example of a cross section schematic diagram of the input/output device 700 taken along the cutting plane line W1-W2 in FIG. 11B. Note that, the signal line ML1 and the signal line ML2 seem to have different heights in FIG. 11C, but one embodiment of the present invention is not limited to this. In the cross-sectional view, the signal line ML1 and the signal line ML2 may be provided at the same height.

Figure 11D:
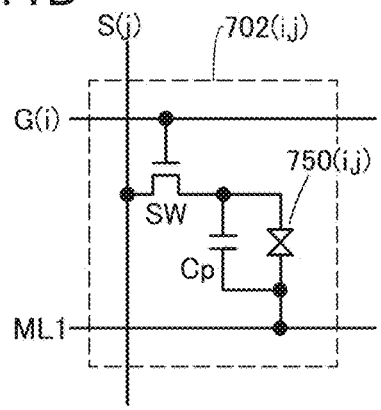

FIG. 11D is an example of a circuit diagram illustrating a display element 750 (i, j) and a pixel circuit which can be used in a pixel 702 (i, j).

Note that the input/output device 700 differs from the input device 700T in FIGS. 1A to 1C in that the input/output device 700 includes a display device. In other words, the input/output device 700 has portions similar to those of the input device 700T. Thus, the above description of the input device 700T can apply to the input/output device 700. Here, the above description is referred to for the similar structures, and different structures are described in detail.

Note that the input/output device 700 may have a structure in which the input device 700T is added to a display device. Alternatively, the input/output device 700 may have a structure in which a member is used in common as a part of the display device and a part of the input device 700T. In that case, the member has a function of the part of the display device and a function of the part of the input device 700T. FIGS. 11A to 11D illustrate an example of the case where a member has a function of a part of the display device and a function of a part of the input device 700T.

<Structure Example 1 of Input/Output Device>

The input/output device 700 described in this embodiment includes the display device and the input device 700T (see FIG. 11A). In other words, the input/output device 700 has a structure in which the input device 700T is added in the display device and is partly incorporated in part of the display device. Thus, a member has a function of part of the display device and a function of part of the input device 700T.

The input/output device 700 has a function of sensing an object approaching a display surface side of the display device (see FIG. 11C).

The display device (output device) includes the pixel 702 (i, j) in a region where the conductive film C1 is provided and a pixel 702 (i, k) in a region where the conductive film C2 is provided (see FIGS. 11B and 11 C). Here, each of i, j, and k is a variable and an integer greater than or equal to 1. In addition, the value of k is different from that of j.

For example, the pixels 702 may be arranged in a matrix. For example, the pixel 702 (i, j) can be disposed in the same row as the pixel 702 (i, k) and in a different column from the pixel 702 (i, k).

Note that a plurality of pixels is disposed in the region where the conductive film C1, the conductive film C2, or the like is provided. For example, the plurality of pixels 702 is provided in one conductive film C1. The pixel 702 (i, j) is one of the plurality of pixels 702. Similarly, the plurality of pixels 702 is provided in one conductive film C2. The pixel 702 (i, k) is one of the plurality of pixels 702.

For example, the pixel 702 (i, j) includes the display element 750 (i, j), and the pixel 702 (i, k) includes a display element 750 (i, k). FIG. 11D illustrates an example of a circuit of the pixel 702 (i, j). Note that the pixel 702 (i, j) may include a plurality of display elements.

The input/output device includes a display device, a plurality of conductive films configured to be capacitively coupled to an object approaching a display surface side of the display device, a driver circuit that selects one from the plurality of conductive films in a predetermined order, and a sensor circuit configured to supply a search signal and a sensing signal. Thus, the object approaching the display surface side of the display device can be sensed on the basis of a potential that is changed in accordance with the search signal and the capacitance coupled to the conductive film. Consequently, a novel input/output device that is highly convenient or reliable can be provided.

The input/output device 700 includes a plurality of pixels (see FIG. 11B). For example, the input/output device 700 includes n pixels in the horizontal direction and m pixels in the vertical direction. That is, the input/output device 700 includes the pixels 702 (i, j) arranged in a matrix of m rows by n columns. Note that m is an integer greater than or equal to i, and n is an integer greater than or equal to j.

The pixel 702 (i, j) can have a pixel circuit that drives the display element 750 (i, j), and the pixel 702 (i, k) can have a pixel circuit that drives the display element 750 (i, k). For example, the pixel circuit illustrated in FIG. 11D can be used for the pixel 702 (i, j). Note that the pixel 702 (i, j) or the pixel 702 (i, k) may include a plurality of display elements.

In addition, the input/output device 700 can include a scan line G (i) electrically connected to pixels 702 (i, 1) to 702 (i, n) arranged in the same row. Note that, in addition to the scan line G (i), another wiring may be connected to the pixel 702 (i, j) or the pixels 702 (i, 1) to 702 (1, n).

The scan line G (i) has a function of selecting a pixel connected to the scan line G (i), for example. Alternatively, the scan line G (i) has a function of supplying a selection signal to a pixel, for example. The scan line G (i) may supply not only the selection signal but also another signal. Note that the scan line G (i) is called gate line, gate signal line, scan line, wiring, first wiring, or the like in some cases.

In addition, the input/output device 700 can include a signal line S (j) electrically connected to pixels 702 (1, j) to 702 (m, j) arranged in the same column. Similarly, the input/output device 700 can include a signal line S (k) electrically connected to pixels 702 (1, k) to 702 (m, k)

arranged in the same column. Note that not only the signal line S (j) but also another wiring may be connected to the pixel 702 (i, j).

The signal line S (j) has a function of supplying a video signal to a pixel connected to the signal line S (j), for example. Alternatively, the signal line S (j) has a function of supplying or writing a video signal to a pixel, for example. The signal line S (i) may supply not only the video signal but also another signal. Note that the signal line S (i) is called source line, source signal line, data line, wiring, first wiring, or the like in some cases.

The input/output device 700 includes, for example, a driver circuit GD electrically connected to scan lines G (1) to G (m). For example, the driver circuit GD has functions of selecting one of the scan lines G (1) to G (m) and supplying a selection signal to the scan lines G (1) to G (m), the pixel 702 (i, j), or the like. Note that the driver circuit GD may supply not only the selection signal but also another signal.

The driver circuit GD is called gate line driver circuit, gate signal line driver circuit, scan line driver circuit, scan circuit, circuit, first circuit, or the like in some cases.

The input/output device 700 includes a driver circuit SD electrically connected to signal lines S (1) to S (n), for example. The driver circuit SD has a function of supplying an image signal to the signal lines S (1) to S (n), the pixel 702 (i, j), or the like. Note that the driver circuit SD may supply not only the video signal but also another signal.

The driver circuit SD is called source line driver circuit, source signal line driver circuit, video signal line driver circuit, data line circuit, circuit, first circuit, or the like in some cases.

<<Structure Example>>

The input/output device 700 of one embodiment of the present invention includes the display device or the input device 700T.

The input/output device 700 of one embodiment of the present invention includes the pixel 702 (i, j) and the pixel 702 (i, k).

The input/output device 700 of one embodiment of the present invention includes the display element 750 (i, j) and the display element 750 (i, k).

The input/output device 700 of one embodiment of the present invention includes the scan line G (i), the signal line S (j), the signal line S(k), the driver circuit GD, and the driver circuit SD.

<<Input Device>>

For the input/output device 700 of one embodiment of the present invention, an input device including the conductive film C1 or the conductive film C2 which is configured to be capacitively coupled to an object approaching a display surface side of the display device can be used.

For example, a light-transmitting conductive film can be used as the conductive film C1 or the conductive film C2. Alternatively, a conductive film having an opening, a slit, a comb shape, a lattice shape, or the like in a region where the display element is provided can be used as conductive film C1 or the conductive film C2. Thus, the conductive film C1 or the conductive film C2 can be provided between the display element and a user.

<<Display Device>>

For example, an active matrix display device or a passive matrix display device can be used. Instead of using the display device, a lighting device with which a video or an image is not displayed may be used.

<<Display Element 750 (i, j), Display Element 750 (i, k)>>

For example, a display element that has a function of controlling light reflection or light transmission or a light-emitting element can be used as the display element 750 (i, j) or the display element 750 (i, k).

Specifically, a combined structure of a polarizing plate and a liquid crystal element, a MEMS shutter display element, or the like can be used as the display element 750 (i, j) or the display element 750 (i, k).

Specifically, for example, an organic electroluminescent element, an LED, or an inorganic electroluminescent element can be used as the display element 750 (i, j) or the display element 750 (i, k).

<<Pixels 702 (i, j), 702 (i, k)>>

For example, a switching element SW, a capacitor Cp, and the like can be used in the pixel 702 (i, j) or the pixel 702 (i, k). FIG. 11D shows an example of the pixel 702 (i, j).

Specifically, a transistor can be used as a switching element SW. For example, the transistor that can be used in the driver circuit 703 described in Embodiment 1 can be used as the switching element SW.

For example, the driver circuit 703 and the pixel 702 (i, j) may be formed over different substrates. In that case, each wiring of the pixel 702 (i, j) is connected to the driver circuit 703 through a connection terminal, a wiring, an anisotropic conductive particle, a silver paste, a flexible printed circuit (FPC), or a bump, for example.

For example, a transistor that can be used in the driver circuit 703 and a transistor that can be used in the pixel 702 (i, j) may be formed over the same substrate. In that case, the driver circuit 703 and the pixel 702 (i, j) can be formed through the same manufacturing process.

For example, in the case where the driver circuit 703 and the pixel 702 (i, j) are formed over the same substrate, a special connection portion is not needed, so that contact failure generated in the connection portion can be prevented. As a result, the reliability can be improved. In addition, the driver circuit 703 and the pixel 702 (i, j) can be formed through the same manufacturing process. Furthermore, the manufacturing cost can be reduced. Note that one embodiment of the present invention is not limited to the above structures.

<<Scan Line G (i), Signal Line S (j)>>

A conductive material can be used for the scan line G (i) or the signal line S (j).

For example, a material that can be used for the conductive film C1, the conductive film C2, the signal line ML1, the signal line ML2, the control line CL, or the like can be used for the scan line G (i) or the signal line S (j).

<<Driver Circuit GD>>

A variety of sequential circuits, such as a shift register, can be used as the driver circuit GD.

For example, a transistor including a semiconductor film that can be formed by the same step as a semiconductor film of a transistor that is used in the driver circuit 703, the pixel 702 (i, j), the pixel 702 (i, k), or the like described in Embodiment 1 can be used in the driver circuit GD.

<<Driver Circuit SD>>

A variety of sequential circuits, such as a shift register, can be used as the driver circuit SD.

For example, an integrated circuit can be used as the driver circuit SD. Specifically, an integrated circuit formed over a silicon substrate can be used. Note that the whole of the driver circuit SD is not necessarily formed over the silicon substrate and part of the driver circuit SD may be formed over the silicon substrate.

For example, a chip on glass (COG) method can be used to mount the driver circuit SD. Specifically, an anisotropic conductive film can be used to mount the integrated circuit on a pad.

For example, a transistor that can be formed through the same process as a transistor that can be used in the driver circuit 703, the pixel 702 (i, j), the pixel 702 (i, k), the driver circuit GD, or the like described in Embodiment 1 can be used in part or the whole of the driver circuit SD.

<Structure Example 2 of Input/Output Device>

Another structure of the input/output device of one embodiment of the present invention is with reference to FIGS. 11A to 11D, FIG. 12, FIG. 13, and FIGS. 14A to 14C.

Note that the above description is referred to for similar structures, the structure of using a wiring COM and the structure of using liquid crystal elements in the pixels 702 (i, j) and (i, k) are described in detail.

Figure 12:
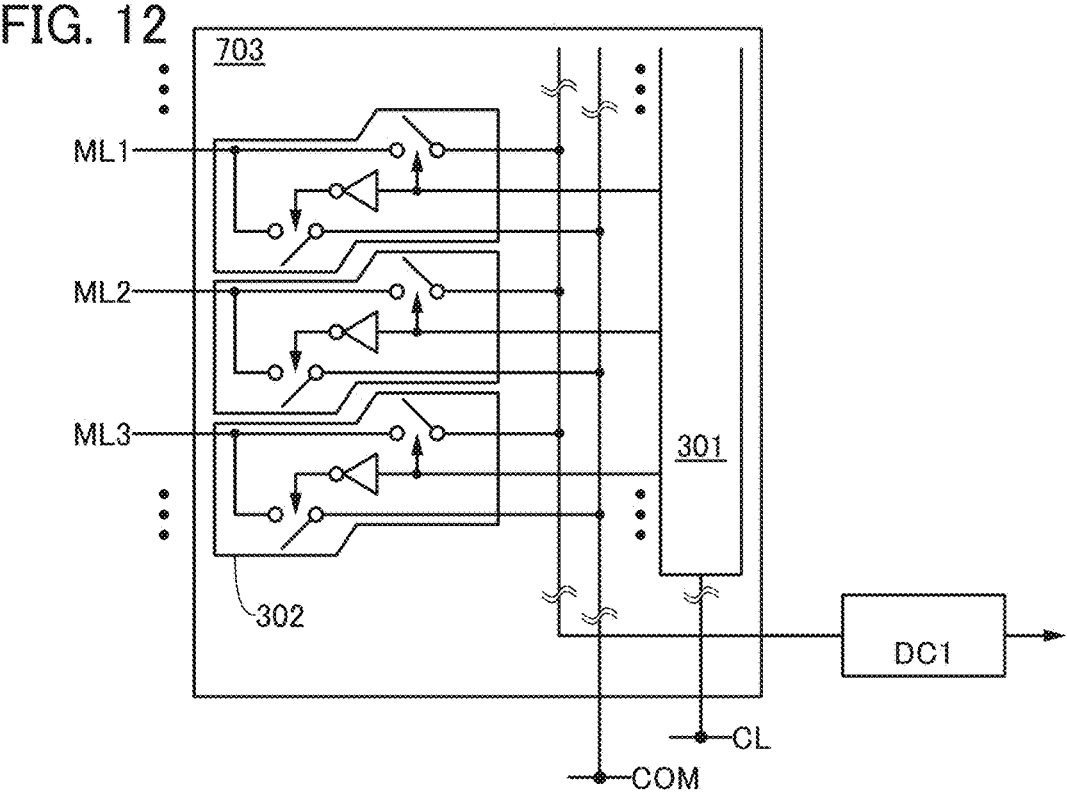
FIG. 12 illustrates a structure of an input/output device of an embodiment.

FIG. 12 and FIG. 13 each illustrate an example of a structure of the driver circuit 703 that can be used for the input/output device 700 of one embodiment of the present invention. FIG. 12 illustrates an example of a structure of the driver circuit 703. FIG. 13 illustrates an example of a structure of the driver circuit 703B. The driver circuit 703B is connected to the sensor circuit DC11 and the sensor circuit DC12.

Figure 14A:
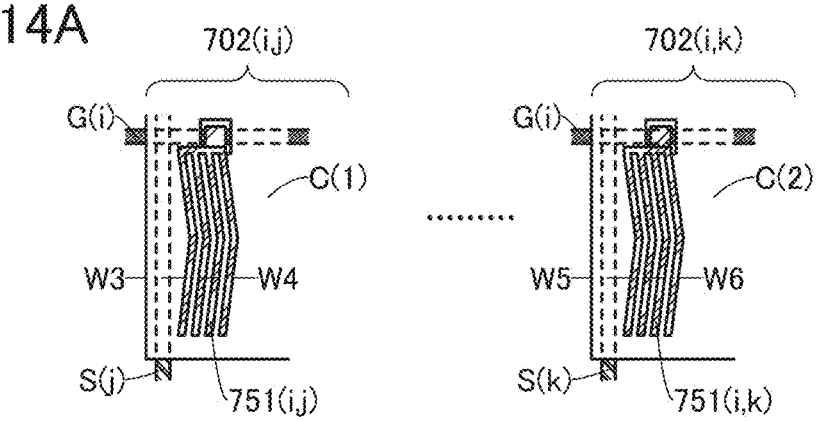
FIGS. 14A to 14C each illustrate a structure of a driver circuit of an embodiment.
Figure 14B:
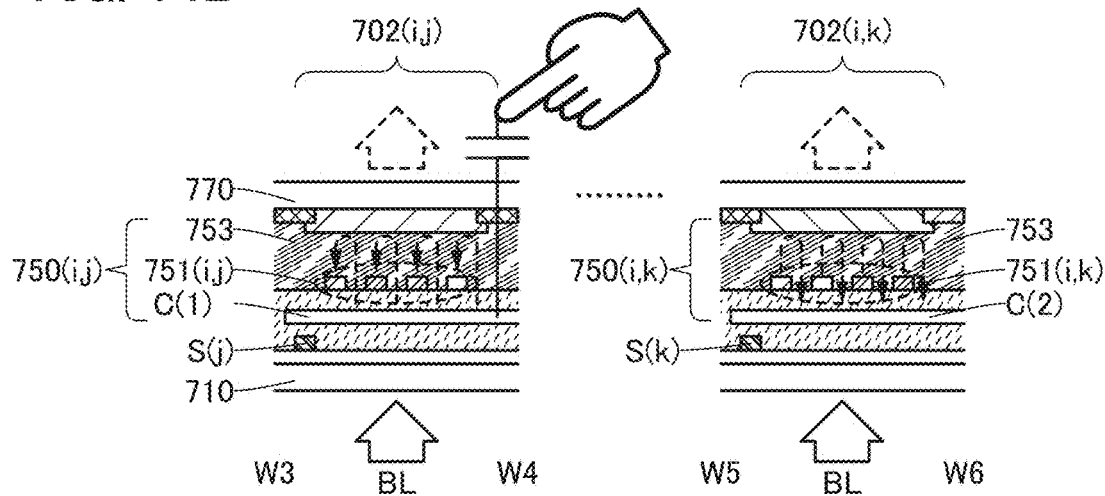
Figure 14C:
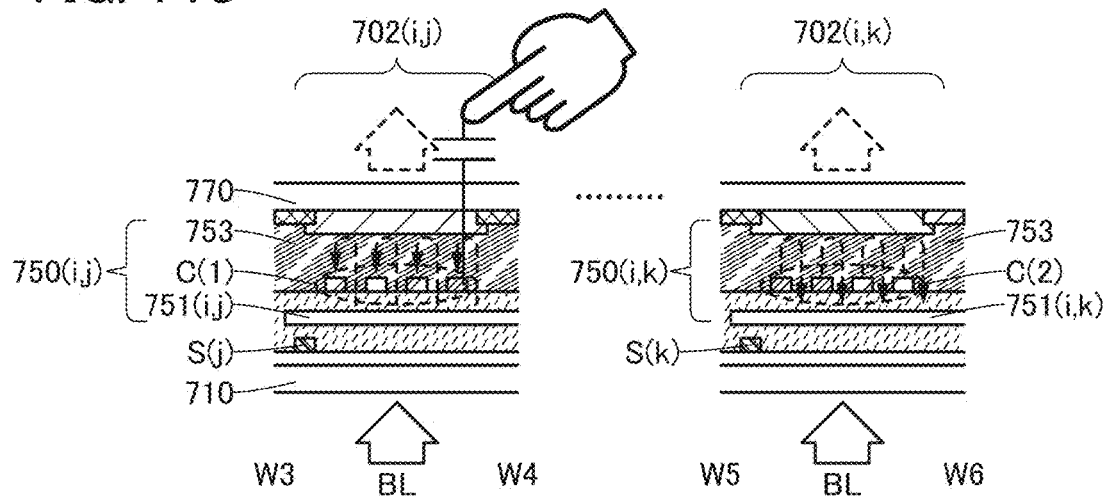

FIGS. 14A to 14C illustrate a structure of a pixel that can be used in the input/output device 700 of one embodiment of the present invention. FIG. 14A illustrates examples of top views of the pixel 702 (i, j) and the pixel 702 (i, k). FIG. 14B illustrates an example of a cross-sectional view of the pixel 702 (i, j) taken along the cutting plane line W3-W4 in FIG. 14A and an example of a cross-sectional view of the pixel 702 (i, k) taken along the cutting plane line W5-W6 in FIG. 14A.

The input/output device 700 described in this embodiment can includes the wiring COM, for example (see FIG. 11A).

The wiring COM is electrically connected to the driver circuit 703 and has a function of supplying a predetermined potential. For example, a common potential that is supplied to a plurality of display elements can be supplied to the wiring COM.

For example, the driver circuit 703 has a function of letting current flow between the signal line ML2 and the wiring COM or between a signal line ML other than the signal line ML1 and the wiring COM in a period during which the signal line ML1 is selected. Alternatively, the driver circuit 703 has a function of preventing current from flowing between the signal line ML1 and the wiring COM in the period during which the signal line ML1 is selected. In other words, the driver circuit 703 has a function of letting current flow between the signal line ML2 and the wiring COM in the period during which the signal line ML2 is not selected.

The above can apply to the case in which the signal line ML2 is selected. That is, the driver circuit 703 has a function of preventing current from flowing between the signal line ML2 and the wiring COM in the period during which the signal line ML2 is selected.

Furthermore, the driver circuit 703 has a function of letting current flow between the signal line ML1 and the wiring COM or between a signal line ML other than the signal line ML2 and the wiring COM in a period during which the signal line ML2 is selected. Alternatively, the driver circuit 703 has a function of preventing current from flowing between the signal line ML2 and the wiring COM in the period during which the signal line ML2 is selected.

In other words, the driver circuit 703 has a function of letting current flow between the signal line ML1 and the wiring COM in the period during which the signal line ML1 is not selected.

These operations area controlled by a shift register included in the driver circuit 703, for example. The shift register sequentially scans and outputs selection signals. As a result, conduction states of switches connected to the signal line ML1, the signal line ML2, and the like are changed. Consequently, the conduction state between the wiring COM and the signal line ML1, the signal line ML2, and the like or between the sensor circuit DC1 and the signal line ML1, the signal line ML2, and the like are switched.

The display element 750 (i, j) includes a layer 753 containing a liquid crystal material, the conductive film C1, and a pixel electrode 751 (i, j) (see FIGS. 14A and 14B). The pixel electrode 751 (i, j) is provided such that an electric field that controls the orientation of the liquid crystal material is formed between the conductive film C1 and the pixel electrode 751 (i, j). For example, the conductive film C1 can have a function of a display element. In other words, the conductive film C1 has a function of an electrode of a touch sensor and a function as an electrode of a display element. Note that arrows BL in the drawings show the direction in which light emitted by a backlight travels.

The display element 750 (i, k) includes the layer 753 containing a liquid crystal material, the conductive film C2, and a pixel electrode 751 (i, k). The pixel electrode 751 (i, k) is provided such that an electric field that controls the orientation of the liquid crystal material is formed between the conductive film C2 and the pixel electrode 751 (i, k).

For example, the conductive film C1, the conductive film C2, the conductive film C (g, h), or the like has a function as part of a display element. For example, the conductive film C1, the conductive film C2, the conductive film C (g, h), or the like has a function of a common electrode of a plurality of display elements. In other words, the conductive film C1, the conductive film C2, the conductive film C (g, h), or the like has a function of an electrode of a touch sensor and a function of an electrode of a display element.

For example, the pixel electrode 751 (i, j), the pixel electrode 751 (i, k), or the like can be disposed over the conductive film C1 or the conductive film C2 with an insulating film positioned therebetween (see FIGS. 14A and 14B).

The pixel electrode 751 (i, j) and the pixel electrode 751 (i, k) can have, for example, a comb shape, an opening, or a slit. Thus, an FFS mode liquid crystal element in which a common electrode is disposed below the pixel electrode can be used as the display element (see FIGS. 14A and 14B). Note that one embodiment of the present invention is not limited thereto.

For example, the pixel electrode 751 (i, j), the pixel electrode 751 (i, k), or the like can be disposed below the conductive film C1 or the conductive film C2 with an insulating film positioned therebetween.

The conductive film C1 or the conductive film C2 can have, for example, a comb shape, an opening, or a slit. Thus, an FFS mode liquid crystal element in which a common electrode is disposed over the pixel electrode can be used as the display element (see FIG. 14C).

The pixel electrode and the common electrode both can have, for example, a comb shape, an opening, or a slit. Thus, an IPS mode liquid crystal element can be used as the display element (see FIGS. 15A and 15B).

For example, the pixel electrode 751 (i, j), the pixel electrode 751 (i, k), or the like can be disposed under the conductive film C1 or the conductive film C2 with an insulating film positioned therebetween (see FIG. 15B). Note that one embodiment of the present invention is not limited thereto.

For example, the pixel electrode 751 (i, j), the pixel electrode 751 (i, k), or the like can be disposed over the conductive film C1 or the conductive film C2 with an insulating film positioned therebetween.

For example, the conductive film C1 or the conductive film C2 and the pixel electrode 751 (i, j) or the pixel electrode 751 (i, k) can be formed on the same plane (see FIG. 15C).

Note that one embodiment of the present invention is not limited to the case in which the conductive film C1 or the conductive film C2 has a function of an electrode of a touch sensor and a function of an electrode of a display element.

For example, a display element that includes a conductive film different from the conductive film C1 or the conductive film C2 having a function of an electrode of a touch sensor can be used. Specifically, a display element that includes the pixel electrode 751 (i, j) and a common electrode 754 can be used.

Figure 16A:
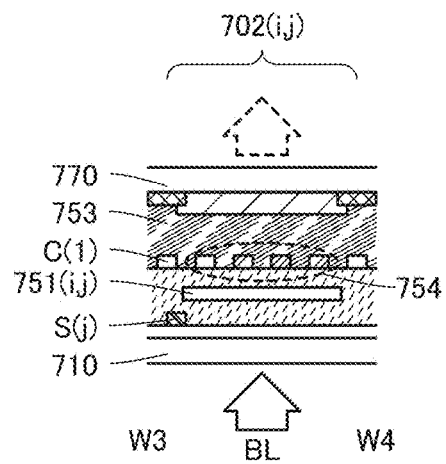
FIGS. 16A to 16F illustrate structures of an input device of an embodiment.

For example, FIG. 16A corresponds to FIG. 14C. Similarly, FIG. 16C corresponds to FIG. 14B. For example, FIG. 16E corresponds to FIG. 15B. Similarly, FIG. 16F corresponds to FIG. 15C.

Figure 16B:
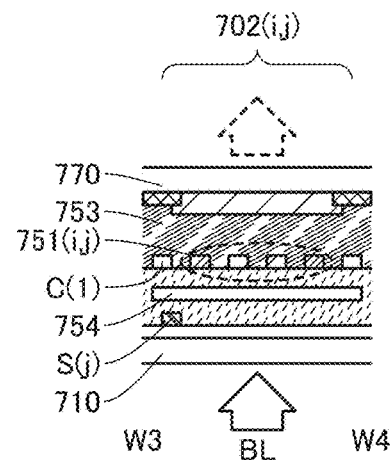

For example, the conductive film C1 that has a function of an electrode of a touch sensor can be disposed over an insulating film (see FIGS. 16A and 16B).

Figure 16C:
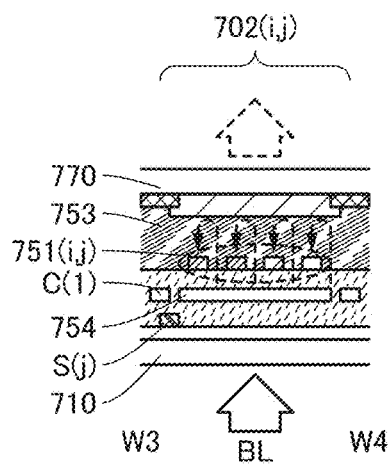
Figure 16D:
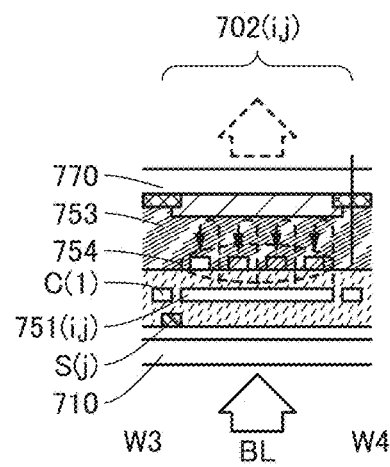
Figure 16E:
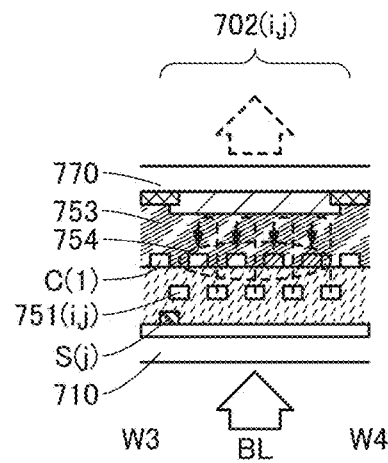
Figure 16F:
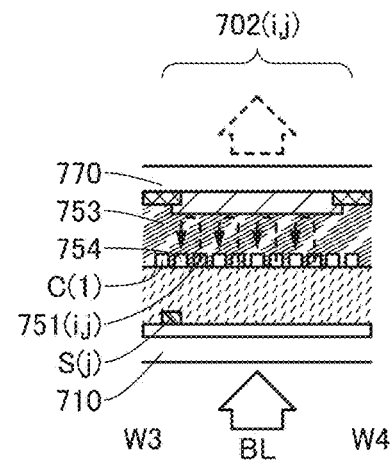

For example, the conductive film C1 that has a function of an electrode of a touch sensor can be disposed below the pixel electrode 751 (i, j) or the common electrode 754 with the insulating film positioned therebetween (see FIGS. 16C and 16D). Note that one embodiment of the present invention is not limited thereto.

The above-mentioned input/output device of one embodiment of the present invention includes a display device including a liquid crystal element, a plurality of conductive films configured to control the orientation of the liquid crystal material and be capacitively coupled to an object approaching a display surface side of the display device, a sensor circuit configured to supply a search signal and a sensing signal, and a driver circuit configured to select one from the plurality of conductive films in a predetermined order and be electrically connected to the sensor circuit or a wiring.

Thus, pixels can be rewritten in a predetermined order, and the object approaching the display surface side of the display device including a liquid crystal element can be sensed on the basis of a potential that is changed in accordance with the search signal and the capacitance coupled to the conductive film. Consequently, a novel input/output device that is highly convenient or reliable can be provided.

The input/output device 700 includes a base 710 and a base 770 including a region overlapping with the base 710 (see FIG. 14B).

The input/output device 700 includes a sealant (not shown) with which the base 770 and the base 710 are bonded to each other.

Note that the input/output device 700 includes the layer 753 containing a liquid crystal material in a region surrounded by the base 710, the base 770, and the sealant.

Individual components included in the input/output device 700 are described below. Note that these components cannot be clearly distinguished and one component may also serve as another component or include part of another component.

For example, the conductive film C1 is configured to be capacitively coupled to an approaching object and has a function of a common electrode of the display element 750 (i, j). The conductive film C2 is configured to be capacitively coupled to an approaching object and has a function of a common electrode of the display element 750 (i, k). The signal line ML1 is a wiring having a function of supplying a signal for a touch sensor and a function of a common wiring connected to an common electrode of a display element. Similarly, the signal line ML2 is a wiring having a function of supplying a signal for a touch sensor and a function of a common wiring connected to an common electrode of a display element.

<<Structure Example>>

The input/output device of one embodiment of the present invention includes the wiring COM in addition to the above-described structure.

The input/output device of one embodiment of the present invention includes the layer 753 containing a liquid crystal material and the pixel electrode 751 (i, j) or the pixel electrode 751 (i, k).

<<Wiring COM>>

A conductive material can be used for the wiring COM or the like.

For example, a material that can be used for the conductive film C1, the conductive film C2, the conductive film C (g, h), the signal line ML1, the signal line ML2, the signal line ML (g, h), the control line CL, or the like can be used for the wiring COM or the like.

For example, a wiring having a function of supplying a ground potential, a common potential, a power supply potential, or the like can be used as the wiring COM.

For example, a potential to be supplied to the signal line ML1 or the signal line ML2 can be used as a predetermined potential supplied by the wiring COM. Alternatively, a wiring that supplies different potentials can be used as the wiring COM.

For example, a potential supplied to a terminal of the display element 750 (i, j), the display element 750 (i, k), or the like can be used as a predetermined potential supplied by the wiring COM.

Specifically, a wiring having a function of supplying different two potentials alternately can be used as the wiring COM. Thus, voltages with inverse polarities can be supplied to the display element 750 (i, j), the display element 750 (i, k), or the like. That is, for common inversion driving of the display element, the potential of the wiring COM may be changed in a pulsed manner. As a result, for example, a liquid crystal element is used as the display element 750 (i, j), the display element 750 (i, k), or the like to improve the reliability of the input/output device 700. Furthermore, the power consumption can be reduced.

<<Driver Circuit 703>>

For example, the driver circuit 703 can include a shift register 301 or the like (see FIG. 12). Thus, one or more signal lines can be selected from the plurality of signal lines ML in a predetermined order and a selection signal can be supplied. The selection signal is supplied to, for example, a selection circuit 302.

For example, the driver circuit 703 can include the selection circuit 302. The selection circuit 302 includes a plurality of switches, for example. Moreover, the driver circuit 703 may include an inverter circuit in order to invert the selection signal. Thus, the sensor circuit DC1 or the wiring COM can be selected in accordance with the selection signal, and current can flow between the selected sensor circuit DC1 and the signal line ML or between the selected wiring COM and the signal line ML.

With the use of the shift register 301, a selection circuit can be sequentially selected from a plurality of selection circuits. For example, one can be selected from the signal line ML1, the signal line ML2, and the signal line ML3. As a result, current can flow between the sensor circuit DC1 and one signal line electrically connected to one selection circuit to which a selection signal is supplied. Alternatively, current can flow between the wiring COM and a signal line electrically connected to a selection circuit to which a selection signal line is not supplied. That is, by the selection signal output from the shift register, the conduction (on/off) state of the switch connected to the signal line ML (g, h) can be controlled. As a result, the conduction state between the signal line ML (g, h) and the wiring COM and the conduction state between the signal line ML (g, h) and the sensor circuit DC1 can be controlled.

<<Display Element 750 (i, j), Display Element 750 (i, k)>>

For example, a liquid crystal element that has a function of controlling light reflection or light transmission can be used as the display element 750 (i, j) or the display element 750 (i, k).

Specifically, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

Alternatively, a liquid crystal element that can be driven by a driving method such as a vertical alignment (VA) mode, specifically, a multi-domain vertical alignment (MVA) mode, a patterned vertical alignment (PVA) mode, or an advanced super view (ASV) mode can be used.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, or antiferroelectric liquid crystal can be used. These liquid crystal materials exhibit a cholesteric phase, a smectic phase, a cubic phase, a chiral nematic phase, an isotropic phase, or the like depending on conditions. Alternatively, a liquid crystal material that exhibits a blue phase can be used for the liquid crystal layer 753.

<<Pixel Electrode 751 (i, j) or Pixel Electrode 751 (i, k)>>

A conductive material can be used for the pixel electrode 751 (i, j), the pixel electrode 751 (i, k), or the like.

For example, a material that can be used for the conductive film C1, the conductive film C2, the signal line ML1, the signal line ML2, or the like can be used for the pixel electrode 751 (i, j) or the pixel electrode 751 (i, k).

<<Base 710, Base 770>>

A material having heat resistance high enough to withstand heat treatment in the manufacturing process can be used for the base 710 or 770. Note that a light-transmitting material can be used for the base 710 and the base 770.

For example, a large-sized glass substrate having any of the following sizes can be used as the base 710 or 770: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 710 or 770, an organic material, an inorganic material, a composite material of an organic material and an inorganic material, or the like can be used. For example, an inorganic material such as glass, ceramic, or metal can be used for the base 710 or 770.

Specifically, non-alkali glass, soda-lime glass, potash glass, crystal glass, quartz, sapphire, or the like can be used for the base 710 or 770. Specifically, an inorganic oxide film, an inorganic nitride film, a material containing an inorganic oxynitride, or the like can be used for the base 710 or 770. For example, a material containing silicon oxide, silicon nitride, silicon oxynitride, or aluminum oxide can be used for the base 710 or 770. For example, stainless steel or aluminum can be used for the base 710 or 770.

For example, a single-crystal semiconductor substrate or a polycrystalline semiconductor substrate made of silicon or silicon carbide, a compound semiconductor substrate made of silicon germanium or the like, or an SOI substrate can be used as the base 710 or 770. Thus, a semiconductor element can be provided over the base 710 or 770.

For example, an organic material such as a resin, a resin film, or plastic can be used for the base 710 or 770. Specifically, a resin film or resin plate of polyester, polyolefin, polyamide, polyimide, polycarbonate, an acrylic resin, or the like can be used for the base 710 or 770.

For example, a composite material formed by attaching a metal plate, a thin glass plate, or a film of an inorganic material to a resin film or the like can be used for the base 710 or 770. For example, a composite material formed by dispersing a fibrous or particulate metal, glass, an inorganic material, or the like into a resin film can be used as the base 710 or 770. For example, a composite material formed by dispersing a fibrous or particulate resin, an organic material, or the like into an inorganic material can be used as the base 710 or 770.

Furthermore, a single-layer material or a layered material in which a plurality of layers are stacked can be used for the base 710 or 770. For example, a layered material in which a base, an insulating film that prevents diffusion of impurities contained in the base, and the like are stacked can be used for the base 710 or 770. Specifically, a material obtained by stacking glass and one or a plurality of films that are selected from a silicon oxide layer, a silicon nitride layer, a silicon oxynitride layer, and the like and that prevent diffusion of impurities contained in the glass can be used for the base 710 or 770. Alternatively, a layered material in which a resin and a film for preventing diffusion of impurities that penetrate the resin, such as a silicon oxide film, a silicon nitride film, and a silicon oxynitride film are stacked can be used for the base 710 or 770.

Specifically, a resin film, a resin plate, a stack, or the like of polyester, polyolefin, polyamide, polyimide, polycarbonate, an acrylic resin, or the like can be used for the base 710 or 770.

Specifically, a material including polyester, polyolefin, polyamide (e.g., nylon or aramid), polyimide, polycarbonate, an acrylic resin, a urethane resin, an epoxy resin, a resin having a siloxane bond such as silicone, or the like can be used for the base 710 or 770.

Specifically, polyethylene terephthalate (PET), polyethylene naphthalate (PEN), polyethersulfone (PES), acrylic, or the like can be used for the base 710 or 770.

Alternatively, paper, wood, or the like can be used for the base 710 or 770.

For example, a flexible substrate can be used as the base 710 or 770.

Note that a transistor, a capacitor, or the like can be directly formed on the substrate. Alternatively, a method in which a transistor, a capacitor, or the like is formed over a substrate for use in manufacturing processes which can withstand heat applied in the manufacturing process and is transferred to the base 710 or 770 can be employed. Thus, a transistor, a capacitor, or the like can be formed over a flexible substrate, for example.

<Structural Example 3 of Input/Output Device>

Another structure of the input/output device of one embodiment of the present invention is described with reference to FIG. 13.

Note that the input/output device described here differs from the aforementioned input/output device 700 in that the input/output device includes a plurality of sensor circuits and the driver circuit 703B instead of the driver circuit 703. Here, the above description is referred to for the similar structures, and different structures are described in detail.

The wiring COM is electrically connected to the driver circuit 703B, and has a function of supplying a predetermined potential.

The driver circuit 703B can select two or more selection circuits from the plurality of selection circuits. Therefore, the driver circuit 703B has a function of selecting at least two of the signal line ML1, the signal line ML2, the signal line ML3, the signal line ML4, the signal line ML5, and the signal line ML6, for example.

The driver circuit 703B has a function of, for example, letting current flow between the signal line ML1 and the sensor circuit DC11 and letting current flow between the signal line ML2 and the sensor circuit DC12 in a period during which the signal line ML1 and the signal line ML2 are selected. The driver circuit 703B has a function of, for example, letting current flow between the signal lines ML1 and ML2 and the wiring COM in a period during which the signal line ML1 and the signal line ML2 are not selected. Here, the case where the signal line ML1 and the signal line ML2 are selected is described, the same can be applied to the case where other signal lines are selected. In addition, the case where two selection circuits are selected from the plurality of selection circuits are described here, but the number of selected circuits may be three or more.

Note that the plurality of signal lines ML selected at the same time may be positioned apart from each other. For example, the signal lines ML selected at the same time are not limited to a combination of the signal line ML1 and the signal line ML2 and may be a combination of the signal line ML1 and the signal line ML6. In the case where signal lines ML positioned apart from each other are selected, crosstalk can be prevented.

The sensor circuit DC11 and the sensor circuit DC12 have a function similar to that of the sensor circuit DC1, and for example, have a function of supplying a search signal.

The input/output device of one embodiment of the present invention includes a display device including a liquid crystal element, a plurality of conductive films that has a function of controlling the orientation of a liquid crystal material and that is configured to be capacitively coupled to an object approaching a display surface side of the display device, a plurality of sensor circuits having a function of supplying a search signal and a sensing signal, and a driver circuit which has a function of selecting two or more conductive films from a plurality of conductive films in a predetermined order and which is electrically connected to the sensor circuit or a wiring.

Thus, pixels can be rewritten in a predetermined order, and the object approaching the display surface side of the display device including a liquid crystal element can be sensed on the basis of a potential that is changed in accordance with the search signal and the capacitance coupled to the conductive film. Consequently, a novel input/output device that is highly convenient or reliable can be provided.

<<Driver Circuit 703B>>

For example, a shift register having a function of supplying a selection signal can be used for the driver circuit 703B (see FIG. 13).

For example, a selection circuit that controls a conduction state between the sensor circuit DC11 or the wiring COM and the signal line in accordance with the selection signal can be used for the driver circuit 703B. Alternatively, a selection circuit that controls a conduction state between the sensor circuit DC12 or the wiring COM and the signal line in accordance with the selection signal can be used for the driver circuit 703B.

Thus, two or more selection circuits can be selected from a plurality of selection circuits in a predetermined order with use of the shift register. As a result, current can flow between the sensor circuit DC11 and a signal line electrically connected to a selection circuit to which the selection signal is supplied, between sensor circuit DC12 and a signal line electrically connected to another selection circuit to which the selection signal is supplied, and between the wiring COM and a signal line electrically connected to a selection circuit to which the selection signal is not supplied.

<<Sensor Circuit DC11, Sensor Circuit DC12>>

For example, the structure that can be used for the sensor circuit DC1 described in Embodiment 1 can be used for the sensor circuit DC11 and the sensor circuit DC12 in this embodiment.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of another embodiment.

Embodiment 3

In this embodiment, a structure of an input device 700TC which is one embodiment of the present invention is described with reference to FIGS. 17A to 17C.

Note that the input device 700TC differs from the input device 700T described with reference to FIGS. 1A to 1C in that the conductive film C1 and the conductive film C2 are arranged such that an electric field that is shielded by an approaching object is formed between the conductive film C1 and the conductive film C2, that the driver circuit 703C is included instead of the driver circuit 703, that a sensor circuit DC2 is included instead of the sensor circuit DC1, and signals supplied to and read from the conductive film C1 and the conductive film C2.

Note that the layouts and the structures of the conductive film C1, the conductive film C2, and the like are similar to those of the input device 700T described with reference to FIGS. 1A to 1C. Thus, the description for the input device 700T can be similarly applied to the input device 700TC of one embodiment of the present invention. Here, the above description is referred to for the similar structures, and different structures will be described in detail.

<Structure Example of Input Device>

The input device 700TC described in this embodiment includes the conductive film C1, the conductive film C2, the signal line ML1, and the signal line ML2 (see FIG. 17B) like the input device 700T. Note that conductive films selected from the plurality of conductive films C can be used for the conductive film C1 and the conductive film C2 (see FIG. 17A).

The conductive film C2 has a region not overlapping with the conductive film C1. For example, a conductive film adjacent to the conductive film C1 can be used as the conductive film C2. Alternatively, a conductive film may be provided between the conductive film C1 and the conductive film C2.

The signal line ML1 is electrically connected to the conductive film C1. The signal line ML2 is electrically connected to the conductive film C2 (see FIG. 17B).

Figure 17A:
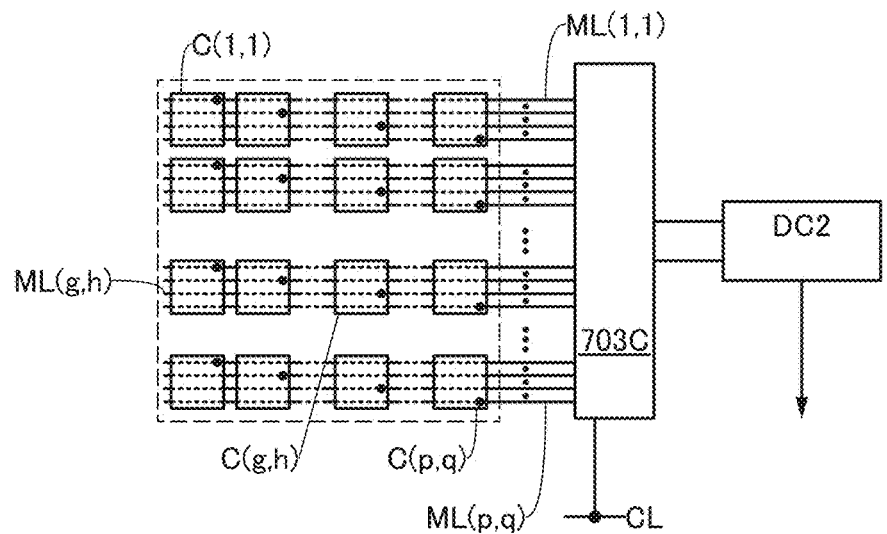
FIGS. 17A to 17C illustrate a structure of a pixel of an embodiment.
Figure 17B:
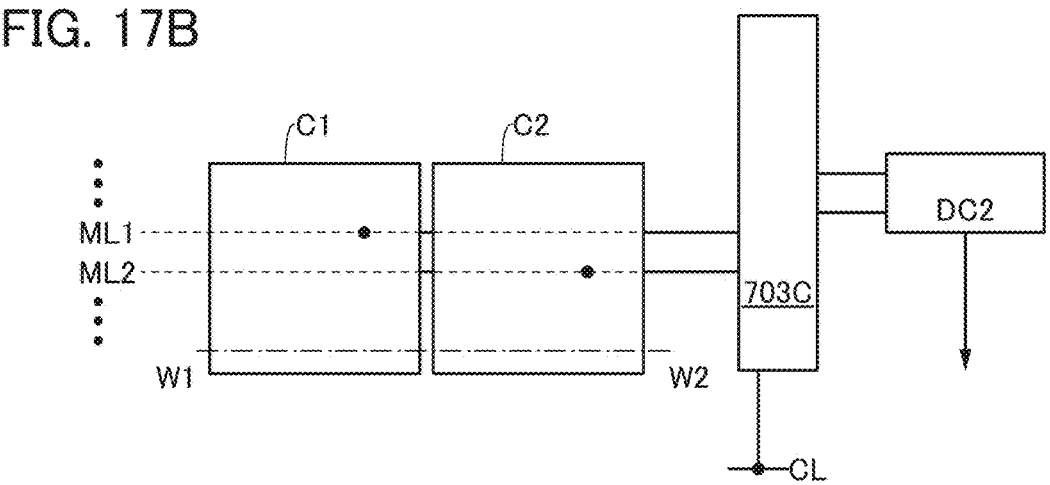
Figure 17C:
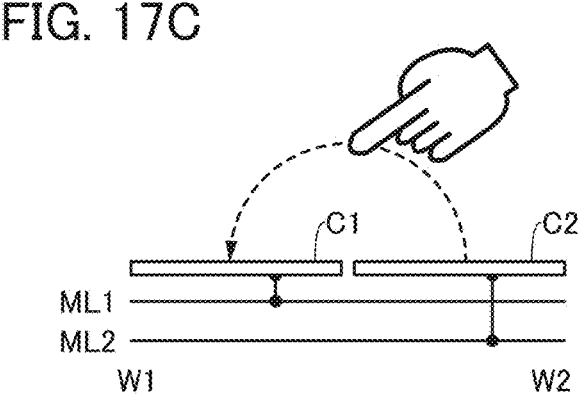

The conductive film C1 and the conductive film C2 are configured to be capacitively coupled to each other (see FIG. 17C). For example, the plurality of conductive films C are capacitively coupled to one another. Specifically, capacitive coupling is formed between the conductive film C1 and the conductive film C2.

The capacitance value between the conductive films is changed by an object approaching a region between the conductive films. Thus, an object such as a finger or a pen approaching the region between the conductive film C1 and the conductive film C2 can be sensed with a change in the capacitance value between the conductive film C1 and the conductive film C2. In other words, the approach of an object such as a finger or a pen is sensed with a change in mutual capacitance between the conductive film C1 and the conductive film C2.

As an example, the input device 700TC includes the driver circuit 703C and the sensor circuit DC2 (see FIG. 17A). In some cases, the input device 700TC does not include the driver circuit 703C, the sensor circuit DC2, or the like, and another device or module includes the driver circuit 703C, the sensor circuit DC2, or the like.

As an example, the driver circuit 703C may be provided in a manner similar to that of the driver circuit 703. For example, the driver circuit 703C may be provided on the same substrate as the plurality of conductive films C or the plurality of signal lines ML. Similarly, for example, the sensor circuit DC2 may be provided in a manner similar to that of the sensor circuit DC1.

The driver circuit 703C is electrically connected to the signal line ML1 and the signal line ML2, for example.

The sensor circuit DC2 is electrically connected to the driver circuit 703C, for example.

The driver circuit 703C has a function of selecting at least two of the plurality of signal lines ML, for example.

The driver circuit 703C has a function of sequentially selecting at least two of the plurality of signal lines ML, for example.

The driver circuit 703C has a function of selecting at least two of the plurality of signal lines ML in an appropriate order, for example.

For example, the driver circuit 703C has a function of a multiplexer or a demultiplexer. The driver circuit 703C has a function of selecting the signal line ML1 and the signal line ML2.

Specifically, the driver circuit 703C has a function of selecting two signal lines from signal lines ML (1, 1) to ML (p, q) in a predetermined order. Alternatively, the driver circuit 703C has a function of selecting at least two of the plurality of conductive films C. Alternatively, the driver circuit 703C has a function of selecting the conductive film C1 and the conductive film C2, for example.

Note that two driver circuits 703C may be provided, for example. One may have a function of selecting one signal line ML from the plurality of signal lines ML, and the other may have a function of selecting another signal line ML from the plurality of signal lines ML.

For example, the driver circuit 703C has a function of letting current flow between each of the signal lines ML1 and ML2 and the sensor circuit DC2 in a period during which the signal lines ML1 and ML2 are selected.

Alternatively, the driver circuit 703C has a function of preventing current from flowing between each of the signal lines ML1 and ML2 and the sensor circuit DC2 in a period during which the signal lines ML1 and ML2 are not selected.

Alternatively, the driver circuit 703C has a function of bringing the signal lines ML1 and ML2 into a floating state in the period during which the signal lines ML1 and ML2 are not selected.

Alternatively, the driver circuit 703C has a function of supplying a predetermined voltage, for example, a constant voltage, to the signal lines ML1 and ML2, in the period during which the signal lines ML1 and ML2 are not selected. Note that the driver circuit 703C is simply called circuit, first circuit, second circuit, or the like, in some cases.

For example, in the case where the driver circuit 703C is not used, the plurality of signal lines ML is connected to the sensor circuit DC2. In that case, each signal line ML needs a circuit for supplying a signal or a circuit for reading a signal in the sensor circuit DC2; alternatively, one sensor circuit DC2 needs to be connected to each of the signal lines ML.

In the case where the driver circuit 703C is provided, for example, at least two of the plurality of signal lines ML are selected, and the selected signal lines ML are changed every certain period; thus, the circuit for supplying a signal or a circuit for reading a signal is provided in accordance with the selected two signal lines ML. That is, it is not necessary that such a circuit be provided by the number of signal lines ML. Alternatively, because one sensor circuit DC2 is provided with respect to the selected two signal lines ML, it is not necessary to provide a plurality of sensor circuits DC2. Accordingly, the number or the size of circuits in the sensor circuit DC2 can be reduced. Alternatively, the number of sensor circuits DC2 can be reduced.

The sensor circuit DC2 has a function of supplying a search signal, for example. Here, the search signal refers to, for example, a signal supplied for sensing to the signal line ML (g, h) or the conductive film C (g, h).

For example, the sensor circuit DC2 has a function of supplying a square wave search signal. Alternatively, the sensor circuit DC2 has a function of supplying a pulse signal. Alternatively, the sensor circuit DC2 has a function of supplying a signal to a sensor.

Alternatively, the sensor circuit DC2 has a function of sensing a change in the capacitance value. Alternatively, the sensor circuit DC2 has a function of sensing a current value. Alternatively, the sensor circuit DC2 has a function of sensing the amount of charge. Alternatively, the sensor circuit DC2 has a function of integrating a signal. Alternatively, the sensor circuit DC2 has a function of converting current into voltage. Alternatively, the sensor circuit DC2 has a function of sensing a voltage value. Alternatively, the sensor circuit DC2 has a function of converting an analog signal into a digital signal.

The sensor circuit DC2 has a function of reading a signal from the sensor. Therefore, the sensor circuit DC2 is simply called circuit, first circuit, second circuit, or the like, in some cases.

The signal line ML1 has a function of receiving a search signal.

The signal line ML2 has a function of outputting a signal (current) that changes on the basis of the search signal and the capacitance value of the mutual capacitance formed between the conductive film C1 and the conductive film C2 (see FIG. 17C).

For example, when a pulse signal is supplied to the signal line ML1, current flows from the signal line ML1 to the signal line ML2 through the mutual capacitance formed between the conductive film C1 and the conductive film C2.

For example, when a finger or the like of a user of the input device approaches the conductive film C1 or the conductive film C2, an electric field formed between the conductive film C1 and the conductive film C2 is partly blocked, so that the capacitance value of the mutual capacitance formed between the conductive film C1 and the conductive film C2 is reduced. As a result, the value of current flowing from the signal line ML1 to the signal line ML2 is reduced due to the influence of an object such as a finger approaching the input device.

The sensor circuit DC2 has a function of sensing the amount of current that changes in accordance with the capacitance value of the mutual capacitance formed between the conductive film C1 and the conductive film C2. For example, the value of current flowing in the mutual capacitance formed between the conductive film C1 and the conductive film C2 can be changed by the finger approaching the input device 700TC. Thus, the finger or the like of the user approaching the input device can be sensed.

The above-mentioned input device 700TC of one embodiment of the present invention includes one conductive film and another conductive film between which an electric field is formed, a driver circuit that selects these conductive films in a predetermined order, and a sensor circuit configured to supply a search signal to the one conductive film and supply a sensing signal based on a change in potential of the other conductive film. Thus, the object approaching the conductive film can be sensed on the basis of a potential that is changed in accordance with an electric field that is blocked between the plurality of conductive films and the search signal. Consequently, a novel input device that is highly convenient or reliable can be provided.

Note that the input device 700TC can be used as a mutual capacitive touch panel.

For example, the input device 700TC can be configured to read a signal using mutual capacitance formed between some conductive films selected from the plurality of conductive films C and other conductive films selected from the plurality of conductive films C. Specifically, a signal may be read by using mutual capacitance formed in the center or near the center of the selected conductive films.

For example, a plurality of conductive films arranged in the vertical direction is connected so as to be used as one electrode and a plurality of conductive films arranged in the horizontal direction is connected so as to be used as the other electrode. The largest mutual capacitance is formed in the vicinity of intersection by the use of the one electrode in which the plurality of conductive films is connected in the vertical direction and the other electrode in which the plurality of conductive films is connected in the horizontal direction. An object such as a finger is easily sensed as the mutual capacitance to be formed is larger; thus, the object such as a finger can be mainly sensed in the vicinity of the intersection.

For example, a signal may be read by the use of mutual capacitance between some conductive films selected from the plurality of conductive films C and the conductive film C1. In that case, the number of conductive films not related to sensing of an object such as a finger can be reduced. As a result, mutual capacitance formed between the conductive films not related to the sensing of an object such as a finger and conductive films related to the sensing of an object such as a finger can be reduced, and the influence of the conductive films not related to the sensing can be reduced. Thus, reading sensitivity can be increased.

For example, a signal may be read by using mutual capacitance formed between the conductive film C1 and the conductive film C2 selected from the plurality of conductive films C.

Furthermore, the input device 700TC can include the plurality of conductive films C arranged such that an electric field that is shielded by an approaching object is formed. Specifically, q conductive films C can be arranged in a row direction and p conductive films C can be arranged in a column direction which intersects with the row direction (see FIG. 17A). For example, in the case where the conductive films C are arranged in a matrix of p rows and q columns, p×q conductive films C are provided.

The input device 700TC includes the driver circuit 703C which selects the plurality of conductive films C arranged such that an electric field that is shielded by an approaching object is formed. As a specific example, the input device 700TC includes the driver circuit 703C which selects a pair of adjacent conductive films C.

<<Structure Example>>

The input device of one embodiment of the present invention includes the conductive film C1, the conductive film C2, the signal line ML1, and the signal line ML2. The input device of one embodiment of the present invention can include the conductive film C (g, h) and the signal line ML (g, h). Note that g is an integer greater than or equal to 1 and less than or equal to p, h is an integer greater than or equal to 1 and less than or equal to q, and each of p and q is an integer greater than or equal to 1. The input device of one embodiment of the present invention can include the driver circuit 703C, the sensor circuit DC2, and the control line CL.

<<Driver Circuit 703C>>

For example, any of a variety of sequential circuits, such as a selection circuit or a shift register, can be used in the driver circuit 703C.

Specifically, a shift register that includes a plurality of selection circuits and has a function of supplying the selection signals, or the like may be used in the driver circuit 703C. Accordingly, two or more signal lines can be selected from the plurality of signal lines in a predetermined order. For example, in the case where six signal lines ML1 to ML6 are selected, various selection patterns are provided.

For example, the following pattern is proposed. First, the signal line ML1 and the signal line ML2 are selected; next, the signal line ML3 and the signal line ML4 are selected; then, the signal line ML5 and the signal line ML6 are selected.

As another pattern, the signal lines are selected by shifting one by one. For example, the signal line ML1 and the signal line ML2 are selected; then, the signal line ML2 and the signal line ML3 are selected; then, the signal line ML3 and the signal line ML4 are selected; then, the signal line ML4 and the signal line ML5 are selected; and then, the signal line ML5 and the signal line ML6 are selected.

Note that like the conductive film C1 and the conductive film C2, the signal lines are selected such that the selected conductive films are arranged in the horizontal direction; one embodiment of the present invention is not limited to this. The conductive films may be selected such that the selected conductive films are arranged in the vertical direction.

For example, a transistor can be used for the driver circuit 703C.

<<Sensor Circuit DC2>>

For example, an oscillator circuit, a pulse signal output circuit, a current measurement circuit, a peak current measurement circuit, a current voltage conversion circuit, an integrator circuit, an AD conversion circuit, or an amplifier circuit can be used for the sensor circuit DC2.

An oscillator circuit or a pulse signal output circuit capable of generating a square wave, a sawtooth wave, or a triangular wave can be used as the sensor circuit DC2, for example. Accordingly, a signal generated from such a circuit can be used as a search signal. That is, a signal needed for reading a signal from a sensor can be output to the sensor when a signal line is selected. Furthermore, whether a finger, a pen, or the like approaches a conductive film is sensed by the value of current flowing at that time, or the like. The sensed result can be given to an external circuit as a sensing signal. In order to sense the state of a sensor electrode, a current measurement circuit, a peak current measurement circuit, a current voltage conversion circuit, an integrator circuit, an AD conversion circuit, or the like is used in some cases. Note that in a period where the signal line ML is not selected, the signal line ML can be brought into a floating state or a constant voltage can be output to the signal line ML. Note that the constant voltage corresponds to a common voltage supplied to a display element in some cases.

For example, in the case where a potential is sensed, an amplifier circuit capable of amplifying a change in the potential of the signal line ML (g, h) connected to the amplifier circuit can be used for the sensor circuit DC2. Accordingly, the change in the potential of the signal line ML (g, h) can be amplified and supplied as a sensing signal.

For example, a first terminal electrically connected to the oscillator circuit and a second terminal electrically connected to the amplifier circuit can be used for the sensor circuit DC2. Accordingly, a generated signal can be supplied to the first terminal and an amplified potential can be supplied to the second terminal.

Figure 18A:
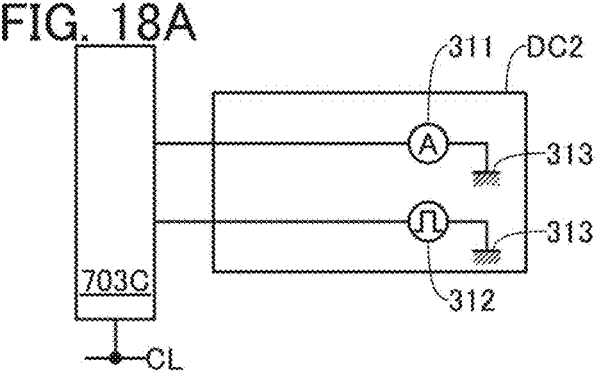
FIGS. 18A to 18D illustrate structures of an input device of an embodiment.

Next, an example of the sensor circuit DC2 is described. FIG. 18A shows an example of the case where the sensor circuit DC2 includes the current measurement unit 311 and the pulse signal output circuit 312. Each of the current measurement unit 311 and the pulse signal output circuit 312 is connected in series between the driver circuit 703C and the ground line 313. Note that a potential supplied to the ground line 313 is not necessarily 0 V. Furthermore, the current measurement unit 311 and the pulse signal output circuit 312 may be connected to the same wiring, for example, the ground line 313, or to different wirings.

A pulse signal is output from the pulse signal output circuit 312. The pulse signal is supplied to the conductive film C (g, h), the conductive film C1, the conductive film C2, and the like through the driver circuit 703. Then, the amount of current flowing at that time is sensed by the current measurement unit 311.

At this time, in the case where an object such as a finger or a pen approaches the conductive film C (g, h), the conductive film C1, the conductive film C2, and the like, the capacitance value of mutual capacitance of the conductive film C (g, h), the conductive film C1, the conductive film C2, and the like is reduced. Thus, in the case where an object such as a finger or a pen approaches, current sensed by the current measurement unit 311 is reduced. That is, the amount of current is sensed by the current measurement unit 311, whereby touch sensing can be performed.

Figure 18B:
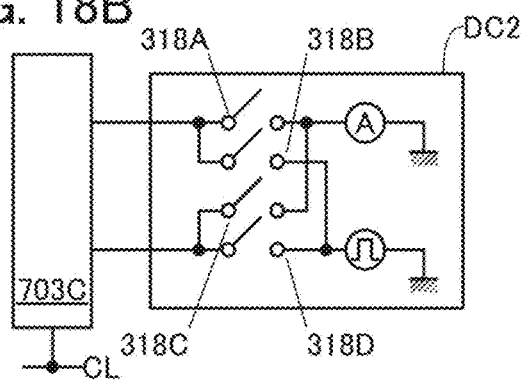
Figure 18C:
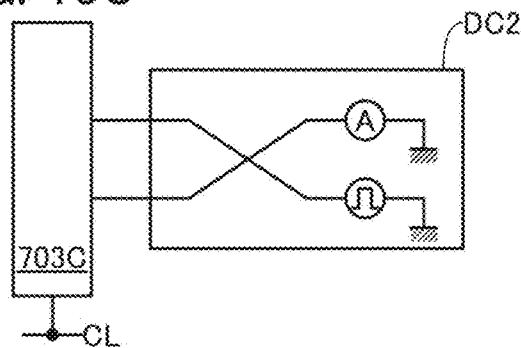

Note that as shown in FIG. 18B, a wiring which is brought into conduction with the driver circuit 703C may be changed with the use of a switch 318A, a switch 318B, a switch 318C, a switch 318D, or the like so that the conduction state is changed between the states in FIG. 18A and FIG. 18C.

Figure 18D:
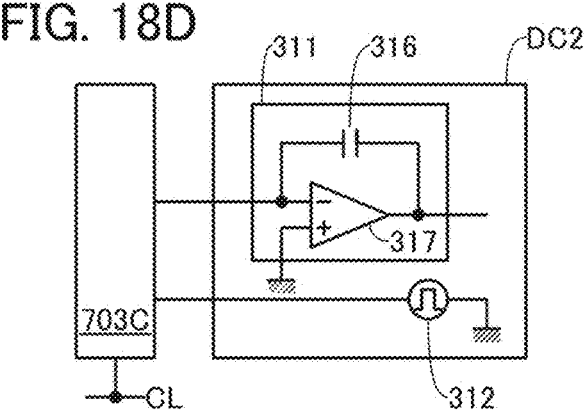

FIG. 18D shows a specific example of the current measurement unit 311. Here, the current measurement unit 311 includes the capacitor 316 and the operation amplifier 317. An integrator circuit can be formed with the use of the operation amplifier 317.

Data sensed by the sensor circuit DC2 is sent to a next circuit. Examples of the next circuit include a memory circuit and a signal processing circuit. The next circuit can determine which position is touched. Note that the next circuit may be placed in the sensor circuit DC2.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of any of the other embodiments.

Embodiment 4

In this embodiment, a structure of an input/output device of one embodiment of the present invention is described with reference to FIGS. 19A to 19D.

Figure 19A:
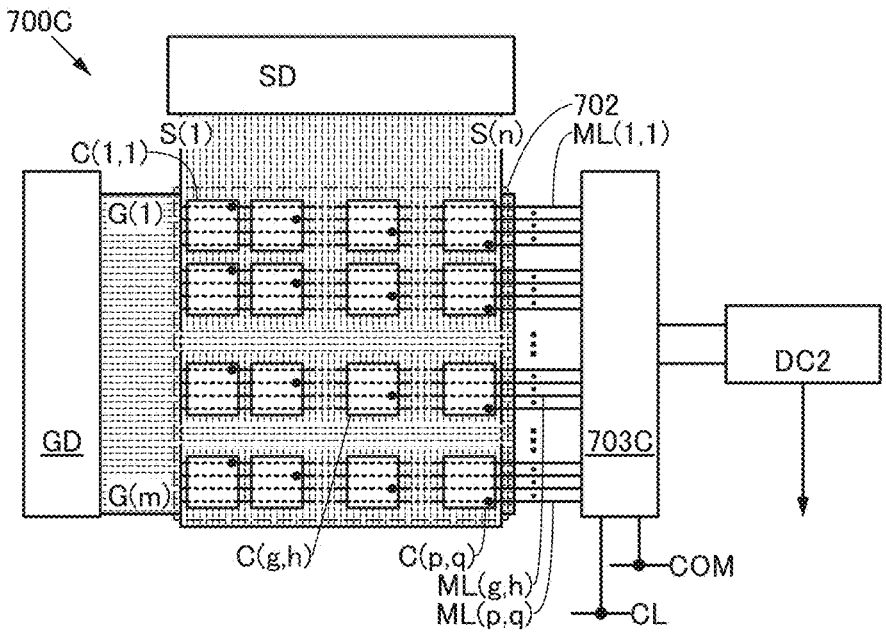
FIGS. 19A to 19D illustrate a structure of an input device of an embodiment.
Figure 19B:
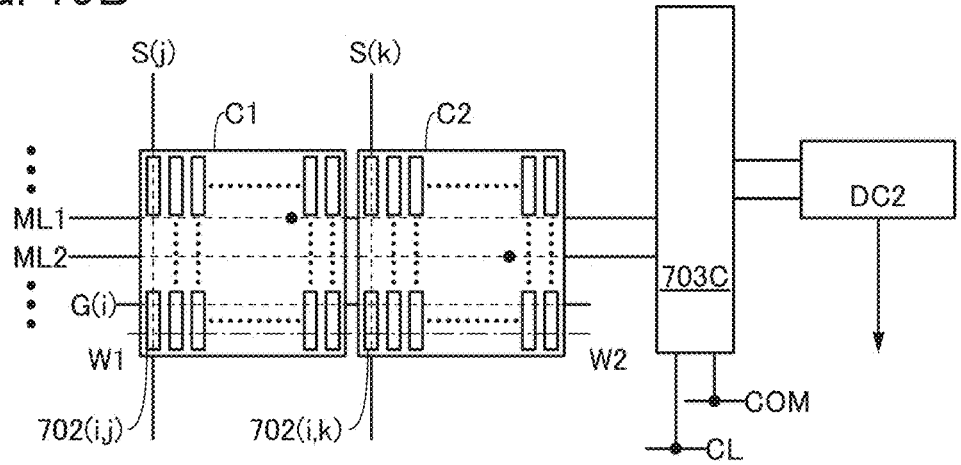
Figure 19C:
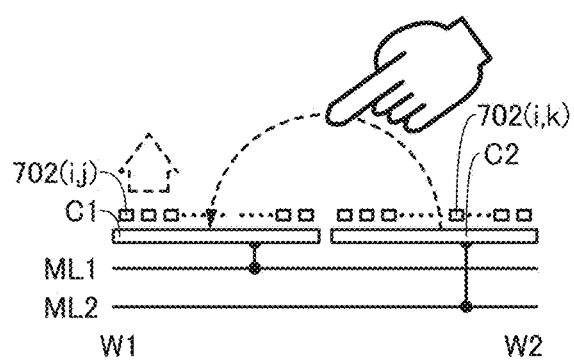
Figure 19D:
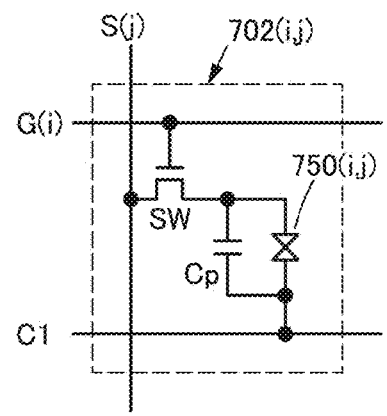

FIGS. 19A to 19D illustrate the structure of an input/output device 700C of one embodiment of the present invention. FIG. 19A is a block diagram illustrating the structure of the input/output device 700C of one embodiment of the present invention. FIG. 19B is a block diagram illustrating part of the input/output device 700C in FIG. 19A in detail. FIG. 19C is a cross-sectional view of the input/output device 700C taken along the section line W1-W2 in FIG. 19B. FIG. 19D is a circuit diagram illustrating the display element 750 (i, j) and a pixel circuit which can be used in the pixel 702 (i, j).

Note that the input/output device 700C differs from the input device 700TC described with reference to FIGS. 17A to 17C in that a display device is provided. In other words, the input/output device 700C has portions similar to those of the input device 700TC. Thus, the above description of the input device 700TC can be similarly applied to the input/output device 700C. Here, the above description is referred to for structures of the similar portions, and different portions are described in detail.

<Structure Example 1 of Input/Output Device>

The input/output device 700C described in this embodiment includes the display device and the input device 700TC (see FIG. 19A). That is, the input/output device 700C has a structure in which the input device 700TC is added to the display device, and specifically, a structure in which the input device 700TC is incorporated in part of the display device. Thus, a member functions as part of the display device and also functions as part of the input device 700TC.

The input device 700TC has a function of sensing an object approaching the display side of the display device (see FIG. 19C).

The display device (output device) includes the pixel 702 (i, j) arranged in a region where the conductive film C1 is provided and the pixel 702 (i, k) arranged in a region where the conductive film C2 is provided (see FIGS. 19B and 19C).

For example, the pixel 702 (i, j) includes the display element 750 (i, j) and the pixel 702 (i, k) includes the display element 750 (i, k). FIG. 19D illustrates an example of the circuit of the pixel 702 (i, j).

The above-mentioned input/output device of one embodiment of the present invention includes a display device, one conductive film configured to be capacitively coupled to an object approaching a display surface side of the display device, another conductive film that form an electric field with the one conductive film, a driver circuit that selects these conductive films in a predetermined order, and a sensor circuit configured to supply a search signal to the one conductive film and supply a sensing signal based on a change in potential of the other conductive film. Thus, the object approaching the display surface side of the display device can be sensed on the basis of a potential that is changed in accordance with an electric field that is blocked between the plurality of conductive films and the search signal. Consequently, a novel input/output device that is highly convenient or reliable can be provided.

The input/output device 700C includes a plurality of pixels (see FIG. 19B). For example, the input/output device 700C includes n pixels in the horizontal direction and m pixels in the vertical direction. That is, the input/output device 700C includes the pixels 702 (i, j) arranged in a matrix of m rows by n columns. Note that i is an integer greater than or equal to 1 and less than or equal to m, each of j and k is an integer greater than or equal to 1 and less than or equal to n, and each of m and n is an integer greater than or equal to 1. Note that k is different from j.

Furthermore, the pixel 702 (i, j) can have a pixel circuit that drives the display element 750 (i, j), and the pixel 702 (i, k) can have a pixel circuit that drives the display element 750 (i, k). FIG. 19D illustrates the pixel circuit of the pixel 702 (i, j). Note that the pixel 702 (i, j) or the pixel 702 (i, k) may include a plurality of display elements.

In addition, the input/output device 700C can include a scan line G (i) electrically connected to pixels 702 (i, 1) to 702 (i, n) arranged in the same row.

In addition, the input/output device 700C can include a signal line S (j) electrically connected to pixels 702 (1, j) to 702 (m, j) arranged in the same column.

Furthermore, the input/output device 700C includes the driver circuit GD electrically connected to the scan lines G (1) to G (m). The driver circuit GD has functions of selecting one of the scan lines G (1) to G (m) and supplying a selection signal to the scan lines G (1) to G (m), the pixel 702 (i, j), or the like.

Furthermore, the input/output device 700C includes the driver circuit SD electrically connected to the signal lines S (1) to S(n). The driver circuit SD has a function of supplying a video signal to the signal lines S (1) to S (n), the pixel 702 (i, j), or the like.

<<Structure Example>>

The input/output device 700C of one embodiment of the present invention includes the display device or the input device 700TC.

The input/output device 700C of one embodiment of the present invention includes the pixel 702 (i, j) or the pixel 702 (i, k).

The input/output device 700C of one embodiment of the present invention includes the pixel element 750 (i, j) or the display element 750 (i, k).

The input/output device 700C of one embodiment of the present invention includes the scan line G (i), the signal line S (j), the driver circuit GD, or the driver circuit SD.

<<Input Device>>

As the input/output device 700C of one embodiment of the present invention, an input device including the conductive film C1 or the conductive film C2 which is configured to be capacitively coupled to an object approaching the display surface side of the display device can be used.

For example, a light-transmitting conductive film can be used as the conductive film C1 or the conductive film C2. Alternatively, a conductive film having an opening, a slit, a comb shape, a lattice shape, or the like in a region where the display element is provided can be used as conductive film C1 or the conductive film C2. Thus, the conductive film C1 or the conductive film C2 can be provided between the display element and a user.

<<Display Device>>

For example, an active matrix display device or a passive matrix display device can be used. Instead of using the display device, a lighting device with which a video or an image is not displayed may be used.

<<Display Element 750 (i, j), 750 (i, k)>>

For example, structures that can be used for the display elements 750 (i, j) and 750 (i, k) described in Embodiment 2 can be employed.

<<Pixel 702 (i, j), 702 (i, k)>>

For example, the switching element SW, the capacitor Cp, and the like can be used in the pixel 702 (i, j) or the pixel 702 (i, k). FIG. 19D shows an example of the pixel 702 (i, j).

Specifically, a transistor can be used as the switching element SW. For example, the transistor that can be used in the driver circuit 703 described in Embodiment 1 can be used as the switching element SW.

<<Scan Line G (i), Signal Line S (j)>>

For example, structures that can be used for the scan line G (i) and the signal line S (j) described in Embodiment 2 can be used for those of the scan line G (i) and the signal line S (j) in this embodiment.

<<Driver Circuit GD>>

For example, a structure that can be used for the driver circuit GD described in Embodiment 2 can be used for the driver circuit GD in this embodiment.

<<Driver Circuit SD>>

For example, a structure that can be used for the driver circuit SD described in Embodiment 2 can be used for the driver circuit SD in this embodiment.

<Structure Example 2 of Input/Output Device>

Another structure of the input/output device of one embodiment of the present invention is described with reference to FIGS. 14A to 14C, FIGS. 19A to 19D, and FIG. 20.

Note that the above description is referred to for similar structures, and the structure of using a wiring COM and the structure of using liquid crystal elements in the pixels 702 (i, j) and (i, k) of the display device are described in detail.

Figure 20:
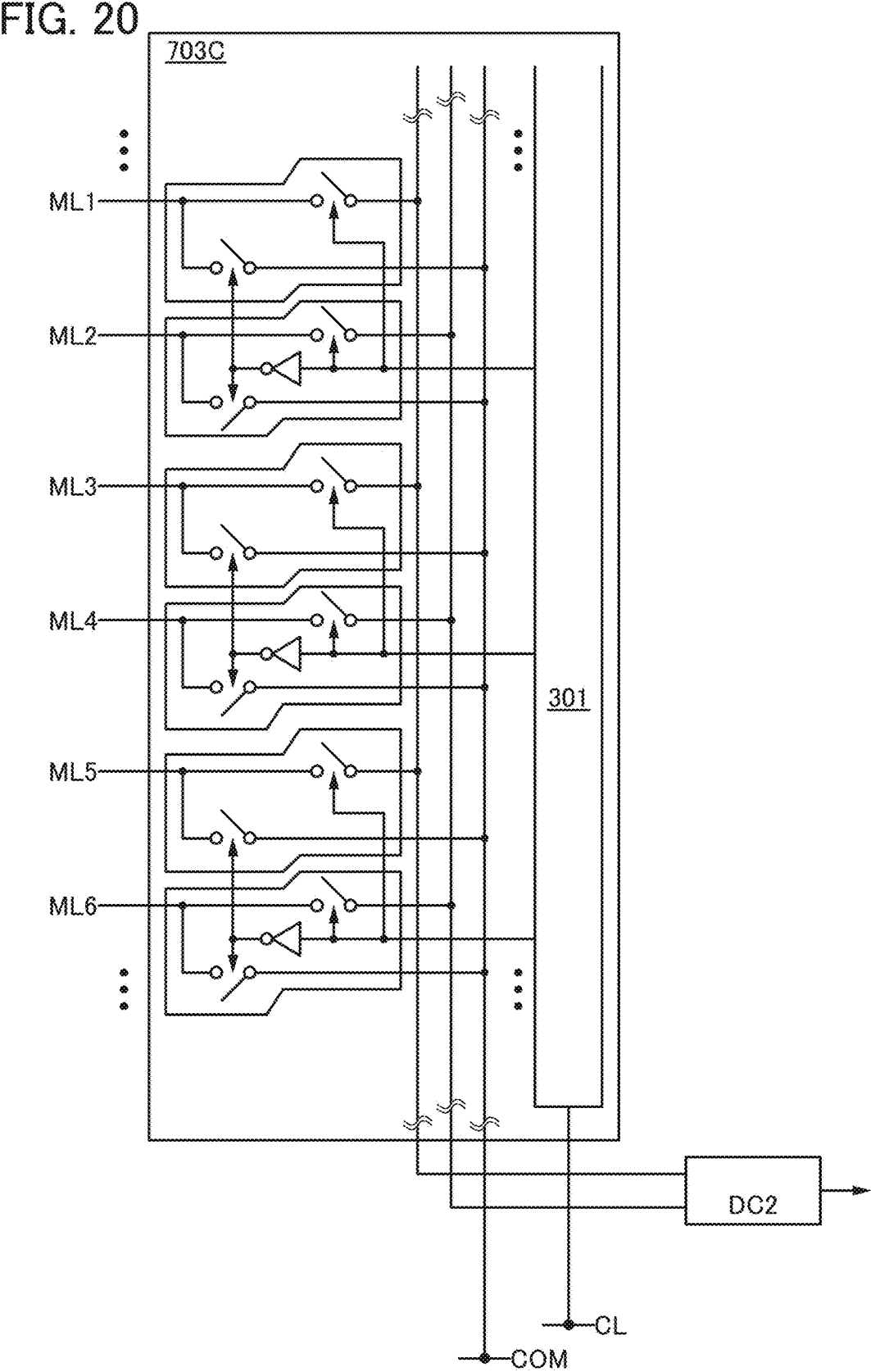
FIG. 20 illustrates a structure of a driver circuit of an embodiment.
Figure 21:
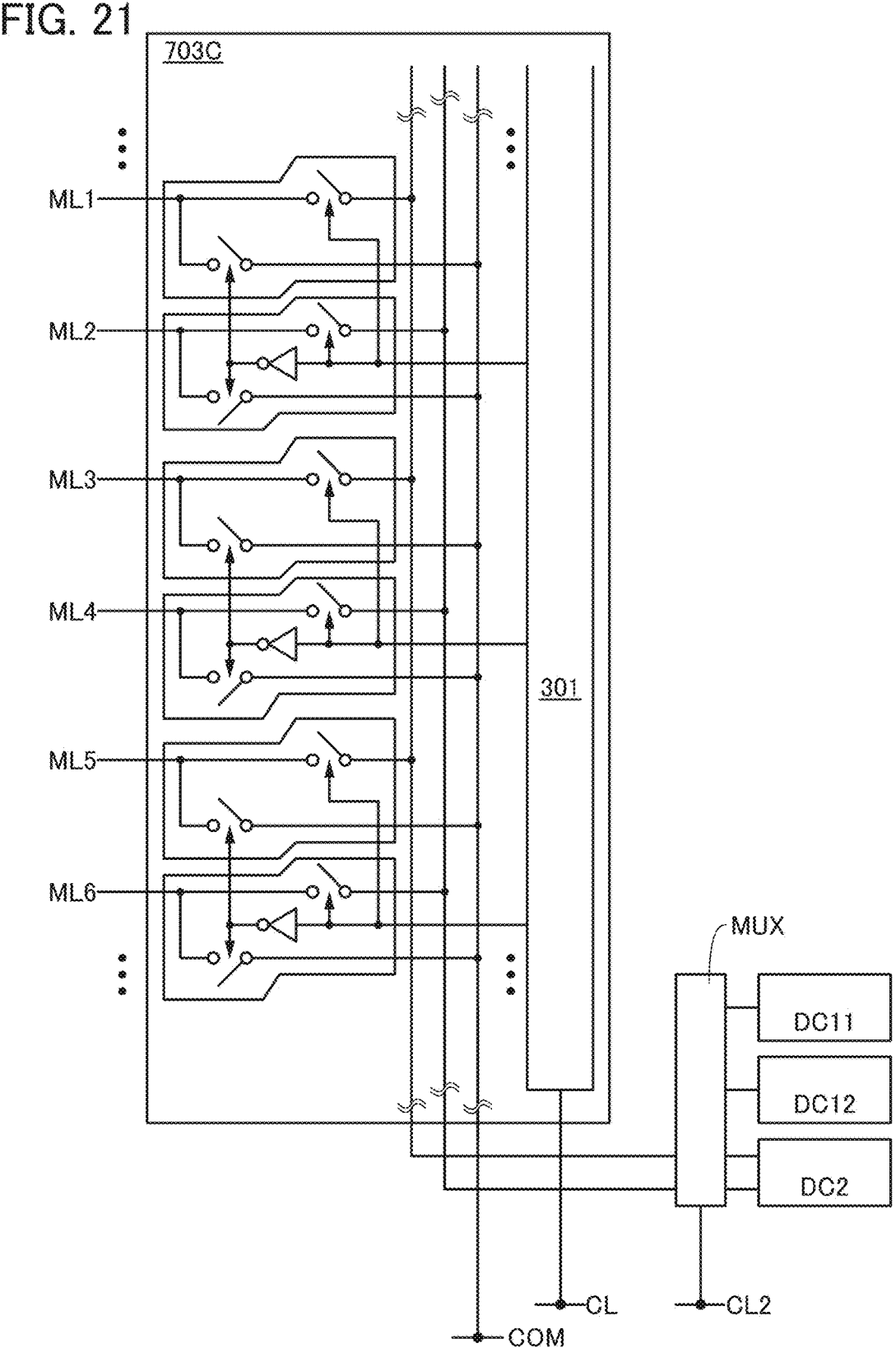
FIG. 21 illustrates a structure of an input device of an embodiment.

FIG. 20 and FIG. 21 each illustrate a structure of a driver circuit that can be used for the input/output device 700C of one embodiment of the present invention. FIG. 20 illustrates a structure of the driver circuit 703C. FIG. 21 illustrates an example of a structure in which the driver circuit 703C is used together with a selection circuit MUX.

The input/output device 700C described in this embodiment can include the wiring COM (see FIG. 19A).

The wiring COM is electrically connected to the driver circuit 703C and has a function of supplying a predetermined potential.

For example, the driver circuit 703C has a function of letting current flow between other signal lines ML and the wiring COM in the period during which the signal lines ML1 and ML2 are selected.

For example, the driver circuit 703C has a function of preventing current from flowing between each of the signal lines ML1 and ML2 and the wiring COM in the period during which the signal lines ML1 and ML2 are selected. In other words, the driver circuit 703C has a function of letting current flow between each of the signal lines ML1 and ML2 and the wiring COM in a period during which other signal lines ML are selected.

For example, the driver circuit 703C has a function of letting current flow between each of the signal lines ML1 and ML2 and the wiring COM in the period during which other signal lines ML are selected. In other words, the driver circuit 703C has a function of letting current flow between each of the signal lines ML1 and ML2 and the wiring COM in a period during which the signal lines ML1 and ML2 are not selected.

For example, the driver circuit 703C in FIG. 20 selects the signal line ML1 and the signal line ML2, then selects the signal line ML3 and the signal line ML4, and then selects the signal line ML5 and the signal line ML6. That is, the driver circuit 703C has a function of selecting six signal lines ML1 to ML6.

Figure 23:
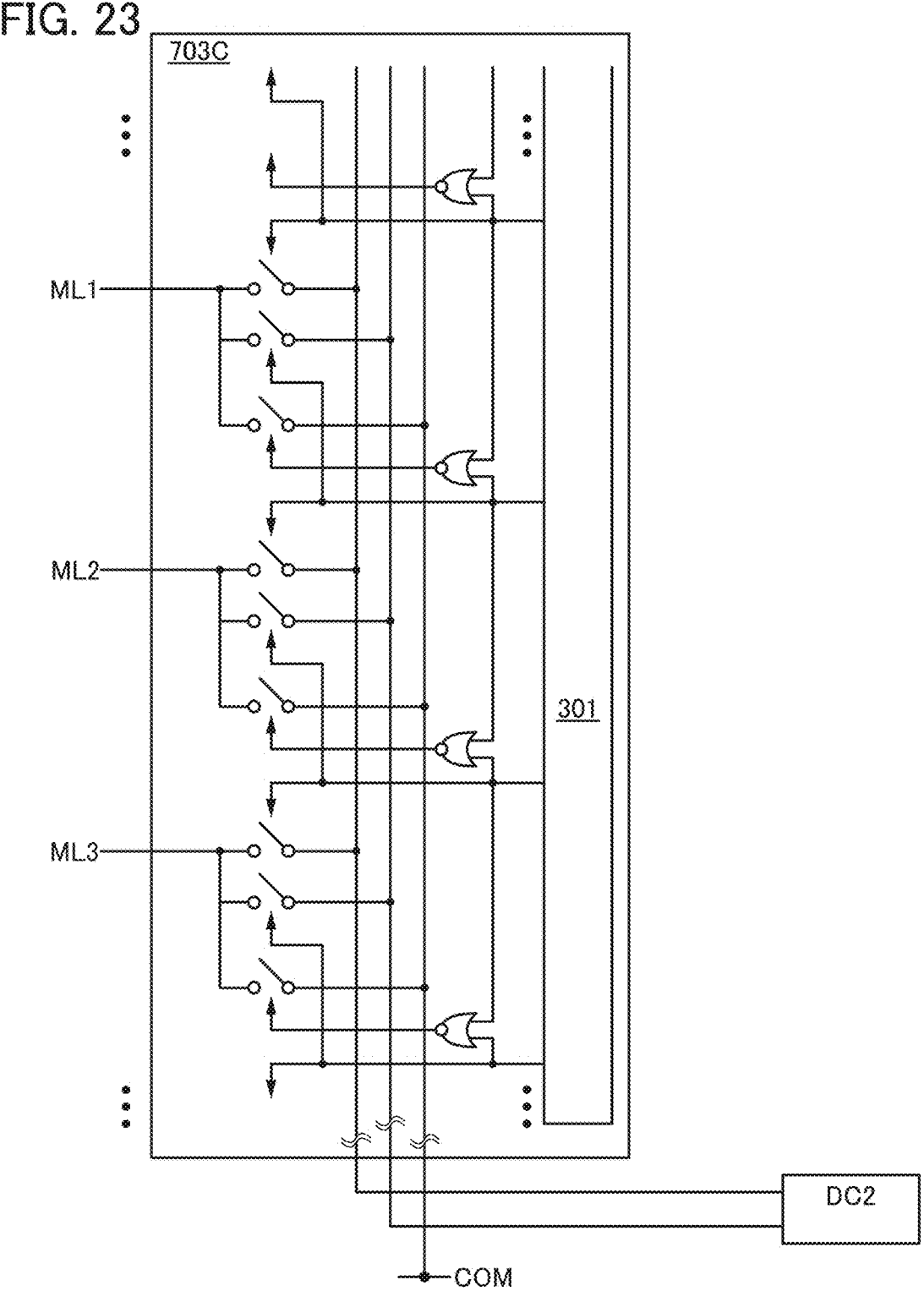
FIG. 23 illustrates a structure of an input device of an embodiment.

For example, the driver circuit 703C in FIG. 23 selects the signal line ML1 and the signal line ML2, then selects the signal line ML2 and the signal line ML3, then selects the signal line ML3 and the signal line ML4, then selects the signal line ML4 and the signal line ML5, and then selects the signal line ML5 and the signal line ML6.

Note that the driver circuit 703C in FIG. 23 includes the shift register 301. For example, the shift register 301 controls a plurality of switches connected to the signal lines. Note that one embodiment of the present invention is not limited thereto. For example, a plurality of shift registers can be used for the driver circuit 703C. For example, shift registers which independently control switches connected to the signal lines can be used.

The display element 750 (i, j) includes a layer 753 containing a liquid crystal material, the conductive film C1, and a pixel electrode 751 (i, j) (see FIGS. 19A and 19B). The pixel electrode 751 (i, j) is provided such that an electric field that controls the orientation of the liquid crystal material is formed between the conductive film C1 and the pixel electrode 751 (i, j). Note that arrows BL in the drawings show the direction in which light emitted by a backlight travels.

The display element 750 (i, k) includes the layer 753 containing a liquid crystal material, the conductive film C2, and the pixel electrode 751 (i, k). The pixel electrode 751 (i, k) is provided such that an electric field that controls the orientation of the liquid crystal material can be formed between the conductive film C2 and the pixel electrode 751 (i, k).

The above-mentioned input/output device of one embodiment of the present invention includes a display device including a liquid crystal element, one conductive film configured to control the orientation of the liquid crystal material and be capacitively coupled to an object approaching a display surface side of the display device, another conductive film that forms an electric field with the one conductive film, a sensor circuit configured to supply a search signal to the one conductive film and supply a sensing signal based on a change in potential of the other conductive film, and a driver circuit configured to select the one conductive film and the other conductive film in a predetermined order and be electrically connected to the sensor circuit or a wiring.

Thus, pixels can be rewritten in a predetermined order, and the object approaching the display surface side of the display device including a liquid crystal element can be sensed on the basis of a potential that is changed in accordance with the search signal and the capacitance coupled to the conductive film. Consequently, a novel input/output device that is highly convenient or reliable can be provided.

The input/output device 700C includes the base 710 and the base 770 including a region overlapping with the base 710 (see FIG. 14B).

The input/output device 700C includes the sealant (not shown) with which the base 770 and the base 710 are bonded to each other.

Note that the input/output device 700C includes the layer 753 containing a liquid crystal material in a region surrounded by the base 710, the base 770, and the sealant.

Individual components included in the input/output device 700C are described below. Note that these components cannot be clearly distinguished and one component may also serve as another component or include part of another component.

For example, the conductive film C2 is a conductive film which is configured to be capacitively coupled to an approaching object, and is also a conductive film arranged such that an electric field is formed between the first conductive film and the conductive film C2. The conductive film C2 is also a common electrode of the display element 750 (i, j+1).

<<Structure Example>>

The input/output device of one embodiment of the present invention includes the wiring COM in addition to the above-described structure.

The input/output device of one embodiment of the present invention includes the layer 753 containing a liquid crystal material and the pixel electrode 751 (i, j) or the pixel electrode 751 (i, k).

<<Wiring COM>>

For example, the structure that can be used for the wiring COM described in Embodiment 2 can be used for the wiring COM in this embodiment.

<<Driver Circuit 703C>>

For example, the driver circuit 703C can include the shift register 301 having a function of supplying a selection signal, or the like (see FIG. 20 or FIG. 21).

For example, a selection circuit which has a function of letting current flow between the sensor circuit DC2 or the wiring COM and the signal line on the basis of the selection signal can be used for the driver circuit 703C.

Accordingly, with the use of the shift register 301, two selection circuits can be sequentially selected from the plurality of selection circuits. As a result, current can flow between the signal line ML1 electrically connected to one selection circuit to which a selection signal is supplied and a first terminal of the sensor circuit DC2. In addition, current can flow between the signal line ML2 electrically connected to another selection circuit to which a selection signal is supplied and a second terminal of the sensor circuit DC2. In addition, current can flow between a signal line electrically connected to a selection circuit to which a selection signal line is not supplied and the wiring COM. That is, by the selection signal output from the shift register, the conduction state of the switch connected to the signal line ML (g, h) can be controlled. As a result, the conduction state between the signal line ML (g, h) and the wiring COM and the conduction state between the signal line ML (g, h) and the sensor circuit DC2 can be controlled.

<<Display Element 750 (i, j), 750 (i, k)>>

For example, the structure that can be used for the display element 750 (i, j) or the display element 750 (i, k) described in Embodiment 2 can be used for the display element 750 (i, j) or display element 750 (i, k) in this embodiment.

<Structural Example 3 of Input/Output device>

A structure of the input/output device of one embodiment of the present invention is described with reference to FIG. 21. FIG. 21 shows the case where the input/output device operates as a touch sensor by switching a self-capacitance mode and a mutual capacitance mode as appropriate, as an example. In such a manner, sensing can be performed more precisely. Alternatively, sensing can be performed in an appropriate manner depending on the cases, for example, the case where a finger or the like is far from an input region or the case where the finger is in contact with the input region.

Note that the input/output device in FIG. 21 differs from the input/output device described with reference to FIG. 20 in that the selection circuit MUX electrically connected to the driver circuit 703C is provided, that the sensor circuit DC11 and the sensor circuit DC12 which are electrically connected to the selection circuit MUX are provided, and that either of the sensor circuits DC11 and DC12 and the sensor circuit DC2 is selected through the selection circuit MUX. Here, the above description is referred to for similar structures, and different structures will be described in detail.

<<Sensor Circuit DC11, DC12>>

For example, the structure that can be used for the sensor circuit DC1 described in Embodiment 2 can be used for the sensor circuit DC11 and the sensor circuit DC12.

<<Selection Circuit MUX>>

The selection circuit MUX has a function of selecting a circuit which is brought into conduction with the driver circuit 703C, on the basis of a control signal. For example, the circuit which is brought into conduction with the driver circuit 703C is selected on the basis of a control signal supplied from the control line CL2.

Specifically, in the case where a selection signal is supplied, the selection circuit MUX has a function of selecting the sensor circuit DC2 and letting current flow between the sensor circuit DC2 and the driver circuit 703C. In the case where another selection signal is supplied, the selection circuit MUX has a function of selecting the sensor circuit DC11 and the sensor circuit DC12 and letting current flow between the driver circuit 703C and each of the sensor circuit DC11 and the sensor circuit DC12. For example, in the case where the sensor circuit DC2 is selected, the selection circuit MUX operates in a mutual-capacitance mode; meanwhile, in the case where the sensor circuit DC11 and the sensor circuit DC12 are selected, the selection circuit MUX operates in a self-capacitance mode.

Accordingly, in the case where a selection signal is supplied, current can flow between the first terminal of the sensor circuit DC2 and the signal line ML1 that is selected by the driver circuit 703C and between the second terminal of the sensor circuit DC2 and the signal line ML2. Alternatively, in the case where another selection signal is supplied, current can flow between the sensor circuit DC11 and the signal line ML1 that is selected by the driver circuit 703C and between the sensor circuit DC12 and the signal line ML2 that is selected by the driver circuit 703C.

Figure 22:
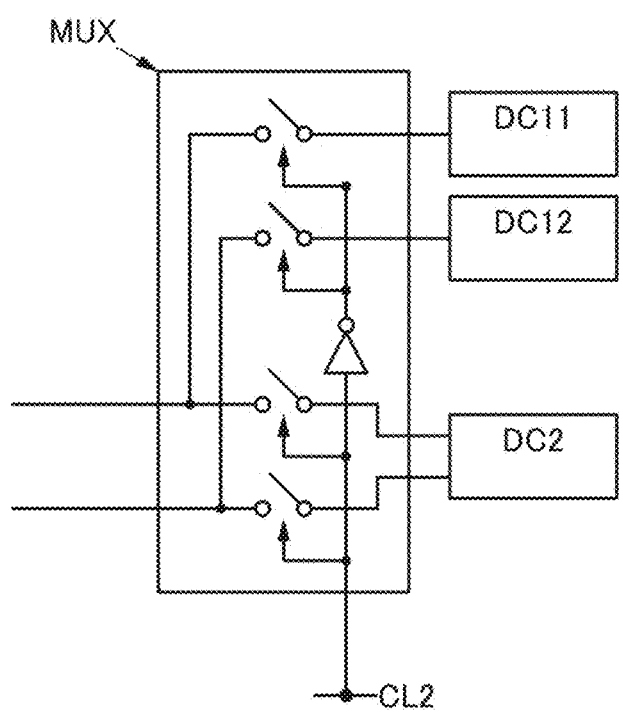
FIG. 22 illustrates a structure of an input device of an embodiment.

FIG. 22 shows a structure example of the selection circuit MUX. Although FIG. 21 shows an example of the case where the selection circuit MUX, the sensor circuit DC11, and the sensor circuit DC12 are applied to the structure in FIG. 20, one embodiment of the present invention is not limited to this. For example, the selection circuit MUX, the sensor circuit DC11, and the sensor circuit DC12 may be applied to the structure in FIG. 23.

Alternatively, a sensor circuit DC3 which can operate by switching a self-capacitance mode and a mutual-capacitance mode may be provided. By provision of such a sensor circuit DC3, the circuit size of the sensor circuit and the number of elements therein can be reduced. Examples of such a case is shown in FIG. 24 and FIGS. 25A to 25C.

In FIG. 24, the on/off states of switches connected to the signal line ML1, the signal line ML2, the signal line ML3, and the like are controlled by a circuit 303. Current flows between the signal line ML which does not perform sensing and the wiring COM. Current flows between the signal line ML which performs sensing and the sensor circuit DC3. At that time, at least two signal lines ML are selected. Then, the sensor circuit DC3 operates in accordance with them. Such operation is performed while the signals lines and pixels are scanned. Thus, operation is performed by switching a self-capacitance mode and a mutual-capacitance mode. For example, the circuit 303 includes a plurality of shift register circuits.

Figure 25A:
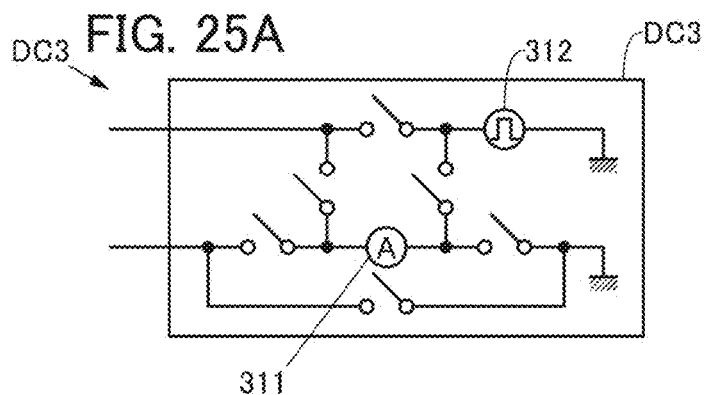
FIGS. 25A to 25C illustrate structures of an input device of an embodiment.
Figure 25B:
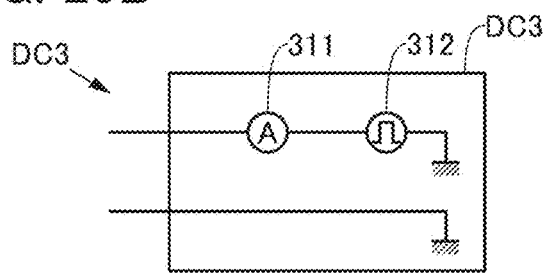
Figure 25C:
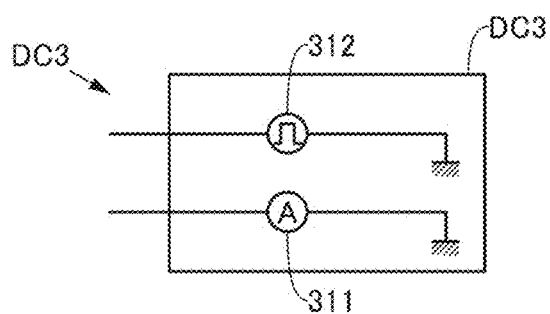

FIG. 25A shows an example of the sensor circuit DC3. The on/off states of switches included in the sensor circuit DC3 are changed, whereby the selection circuit MUX can operate by switching a self-capacitance mode and a mutual-capacitance mode. For example, a circuit structure shown in FIG. 25B is employed in the case of the self-capacitance mode; a circuit structure shown in FIG. 25C is employed in the case of the mutual-capacitance mode. The switches are arranged such that a circuit structure corresponding to each operation is formed; thus, the circuit structure of the sensor circuit DC3 is not limited to that shown in FIG. 25A.

Consequently, it is possible to provide a novel input/output device with high convenience or high reliability, whose structure is switched between the structure of the input/output device 700C described in Structure example 2 of this embodiment and the input/output device 700 described in Structure example 3 of this embodiment, on the basis of the control signal supplied from the control line CL2.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of any of the other embodiments.

Embodiment 5

In this embodiment, driving methods of an input/output device of one embodiment of the present invention are described with reference to FIGS. 26A1, 26A2, 26B1, and 26B2.

FIGS. 26A1, 26A2, 26B1, and 26B2 illustrate examples of the driving method of the input/output device of one embodiment of the present invention.

FIG. 26A1 is a top view schematically illustrating the input/output device. FIG. 26A2 shows methods for selecting the scan lines G (1) to G (m) and the conductive films C (1, 1) to C (p, q) of the input/output device shown in FIG. 26A1. FIG. 26B1 is a top view schematically illustrating the input/output device. FIG. 26B2 shows methods for selecting the scan lines G (1) to G (m) and the conductive films C (1, 1) to C (p, q) of the input/output device shown in FIG. 26B1, which are different from those described in FIG. 26A2.
<Driving Method 1>

The method of driving the input/output device 700 or the input/output device 700C, which is described in this embodiment, has two periods in one frame period of the display device, for example. Note that the method may have three or more periods.

The input/output device 700 or the input/output device 700C includes the scan lines G (1) to G (m) (see FIG. 26A1). Furthermore, one frame period starts at time 0 and terminates at time T0.

In a first period, the scan lines G (1) to G (m) are sequentially selected. Thus, the first period can also be referred to as a video signal input period or a signal writing period.

For example, in a period T(V) that starts at time 0, the scan lines G (1) to G (m) are sequentially selected. Note that the method of selecting the scan lines G (1) to G (m) is schematically shown with a line LV (see FIG. 26A2). Pixels in each row are selected and a video signal is input to the pixels row by row.

For example, in a period T1 shown in the figure, the scan lines G (i) to G (i+x) which are electrically connected to pixels having a region overlapping with the conductive films C (g, 1) to C (g, q) are sequentially selected. Furthermore, in the period T1, a predetermined potential, e.g., a common potential is applied to the conductive films C (g, 1) to C (g, q).

In a second period, the conductive films C (1, 1) to C (p, q), that is, the signal lines ML (1, 1) to ML (p, q) are sequentially selected. Thus, the second period can also be referred to as a sensing period or a signal reading period.

For example, in a period after the period T(V) in the one frame period, the conductive films C (1, 1) to C (p, q), that is, the signal lines ML (1, 1) to ML (p, q) are sequentially selected. Then, sensing operation is performed on the selected signal line ML (g, h) and the selected conductive film C (g, h). Note that the method of sequentially selecting the conductive films C (1, 1) to C (p, q), that is, the signal lines ML (1, 1) to ML (p, q) is schematically shown with a line LS (see FIG. 26A2).

Although the case where the conductive films C (1, 1) to C (p, q), that is, the signal lines ML (1, 1) to ML (p, q) are sequentially selected one by one is described, one embodiment of the present invention is not limited to this. For example, they may be sequentially selected two by two.

Alternatively, the following method may be performed. When the conductive film C or the signal line ML is selected once, reading operation in a self-capacitance mode and reading operation in a mutual-capacitance mode are sequentially performed; then, the following conductive film C or the following signal line ML is selected; and reading operation in a self-capacitance mode and reading operation in a mutual-capacitance mode are sequentially performed.

Alternatively, the following method may be employed in which reading is performed in a self-capacitance mode in the first frame and in a mutual-capacitance mode in the second frame. Alternatively, the following method may be employed in which reading is performed in a self-capacitance mode for several frame periods in a predetermined period and in a mutual capacitance mode for several frame periods in another predetermined period.

In these methods, one frame period is divided into at least two periods. That is, the first period in which a video signal is input to a pixel is separated from the second period in which sensing is performed. Thus, in the second period, display operation is not affected even when sensing is performed. That is, display operation can be performed continuously over one frame period in each pixel. Since the first frame period is divided into two periods, the speed of scanning the pixel, the signal line ML, or the like is not necessarily the same both in the first period and the second period. For example, in the case where sensing operation is to be performed with more precision, the second period can be longer than the first period. On the contrary, in the case where input of a video signal is to be performed more precision, the first period can be longer than the second period.

The method of driving the input/output device 700 or the input/output device 700C of one embodiment of the present invention includes a step of writing image data to the display device and a step of sensing an object approaching the conductive film of the input/output device. Thus, using the conductive film to which a predetermined potential is supplied, image data can be written into the display device without being influenced by an approaching finger or the like is inhibited. As a result, a novel input/output device with high convenience or high reliability can be provided.

<Driving Method 2>

In the method of driving the input/output device 700 or the input/output device 700C which is described in this embodiment, the period in which input operation of a video signal is performed and the period in which sensing operation is performed are not clearly divided in one frame period of the display device, and the input operation and the sensing operation are simultaneously performed. However, in terms of each pixel unit, the input operation of a video signal and the sensing operation are performed in different periods.

Note that the input/output device 700 or the input/output device 700C includes the scan lines G (1) to G (m) (see FIG. 26B1). Furthermore, the input/output device 700 or the input/output device 700C includes pixels which are electrically connected to the scan lines G (i) to G (i+x) and located in regions overlapping with the conductive films C (g, 1) to C (g, q).

First, in the input operation of a video signal, operation of sequentially selecting the scan lines G (1) to G (m) is started. First, selection operation is started from the scan line G (1).

Next, after a predetermined time elapsed, that is, before selection of the scan lines in all rows is terminated, operation of sequentially selecting the conductive films C (1, 1) to C (p, q), that is, the signal lines ML (1, 1) to ML (p, q) is started (FIG. 26B2).

At that time, the speed of scanning the pixel, that is, the scan line G is set to be the same as the speed of scanning the signal line ML or the conductive film C (g, h). That is, when focusing on a pixel, the scan line G is selected first; then, a video signal is input. After the input of the video signal is terminated, the signal ML is selected after a predetermined time elapsed, and the sensing operation is performed. Here, the conductive film C (g, h) is arranged over a plurality of pixels. Thus, in accordance with arrangement of the plurality of pixels, timing of selecting the signal line ML needs to be delayed.

For example, in a period T2, the scan lines G (i) to G (i+x) are selected and a video signal is input to the pixels. In that case, in the period T2, the conductive films C (g, 1) to C (g, q), that is, the signal lines ML (g, 1) to ML (g, q) are not selected. That is, after the period T2 is terminated, the signal lines ML (g, 1) to ML (g, q) are selected. As described above, operation is performed in such a manner that in all the pixels, the scan line G is selected first; then, after a predetermined time elapsed, the signal line ML is selected.

Consequently, in terms of each pixel unit, the input operation of a video signal and the sensing operation do not overlap with each other and are performed in different periods.

As described above, in terms of each pixel unit, the input operation of a video signal and the sensing operation do not overlap; thus, the display operation is not affected by the sensing operation. That is, in each pixel, the display operation can be continuously performed over one frame period. Furthermore, it is not necessary that the one frame period be divided into a plurality of period; thus, the speed of scanning for selecting each pixel can be decreased. Thus, power consumption can be reduced.

The method of driving the input/output device 700 or the input/output device 700C of one embodiment of the present invention includes a step of writing an image data to a pixel having a region overlapping with a predetermined conductive film and a step of sensing an object approaching the predetermined conductive film. Thus, using the conductive film to which a predetermined potential is supplied, image data can be written into the display device while influence of an approaching finger or the like is inhibited. As a result, a novel input/output device with high convenience or high reliability can be provided.

This embodiment is obtained by performing change, addition, modification, removal, application, superordinate conceptualization, or subordinate conceptualization on part or the whole of another embodiment. Thus, part or the whole of this embodiment can be freely combined with, applied to, or replaced with part or the whole of any of the other embodiments.

Embodiment 6

In this embodiment, a structure of the input/output device of one embodiment of the present invention is described with reference to FIGS. 27A and 27B and FIGS. 28A to 28C.

Figure 27A:
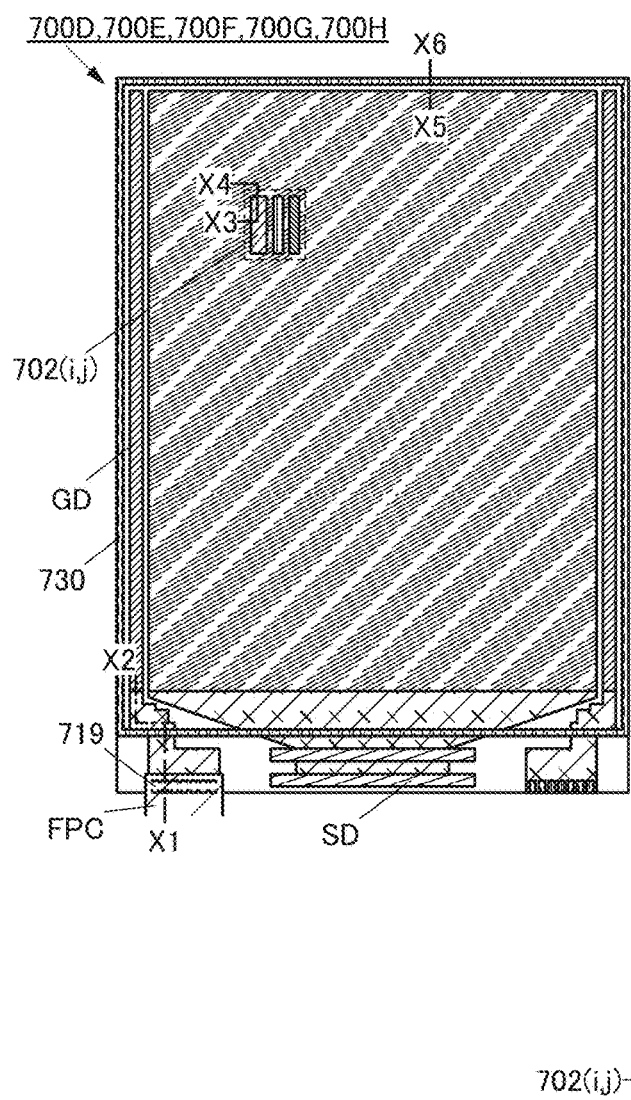
FIGS. 27A and 27B illustrate a structure of an input/output device of an embodiment.
Figure 27B:
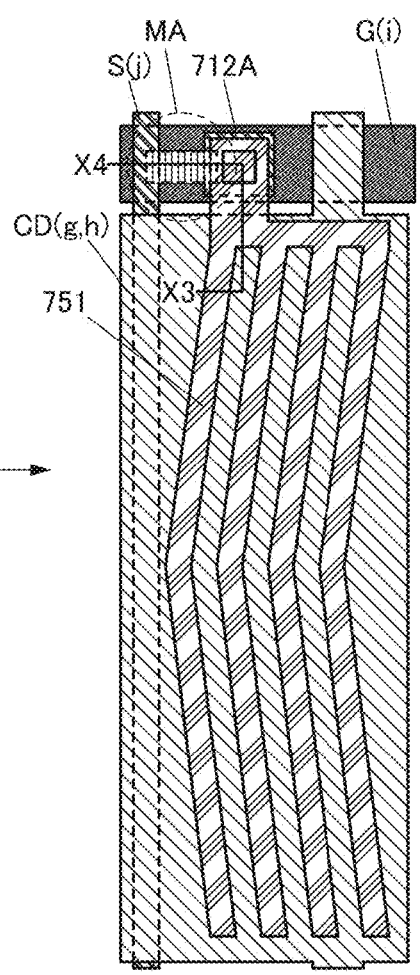

FIGS. 27A and 27B illustrate a structure of an input/output device 700D of one embodiment of the present invention. FIG. 27A is a top view of the input/output device 700D of one embodiment of the present invention and FIG. 27B is a top view of the pixel 702 (i, j) of the input/output device 700D.

FIGS. 28A to 28C illustrate a structure of the input/output device 700D of one embodiment of the present invention. FIG. 28A is a cross-sectional view of the input/output device 700D taken along the section lines X1-X2, X3-X4, and X5-X6 in FIG. 27A. FIG. 28B is a cross-sectional view illustrating the details of a transistor MD which is illustrated in FIG. 28A. FIG. 28C is a cross-sectional view illustrating the details of a transistor MA which is illustrated in FIG. 28A.

<Structure Example of Input/Output Device 700D>

The input/output device 700D described in this embodiment includes the base 710, the base 770, the pixel 702 (i, j), a sealant 730, and a conductive film CD (g, h) (see FIGS. 28A to 28C).

The base 770 has a region overlapping with the base 710. The sealant 730 has a function of bonding the base 710 and the base 770.

The pixel 702 (i, j) is provided between the base 710 and the base 770.

The conductive film CD (g, h) is provided between the base 710 and the base 770.

The pixel 702 (i, j) includes the display element 750.

The display element 750 includes the layer 753 containing a liquid crystal material and the pixel electrode 751. The pixel electrode 751 is provided such that an electric field that controls the orientation of the liquid crystal material is formed between the conductive film CD (g, h) and the pixel electrode 751.

The layer 753 containing a liquid crystal material is provided in a region surrounded by the base 710, the base 770, and the sealant 730.

In addition, the input/output device 700D includes a transistor MA electrically connected to the display element 750. The pixel electrode 751 is electrically connected to a source electrode or a drain electrode of the transistor MA.

The input/output device 700D includes the scan line G (i) electrically connected to the transistor MA and the signal line S (j) electrically connected to the transistor MA (see FIG. 27B).

In addition, the input/output device 700D includes a plurality of transistors electrically connected to the scan line G (i) and a plurality of transistors electrically connected to the signal line S(j) (see FIG. 27B).

Specifically, a conductive film 704 serving as a gate electrode of the transistor MA is electrically connected to the scan line G (i), and a conductive film 712B serving as a source electrode or a drain electrode of the transistor MA is electrically connected to the signal line S (j) (see FIG. 28C).

A semiconductor film 718 of the input/output device 700D contains indium, gallium, zinc, and oxide.

The conductive film CD (g, h) of the input/output device 700D contains indium, gallium, zinc, and oxide.

The input/output device 700D described in this embodiment includes the transistor MA which includes the semiconductor film 718 containing indium, gallium, zinc, and oxygen and the conductive film CD (g, h) containing indium, gallium, zinc, and oxygen. Thus, the films containing indium, gallium, zinc, and oxygen can be formed in the same process. Moreover, the films containing indium, gallium, zinc, and oxygen which are formed in the same process can be used as the semiconductor film or the conductive film. As a result, a novel input/output device with high convenience or high reliability can be provided.

The input/output device 700D can include the driver circuit GD or the driver circuit SD other than the above components (see FIG. 27A).

The driver circuit GD is electrically connected to the scan line G (i) and has a function of supplying a selection signal, for example. The driver circuit SD is electrically connected to the signal line S (j) and has a function of supplying a video signal, for example. For example, the transistor MD can be used in the driver circuit GD. A semiconductor film that is formed in the same process as the semiconductor film of the transistor MA can be used in the transistor MD (see FIGS. 28A to 28C).

The input/output device 700D can include the conductive films CD (g, h) in a matrix of p rows and q columns.

The input/output device 700D can include one or more pixels 702 (i, j) having a region overlapping with the conductive films CD (g, h).

The input/output device 700D can include the pixel electrode 751 which is provided so that an electric field in a direction intersecting with the thickness direction of the layer 753 containing a liquid crystal material (such an electric field is also referred to as a horizontal electric field) is applied.

Components included in the input/output device 700D of one embodiment of the present invention are described below. Note that these components cannot be clearly distinguished and one component may also serve as another component or include part of another component.

For example, the conductive film C (g, h) is a conductive film configured to be capacitively coupled to an approaching object and also serves as a common electrode of the display element 750 (i, j).

The input/output device 700D can include a structure KB between the base 710 and the base 770. Accordingly, a predetermined space can be provided between the base 710 and the base 770.

The input/output device 700D can include a coloring film CF which has a region overlapping with the display element 750. Furthermore, the input/output device 700D can include a light-blocking film BM having an opening in a region overlapping with the display element 750.

The input/output device 700D can include an insulating film 771 between the coloring film CF and the layer 753 containing a liquid crystal material and between the light-blocking film BM and the layer 753 containing a liquid crystal material. Thus, unevenness due to the thickness of the coloring film CF can be reduced, or impurities can be prevented from being diffused from the coloring film CF or the light-blocking film BM to the layer 753 containing a liquid crystal material.

The input/output device 700D can include an alignment film AF1 between the layer 753 containing a liquid crystal material and the base 710 and an alignment film AF2 between the layer 753 containing a liquid crystal material and the base 770.

The input/output device 700D can include an optical film 710P or an optical film 770P. For example, the optical film 710P can be provided such that the base 710 lies between the layer 753 containing a liquid crystal material and the optical film 710P. Alternatively, the optical film 770P can be provided such that the base 770 lies between the layer 753 containing a liquid crystal material and the optical film 770P.

The optical films 710P and 770P can be formed using polarizing plates, for example. One of the polarizing plates is provided in a predetermined polarization direction with respect to the polarization direction of the other of the plates. Specifically, the two linear polarizing plates are provided in a cross-Nicol state.

The input/output device 700D can include a conductive film 724 which has a region overlapping with the semiconductor film 718 of the transistor MD. The conductive film 724 can be formed of a material which can be formed in the same process as the conductive film CD (g, h) (see FIG. 28B).

The input/output device 700D can include an insulating film 701 between the transistor MA and the base 710. The input/output device 700D can include an insulating film 721B or an insulating film 728 between the layer 753 containing a liquid crystal material and the semiconductor film 718. The input/output device 700D can include an insulating film 721A between the insulating film 721B and the semiconductor film 718.

The insulating film 701 has a function of suppressing impurity diffusion from the base 710 to the transistor MA. The insulating film 721B or the insulating film 721A has a function of suppressing impurity diffusion to the insulating film 718.

For example, the insulating film 728 makes a step due to the transistor MA or the like which overlaps with the insulating film 728 flat.

The input/output device 700D can include an insulating film 706 between the conductive film 704 and the semiconductor film 718. For example, the insulating film 706 functions as a gate insulating film.

The input/output device 700D can include a wiring 711 which is electrically connected to the display element 750 or the conductive film CD (g, h).

The input/output device 700D can include a terminal 719 which is electrically connected to the wiring 711. For example, a flexible printed circuit board FPC can be electrically connected to the terminal 719 using a conductive member ACF.

<<Structure>>

The input/output device 700D includes the base 710, the display element 750, and the conductive film CD (g, h).

The input/output device 700D includes the insulating film 721B, the layer 753 containing a liquid crystal material, and the pixel electrode 751.

The input/output device 700D includes the transistor MA, the semiconductor film 718, the scan line G (i), and the signal line S (j).

The input/output device 700D can include the driver circuit GD and the driver circuit SD.

<<Base 710, 770>>

For example, the base 710 and the base 770 can be formed using a material that can be used for the base 710 described in Embodiment 1.

<<Conductive Film 704, 712A, 712B, Wiring 711, Terminal 719>>

The conductive film 704, the conductive film 712A, the conductive film 712B, the wiring 711, or the terminal 719 can be formed using a conductive material.

For example, the conductive film 704, the conductive film 712A, the conductive film 712B, the wiring 711, or the terminal 719 can be formed using a material that can be used for the conductive film C1, the conductive film C2, the conductive film C (g, h), the signal line ML1, the signal line ML2, the signal line ML (g, h), or the control line CL which is described in Embodiment 1.

<<Scan Line G (i), Signal Line S (j)>>

The scan line G (i) or the signal line S (j) can be formed using a conductive material. For example, the scan line G (i) or the signal line S (j) can be formed using a material which can be used for the wiring 711.

<<Conductive Film CD (g, h)>>

The conductive film CD (g, h) can be formed using a conductive material. For example, the conductive film CD (g, h) can be formed using a material which can be used for the wiring 711.

Furthermore, an oxide semiconductor can be used for the conductive film CD (g, h). Note that the method of controlling the resistivity of an oxide semiconductor is described later in the end of this embodiment.

<<Insulating Film 701, 706, 721A, 721B, 728, 771>>

For example, an inorganic insulating material, an organic insulating material, or an insulating composite material containing an inorganic material and an organic material can be used for the insulating film 701, the insulating film 706, the insulating film 721A, the insulating film 721B, the insulating film 728, or the insulating film 771.

Specifically, an inorganic oxide film, an inorganic nitride film, an inorganic oxynitride film, or a material obtained by stacking any of these films can be used for the insulating film 701, the insulating film 706, the insulating film 721A, the insulating film 721B, the insulating film 728, or the insulating film 771. For example, a silicon oxide film, a silicon nitride film, a silicon oxynitride film, or a material obtained by stacking any of these films can be used.

Specifically, polyester, polyolefin, polyamide, polyimide, polycarbonate, polysiloxane, an acrylic resin, or a stacked or composite material including resins selected from these, or the like can be used for the insulating film 721A, the insulating film 721B, the insulating film 728, or the insulating film 771. Alternatively, a photosensitive material may be used.

The insulating film 771 can be formed of polyimide, epoxy resin, acrylic resin, or the like.

The insulating film 721B can be formed using a hydrogen-containing insulating film, for example. The resistivity of the oxide semiconductor can be controlled by the use of the hydrogen-containing insulating film for the insulating film 721B in contact with the oxide semiconductor.

For example, the insulating film 721B can be formed of a material which causes hydrogen diffusion when being in contact with the oxide semiconductor formed in the same process as the semiconductor film 718.

Note that the method of controlling the resistivity of an oxide semiconductor is described later in the end of this embodiment.

<<Display Element 750>>

For example, a display element having a function of controlling transmission or reflection of light can be used as the display element 750. For example, a combined structure of a polarizing plate and a liquid crystal element or a MEMS shutter display element can be used.

Specifically, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, or an advanced super V (ASV) mode can be used for the display element 750.

For example, the display element 750 can include the conductive films CD (g, h) and the pixel electrode 751 which are disposed such that an electric field that controls the orientation of the liquid crystal material contained in the layer 753 containing the liquid crystal material is formed.

<<Layer 753 Containing a Liquid Crystal Material>>

For example, a liquid crystal material which can be used for the layer 753 containing a liquid crystal material described in Embodiment 1 can be used for the layer 753 containing a liquid crystal material in this embodiment.

<<Pixel Electrode 751>>

The pixel electrode 751 can be formed using a conductive material.

For example, a material that can be used for the wiring 711 can be used for the pixel electrode 751.

Specifically, a light-transmitting conductive material can be used for the pixel electrode 751. For example, a conductive oxide such as indium oxide, indium tin oxide, indium zinc oxide, zinc oxide, or zinc oxide to which gallium is added can be used. Thus, the pixel electrode 751 can supply a uniform electric field without shielding the display of the display element 750.

For example, the pixel electrode 751 can have a comb-like shape or a rectangular shape.

<<Transistor MA>>

As the transistor MA, a bottom-gate transistor, a top-gate transistor, or the like can be used.

For example, a transistor having a lower leakage current in an off state than a transistor that uses amorphous silicon for a semiconductor film can be used as the transistor MA.

Specifically, a transistor in which an oxide semiconductor is used for the semiconductor film 718 can be used as the transistor MA.

Thus, a pixel circuit can hold a video signal for a longer time than a pixel circuit including a transistor that uses amorphous silicon for a semiconductor film. Specifically, the selection signal can be supplied at a frequency of lower than 30 Hz, preferably lower than 1 Hz, more preferably less than once per minute while flickering is suppressed. Consequently, eyestrain on a user of the input/output device can be reduced, and power consumption for driving can be reduced.

The transistor MA includes the semiconductor film 718 and the conductive film 704 having a region overlapping with the semiconductor film 718 (see FIG. 28B). The transistor MA further includes the conductive film 712A and the conductive film 712B.

Note that the conductive film 704 and the insulating film 706 serve as a gate electrode and a gate insulating film, respectively. The conductive film 712A serves as one of a source electrode and a drain electrode, and the conductive film 712B serves as the other of the source electrode and the drain electrode.

<<Semiconductor Film 718>>

The semiconductor film 718 can be formed using a semiconductor containing an element of Group 4, for example. Specifically, a semiconductor containing silicon can be used for the semiconductor film 718. For example, single crystal silicon, polysilicon, microcrystalline silicon, or amorphous silicon can be used for the semiconductor film 718.

For example, an oxide semiconductor can be used for the semiconductor film 718. Specifically, an oxide semiconductor containing indium or an oxide semiconductor containing indium, gallium, and zinc can be used for the semiconductor film.

For example, a compound semiconductor can be used for the semiconductor film 718. Specifically, a semiconductor containing gallium arsenide can be used for the semiconductor film 718.

For example, an organic semiconductor can be used for the semiconductor film 718. Specifically, an organic semiconductor containing any of polyacenes or graphene can be used for the semiconductor film 718.

<<Driver Circuit GD>>

Any of a variety of sequential circuits, such as a shift register, can be used as the driver circuit GD. For example, the transistor MD, a capacitor, and the like can be used in the driver circuit GD.

For example, a transistor including a semiconductor film that can be formed in the same process as the semiconductor film 718 included in the transistor MA can be used.

Specifically, as the transistor MD, a transistor having the same structure as the transistor MA can be used. Alternatively, as the transistor MD, a transistor different from the transistor MA can be used.

Specifically, a transistor including the conductive film 724 which has a region overlapping with the conductive film 704 serving as a first gate electrode can be used as the transistor MD.

The transistor MD includes a stacked-layer of the insulating film 721A and the insulating film 721B between the conductive film 724 and the semiconductor film 718.

For example, the conductive film 724 is electrically connected to a wiring supplying the same potential as that supplied to the conductive film 704.

<<Driver Circuit SD>>

For example, an integrated circuit can be used in the driver circuit SD. Specifically, an integrated circuit formed over a silicon substrate can be used.

For example, a chip on glass (COG) method can be used to mount the driver circuit SD. Specifically, the driver circuit SD can be mounted on a pad which is electrically connected to the signal line S (j), using an anisotropic conductive film
<<Sealant 730>>

For example, an inorganic material, an organic material, a composite material of an inorganic material and an organic material, or the like can be used for the sealant 730.

For example, an organic material such as a thermally fusible resin or a curable resin can be used for the sealant 730.

For the sealant 730, an organic material such as a reactive curable adhesive, a photo-curable adhesive, a thermosetting adhesive, and/or an anaerobic adhesive can be used.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 730.
<<Coloring Film CF>>

The coloring film CF can be formed using a material transmitting light of a predetermined color and can thus be used as a color filter, for example For example, the coloring film CF can be formed using a material transmitting light of blue, green, red, yellow, or white.
<<Light-blocking Film BM>>

The light-blocking film BM can be formed using a material that prevents light transmission and can thus be used as a black matrix, for example.
<<Structure KB>>

For example, an organic material, an inorganic material, or a composite material of an organic material and an inorganic material can be used for the structure KB. Thus, a predetermined space can be provided between components between which the structure KB is provided.

Specifically, for the structure KB, polyester, polyolefin, polyamide, polyimide, polycarbonate, polysiloxane, an acrylic resin, or the like, or a composite material of a plurality of kinds of resins selected from these can be used. Alternatively, a photosensitive material may be used.
<<Alignment Film AF1, AF2>>

The alignment films AF1 and AF2 can be formed of polyimide or the like. Specifically, an alignment film formed by rubbing treatment or an optical alignment technique so that a liquid crystal material has alignment in a predetermined direction can be used.
<<Optical Film 710P, 770P>>

For example, a polarizing plate, a retardation plate, a diffusing film, an anti-reflective film, a condensing film, or the like can be used as the optical film 710P or the optical film 770P. Alternatively, a polarizing plate containing a dichromatic pigment can be used as the optical film 710P or the optical film 770P.

Alternatively, an antistatic film preventing the attachment of a foreign substance, a water repellent film suppressing the attachment of stain, a hard coat film suppressing a scratch in use, or the like can be used for the optical film 710P or the optical film 770P.
<Structure Example of Input/Output Device 700E>

Another structure of the input/output device of one embodiment of the present invention is described with reference to FIGS. 29A and 29B.

Figure 29A:
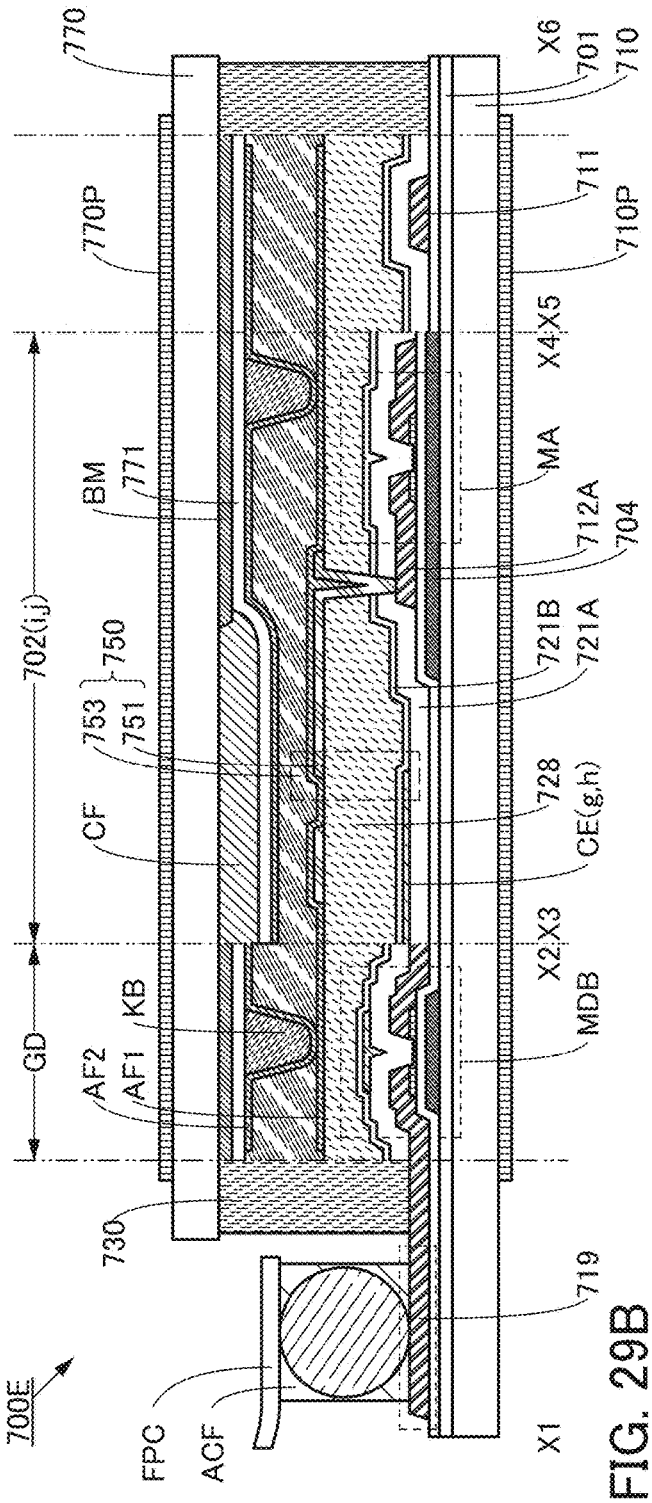
FIGS. 29A and 29B illustrate a structure of an input/output device of an embodiment.
Figure 29B:
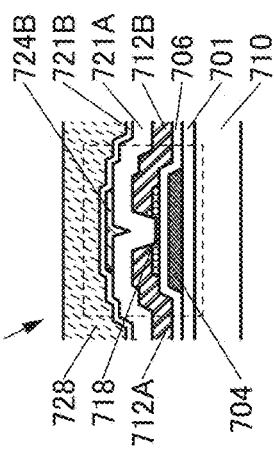

FIGS. 29A and 29B illustrate the structure of an input/output device 700E of one embodiment of the present invention. FIG. 29A is a cross-sectional view of the input/output device 700E of one embodiment of the present invention taken along the section lines X1-X2, X3-X4, and X5-X6 in FIG. 27A. FIG. 29B is a cross-sectional view showing the detail of a transistor MDB shown in FIG. 29A.

Note that the input/output device 700E differs from the input/output device 700D in FIGS. 28A to 28C in that a conductive film 724B is provided instead of the conductive film 724 (see FIG. 29B) and that a conductive film CE (g, h) is provided instead of the conductive film CD (g, h) (see FIG. 29A). Here, the above description is referred to for similar structures, and different structures will be described in detail.

The input/output device 700E described in this embodiment includes the conductive film 724B between the insulating film 721A and the insulating film 721B and includes the conductive film CE (g, h) between the insulating film 721A and the insulating film 721B. The conductive film 724B and the conductive film CE (g, h) contain conductive oxides (see FIG. 29A or 29B).
<<Conductive Film 724B, Conductive Film CE (g, h)>>

Specifically, an oxide semiconductor whose conductivity is increased using a method of controlling the resistivity thereof can be used for the conductive film 724B and the conductive film CE (g, h).

Specifically, a conductive oxide, such as an indium oxide, indium tin oxide, indium zinc oxide, an oxide containing indium, gallium, and zinc, a zinc oxide, or a zinc oxide to which gallium is added, can be used for the conductive film 724B and the conductive film CE (g, h).

For example, an oxide semiconductor can be used for each of the conductive film 724B and the conductive film CE (g, h), and a hydrogen-diffusing material can be used for each of the conductive film 724B and the insulating film 721B which is in contact with the conductive film CE (g, h). Thus, the resistivity of the conductive film 724B and that of the conductive film CE (g, h) can be lowered.

Note that the method of controlling the resistivity of an oxide semiconductor is described later in the end of this embodiment.
<Structure Example of Input/Output Device 700F>

Another structure of the input/output device of one embodiment of the present invention is described with reference to FIGS. 30A and 30B.

FIGS. 30A and 30B illustrate a structure of an input/output device 700F of one embodiment of the present invention. FIG. 30A is a cross-sectional view of the input/output device 700F taken along the section lines X1-X2, X3-X4, and X5-X6 in FIG. 27A. FIG. 30B is a cross-sectional view showing the details of a transistor MDC in FIG. 30A.

Note that the input/output device 700F is different from the input/output device 700D in FIGS. 28A to 28C in that a top-gate transistor MC is included instead of the bottom-gate transistor MA, that the top-gate transistor MDC is included instead of the bottom-gate transistor MD, and that a conductive film CF (g, h) is included instead of the conductive film CD (g, h) (see FIG. 30A). Here, the above description is referred to for similar structures, and different structures will be described in detail.
<<Transistor MC, and Transistor MDC>>

The transistor MDC includes the conductive film 704 having a region overlapping with an insulating film 701C and the semiconductor film 718 having a region provided between the insulating film 701C and the conductive film 704. Note that the conductive film 704 functions as a gate electrode (see FIG. 30B).

The semiconductor film 718 includes a first region 718A, a second region 718B, and a third region 718C. The first region 718A and the second region 718B do not overlap with the conductive film 704. The third region 718C is positioned between the first region 718A and the second region 718B and overlaps with the conductive film 704.

The transistor MDC includes the insulating film 706 between the third region 718C and the conductive film 704. Note that the insulating film 706 functions as a gate insulating film.

The first region 718A and the second region 718B have a lower resistance than the third region 718C, and function as a source region and a drain region.

Note that, for example, a method of controlling the resistivity of the oxide semiconductor film, which is described in the end of this embodiment, can be used as a method of forming the first region 718A and the second region 718B in the semiconductor film 718. Specifically, plasma treatment using a gas containing a rare gas can be used.

For example, the conductive film 704 can be a used as a mask. In that case, the shape of part of the third region 718C can be self-aligned with the shape of an end of the conductive film 704.

The transistor MDC includes the conductive films 712A and 712B which are in contact with the first region 718A and the second region 718B, respectively. The conductive film 712A and the conductive film 712B function as a source electrode and a drain electrode.

A transistor which can be formed in the same process as the transistor MDC can be used as the transistor MC.

<<Conductive Film CF (g, h)>>

For example, an oxide semiconductor which is formed in the same process as the first region 718A and the second region 718B of the semiconductor film 718 can be used for the conductive film CF (g, h). Accordingly, the manufacturing process of the conductive film CF (g, h) can be simplified.

<Structure Example of Input/Output Device 700G>

Another structure of the input/output device of one embodiment of the present invention is described with reference to FIGS. 31A to 31D.

FIGS. 31A to 31D illustrate the structure of an input/output device 700G of one embodiment of the present invention. FIG. 31A is a cross-sectional view of the input/output device 700G of one embodiment of the present invention taken along the section lines X1-X2, X3-X4, and X5-X6 in FIG. 27A. FIGS. 31B to 31D are cross-sectional views showing modification examples where some components shown in FIG. 31A are changed.

Note that the input/output device 700G differs from the input/output device 700F in FIGS. 30A to 30C in that an insulating film 728B is provided between the layer 753 containing a liquid crystal material and an insulating film 728A, and that a conductive film CG (g, h) is provided between the insulating film 728A and the insulating film 728B instead of the conductive film CF (g, h). Here, the above description is referred to for similar structures, and different structures will be described in detail.

The input/output device 700G includes the insulating film 728B between the layer 753 containing a liquid crystal material and the insulating film 728A. The input/output device 700G includes the conductive film CG (g, h) between the insulating film 728A and the insulating film 728B.

<<Insulating Film 728A>>

For example, the material that can be used for the insulating film 728 can be used for the insulating film 728A.

<<Insulating Film 728B>>

For example, the material that can be used for the insulating film 728 can be used for the insulating film 728B.

<<Conductive Film CG (g, h)>>

For example, a conductive film having an opening in a region overlapping with the comb-like pixel electrode 751 can be used as the conductive film CG (g, h).

For example, a conductive material can be used for the conductive film CG (g, h). For example, the material that can be used for or the wiring 711 can be used for the conductive film CG (g, h).

Specifically, a light-transmitting conductive material can be used for the conductive film CG (g, h).

For example, a conductive oxide such as indium oxide, indium tin oxide, indium zinc oxide, zinc oxide, or zinc oxide to which gallium is added can be used. Thus, the conductive film CG (g, h) can supply a uniform electric field without shielding the display of the display element 750.

Note that a conductive film overlapping with the pixel electrode 751 and the opening of the pixel electrode 751 can be used as the conductive film CG (g, h) (see FIG. 31B).

Alternatively, a conductive film which can be provided in the opening of the pixel electrode 751 can be used as the conductive film CG (g, h) (see FIG. 31C).

Alternatively, a conductive film having an opening and an a non-opening portion which overlap with part of the pixel electrode 751 can be used as the conductive film CG (g, h) (see FIG. 31D).

<Structure Example of Input/Output Device 700H>

Another structure of the input/output device of one embodiment of the present invention is described with reference to FIGS. 32A and 32B.

FIGS. 32A and 32B illustrate the structure of an input/output device 700H of one embodiment of the present invention. FIG. 32A is a cross-sectional view of the input/output device 700H taken along the section lines X1-X2, X3-X4, and X5-X6 in FIG. 27A. FIG. 32B is a cross-sectional view illustrating the details of a transistor MDE which is illustrated in FIG. 32A.

Note that the input/output device 700H differs from the input/output device 700D described with reference to FIGS. 28A to 28C in that a channel protective transistor ME is provided instead of the channel etched transistor MA, that a channel protective transistor MDE is provided instead of the channel etched transistor MD, that the coloring film CF is provided between the conductive film CD (g, h) and the pixel electrode 751, and that the light-blocking film BM is provided between the layer 753 containing a liquid crystal material and the base 710 (see FIG. 32A). Here, the above description is referred to for similar structures, and different structures will be described in detail.

<<Transistor ME, Transistor MDE>>

The transistors ME and MDE can be channel protective transistors. For example, the transistor MDE includes the insulating film 721A which is provided so that the semiconductor film 718 is sandwiched between the insulating film 721A and the insulating film 706 serving as a gate insulating film (see FIG. 32B).

<Method of Controlling Resistivity of Oxide Semiconductor>

The method of controlling the resistivity of a film containing oxide semiconductor will be described.

A film containing an oxide semiconductor with a predetermined resistivity can be used for the conductive film CD (g, h) (see FIG. 28A), the conductive film CE (g, h), and the conductive film 724B (see FIGS. 29A and 29B), or the conductive film CF (g, h), the first region 718A, and the second region 718B (see FIGS. 30A and 30B).

For example, a method of controlling the concentration of impurities such as hydrogen and water contained in the oxide semiconductor and/or the oxygen vacancies in the film can be used as the method of controlling the resistivity of an oxide semiconductor film.

Specifically, plasma treatment can be used as a method of increasing or decreasing the concentration of impurities such as hydrogen and water and/or the oxygen vacancies in the film.

Specifically, plasma treatment using a gas containing one or more kinds selected from a rare gas (He, Ne, Ar, Kr, or Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, a method in which an insulating film containing hydrogen is formed in contact with the oxide semiconductor film, and the hydrogen is diffused from the insulating film to the oxide semiconductor film can be used. Thus, the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, in which case hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to form water, and also causes oxygen vacancies in a lattice from which oxygen is released (or a portion from which oxygen is released). Entry of hydrogen into the oxygen vacancy generates an electron serving as a carrier in some cases. Furthermore, in some cases, bonding of part of hydrogen to oxygen bonded to a metal atom causes generation of an electron serving as a carrier. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, more preferably greater than or equal to $5 \times 10^{20}$ atoms/cm$^3$ can be suitably used for the conductive film CD (g, h) (see FIG. 28A), the conductive film CE (g, h) and the conductive film 724B (see FIGS. 29A and 29B), or the second conductive film CF (g, h), the first region 718A and the second region 718B (see FIGS. 30A and 30B).

Meanwhile, an oxide semiconductor with a high resistivity can be used for a semiconductor film where a channel of a transistor is formed.

For example, an insulating film containing oxygen, in other words, an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are compensated with oxygen and the hydrogen concentration is reduced can be referred to as a highly purified intrinsic or substantially highly purified intrinsic oxide semiconductor film. Here, the term "substantially intrinsic" refers to a state where an oxide semiconductor film has a carrier density of lower than $8 \times 10^{11}$/cm$^3$, preferably lower than $1 \times 10^{11}$/cm$^3$, more preferably lower than $1 \times 10^{10}$/cm$^3$. A highly purified intrinsic or substantially highly purified intrinsic oxide semiconductor film has few carrier generation sources, and thus can have a low carrier density. The highly purified intrinsic or substantially highly purified intrinsic oxide semiconductor film has a low density of defect states and can accordingly have a low density of trap states.

Furthermore, a transistor including the highly purified intrinsic or substantially highly purified intrinsic oxide semiconductor film has an extremely low off-state current; even when an element has a channel width of $1 \times 10^6$ µm and a channel length L of 10 µm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V.

The transistor in which a channel region is formed in the oxide semiconductor film that is a highly purified intrinsic or substantially highly purified intrinsic oxide semiconductor film can have a small change in electrical characteristics and high reliability.

Specifically, an oxide semiconductor whose hydrogen concentration measured by secondary ion mass spectrometry (SIMS) is lower than or equal to $2 \times 10^{20}$ atoms/cm$^3$, preferably lower than or equal to $5 \times 10^{19}$ atoms/cm$^3$, more preferably lower than or equal to $1 \times 10^{19}$ atoms/cm$^3$, more preferably lower than $5 \times 10^{18}$ atoms/cm$^3$, more preferably lower than or equal to $1 \times 10^{18}$ atoms/cm$^3$, more preferably lower than or equal to $5 \times 10^{17}$ atoms/cm$^3$, more preferably lower than or equal to $1 \times 10^{16}$ atoms/cm$^3$ can be favorably used for a semiconductor film where a channel of a transistor is formed.

Note that the transistor MDB includes the semiconductor film 718 and an oxide semiconductor film that has a higher hydrogen concentration and/or a larger number of oxygen vacancies and that has a lower resistivity than the semiconductor film 718 can be used as the conductive film 724B (see FIG. 29B).

The hydrogen concentration in the conductive film 724B is twice or more, preferably ten times or more that in the semiconductor film 718.

The resistivity of the conductive film 724B is greater than or equal to $1 \times 10^{-8}$ times and less than $1 \times 10^{-1}$ times that of the semiconductor film 718.

Specifically, the resistivity of the conductive film 724B is higher than or equal to $1 \times 10^{-3}$ Ωcm and lower than $1 \times 10^4$ Ωcm, preferably higher than or equal to $1 \times 10^{-3}$ Ωcm and lower than $1 \times 10^{-1}$ Ωcm.

Note that this embodiment can be combined with any of the other embodiments in this specification as appropriate.

Embodiment 7

In this embodiment, the input/output device of one embodiment of the present invention or structures of a transistor that can be used in the input/output device of one embodiment of the present invention will be described with reference to FIGS. 33A to 33D.

<Structure Example of Semiconductor Device>

Figure 33A:
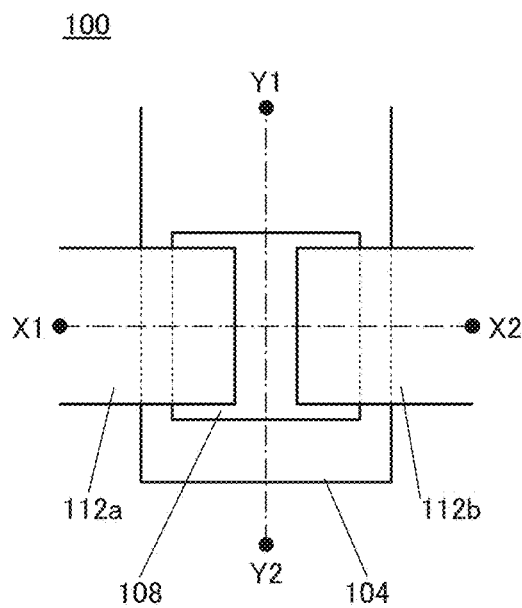
FIGS. 33A to 33D illustrate a structure of a transistor of an embodiment.

FIG. 33A is a top view of a transistor 100. FIG. 33C is a cross-sectional view taken along the section line X1-X2 in FIG. 33A, and FIG. 33D is a cross-sectional view taken along the section line Y1-Y2 in FIG. 33A. Note that in FIG. 33A, some components of the transistor 100 (e.g., an insulating film functioning as a gate insulating film) are not illustrated to avoid complexity. Furthermore, the direction of the section line X1-X2 may be called a channel length direction, and the direction of the section line Y1-Y2 may be called a channel width direction. As in FIG. 33A, some components are not illustrated in some cases in top views of transistors described below.

The transistor 100 can be used for the input/output device 700D described in Embodiment 6.

For example, when the transistor 100 is used as the transistor MA, a substrate 102, a conductive film 104, a stacked film of insulating films 106 and 107, an oxide semiconductor film 108, a conductive film 112a, a conductive film 112b, a stacked film of insulating films 114 and 116, and an insulating film 118 can be referred to as the insulating film 701C, the conductive film 704, the insulating film 706, the semiconductor film 708, the conductive film 712A, the conductive film 712B, the insulating film 716, and an insulating film 721B, respectively.

The transistor 100 includes the conductive film 104 functioning as a gate electrode over the substrate 102, the insulating film 106 over the substrate 102 and the conductive film 104, the insulating film 107 over the insulating film 106, the oxide semiconductor film 108 over the insulating film 107, and the conductive film 112a and the conductive film 112b functioning as a source electrode and a drain electrode, respectively, electrically connected to the oxide semiconductor film 108. Over the transistor 100, specifically, over the conductive films 112a and 112b and the oxide semiconductor film 108, insulating films 114, 116, and 118 are provided. The insulating films 114, 116, and 118 function as protective insulating films for the transistor 100.

The oxide semiconductor film 108 includes a first oxide semiconductor film 108a on the conductive film 104 (functioning as a gate electrode) side and a second oxide semiconductor film 108b over the first oxide semiconductor film 108a. The insulating films 106 and 107 function as gate insulating films of the transistor 100.

In-M oxide (M is Ti, Ga, Sn, Y, Zr, La, Ce, Nd, or Hf) or In—M-Zn oxide can be used for the oxide semiconductor film 108. It is particularly preferable to use In-M-Zn oxide for the oxide semiconductor film 108.

The first oxide semiconductor film 108a includes a first region in which the atomic proportion of In is larger than the atomic proportion of M. The second oxide semiconductor film 108b includes a second region in which the atomic proportion of In is smaller than that in the first oxide semiconductor film 108a. The second region includes a portion thinner than the first region.

The first oxide semiconductor film 108a including the first region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the first oxide semiconductor film 108a including the first region in which the atomic proportion of In is larger than that of M makes it easier to change electrical characteristics of the transistor 100 in light irradiation. However, in the semiconductor device of one embodiment of the present invention, the second oxide semiconductor film 108b is formed over the first oxide semiconductor film 108a. In addition, the thickness of the channel region in the second oxide semiconductor film 108b is less than the thickness of the first oxide semiconductor film 108a.

Furthermore, the second oxide semiconductor film 108b includes the second region in which the atomic proportion of In is smaller than the first oxide semiconductor film 108a and thus has larger Eg than that of the first oxide semiconductor film 108a. For this reason, the oxide semiconductor film 108 which is a stacked-layer structure of the first oxide semiconductor film 108a and the second oxide semiconductor film 108b has high resistance to a negative bias stress test with light irradiation.

The amount of light absorbed by the oxide semiconductor film 108 with the above structure can be reduced during light irradiation. As a result, the change in electrical characteristics of the transistor 100 due to light irradiation can be reduced. In the semiconductor device of one embodiment of the present invention, the insulating film 114 or the insulating film 116 includes excess oxygen. This structure can further reduce the change in electrical characteristics of the transistor 100 due to light irradiation.

Here, the oxide semiconductor film 108 is described in detail with reference to FIG. 33B.

Figure 33B:
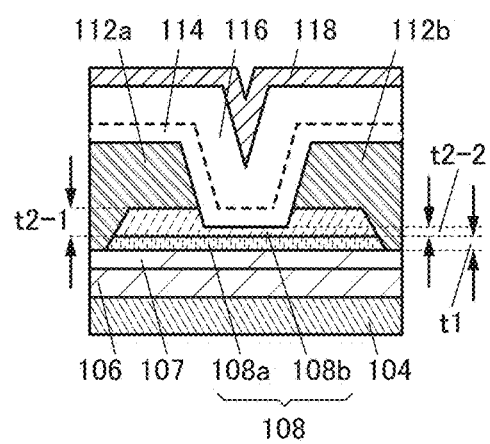
Figure 33C:
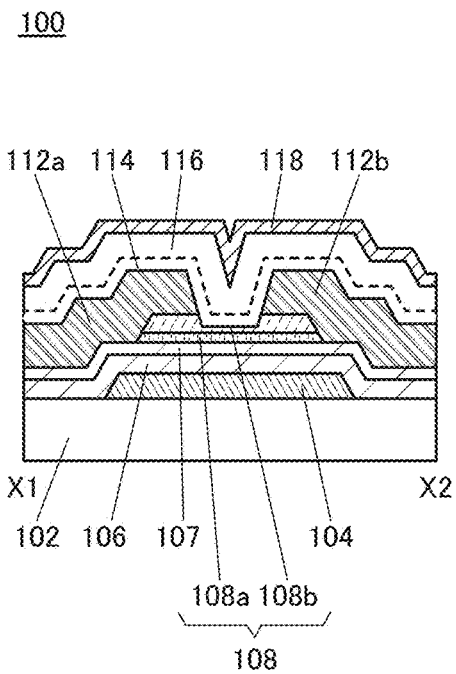
Figure 33D:
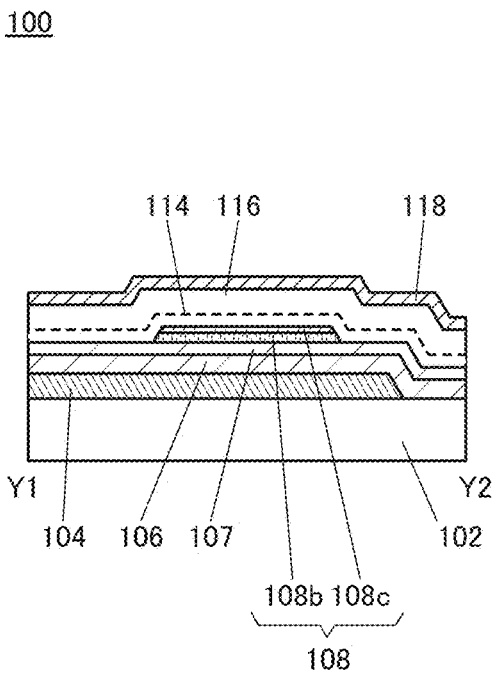

FIG. 33B is a cross-sectional enlarged view of the oxide semiconductor film 108 and the vicinity thereof in the transistor 100 illustrated in FIG. 33C.

In FIG. 33B, t1, t2-1, and t2-2 denote a thickness of the first oxide semiconductor film 108a, one thickness of the second oxide semiconductor film 108b, and the other thickness of the second oxide semiconductor film 108b, respectively. The second oxide semiconductor film 108b over the first oxide semiconductor film 108a prevents the first oxide semiconductor film 108a from being exposed to an etching gas, an etchant, or the like when the conductive films 112a and 112b are formed. This is why the first oxide semiconductor film 108a is not or is hardly reduced in thickness. In contrast, in the second oxide semiconductor film 108b, a portion not overlapping with the conductive films 112a and 112b is etched by formation of the conductive films 112a and 112b, so that a depression is formed in the etched region. In other words, a thickness of the second oxide semiconductor film 108b in a region overlapping with the conductive films 112a and 112b is t2-1, and a thickness of the second oxide semiconductor film 108b in a region not overlapping with the conductive films 112a and 112b is t2-2.

As for the relationships between the thicknesses of the first oxide semiconductor film 108a and the second oxide semiconductor film 108b, t2-1>t1>t2-2 is preferable. A transistor with the thickness relationships can have high field-effect mobility and less variation in threshold voltage in light irradiation.

When oxygen vacancy is formed in the oxide semiconductor film 108 included in the transistor 100, electrons serving as carriers are generated; as a result, the transistor 100 tends to be normally-on. Therefore, for stable transistor characteristics, it is important to reduce oxygen vacancy in the oxide semiconductor film 108 particularly oxygen vacancy in the first oxide semiconductor film 108a. In the structure of the transistor of one embodiment of the present invention, excess oxygen is introduced into an insulating film over the oxide semiconductor film 108, here, the insulating film 114 and/or the insulating film 116 over the oxide semiconductor film 108, whereby oxygen is moved from the insulating film 114 and/or the insulating film 116 to the oxide semiconductor film 108 to fill oxygen vacancy in the oxide semiconductor film 108 particularly in the first oxide semiconductor film 108a.

It is preferable that the insulating films 114 and 116 each include a region (oxygen excess region) including oxygen in excess of that in the stoichiometric composition. In other words, the insulating films 114 and 116 are insulating films capable of releasing oxygen. Note that the oxygen excess region is formed in the insulating films 114 and 116 in such a manner that oxygen is introduced into the insulating films 114 and 116 after the deposition, for example. As a method for introducing oxygen, an ion implantation method, an ion doping method, a plasma immersion ion implantation method, plasma treatment, or the like may be employed.

In order to fill oxygen vacancy in the first oxide semiconductor film 108a, the thickness of the portion including the channel region and the vicinity of the channel region in the second oxide semiconductor film 108b is preferably small, and t2-2<t1 is preferably satisfied. For example, the thickness of the portion including the channel region and the vicinity of the channel region in the second oxide semiconductor film 108b is preferably greater than or equal to 1 nm and less than or equal to 20 nm and further preferably greater than or equal to 3 nm and less than or equal to 10 nm.

Other constituent elements of the semiconductor device of this embodiment are described below in detail.

<<Substrate>>

There is no particular limitation on the property of a material and the like of the substrate 102 as long as the material has heat resistance enough to withstand at least heat treatment to be performed later. For example, a glass substrate, a ceramic substrate, a quartz substrate, or a sapphire substrate may be used as the substrate 102. Alternatively, a single crystal semiconductor substrate or a polycrystalline semiconductor substrate of silicon or silicon carbide, a compound semiconductor substrate of silicon germanium, an SOI substrate, or the like can be used as the substrate 102. Alternatively, any of these substrates provided with a semiconductor element may be used as the substrate 102. Note that in the case where a glass substrate is used as the substrate 102, a large substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured.

Alternatively, a flexible substrate may be used as the substrate 102, and the transistor 100 may be provided directly on the flexible substrate. Alternatively, a separation layer may be provided between the substrate 102 and the transistor 100. The separation layer can be used when part or the whole of a semiconductor device formed over the separation layer is separated from the substrate 102 and transferred onto another substrate. In such a case, the transistor 100 can be transferred to a substrate having low heat resistance or a flexible substrate as well.

<<Conductive Film Functioning as Gate Electrode, Source Electrode, and Drain Electrode>>

The conductive film 104 functioning as a gate electrode, and the conductive film 112a and the conductive film 112b functioning as a source electrode and a drain electrode, respectively, each can be formed using a metal element selected from chromium (Cr), copper (Cu), aluminum (Al), gold (Au), silver (Ag), zinc (Zn), molybdenum (Mo), tantalum (Ta), titanium (Ti), tungsten (W), manganese (Mn), nickel (Ni), iron (Fe), and cobalt (Co); an alloy including any of these metal element as its component; an alloy including a combination of any of these metal elements; or the like.

Furthermore, the conductive films 104, 112a, and 112b may have a single-layer structure or a stacked-layer structure of two or more layers. For example, a single-layer structure of an aluminum film including silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order can be given. Alternatively, an alloy film or a nitride film in which aluminum and one or more elements selected from titanium, tantalum, tungsten, molybdenum, chromium, neodymium, and scandium are combined may be used.

The conductive films 104, 112a, and 112b can be formed using a light-transmitting conductive material such as indium tin oxide, indium oxide including tungsten oxide, indium zinc oxide including tungsten oxide, indium oxide including titanium oxide, indium tin oxide including titanium oxide, indium zinc oxide, or indium tin oxide to which silicon oxide is added.

A Cu—X alloy film (X is Mn, Ni, Cr, Fe, Co, Mo, Ta, or Ti) may be used for the conductive films 104, 112a, and 112b. Use of a Cu—X alloy film enables the manufacturing cost to be reduced because wet etching process can be used in the processing.

<<Insulating Film Functioning as Gate Insulating Film>>

As each of the insulating films 106 and 107 functioning as gate insulating films of the transistor 100, an insulating film including at least one of the following films formed by a plasma enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that instead of a stacked-layer structure of the insulating films 106 and 107, an insulating film of a single layer formed using a material selected from the above or an insulating film of three or more such layers may be used.

The insulating film 106 has a function as a blocking film which inhibits penetration of oxygen. For example, in the case where excess oxygen is supplied to the insulating film 107, the insulating film 114, the insulating film 116, and/or the oxide semiconductor film 108, the insulating film 106 can inhibit penetration of oxygen.

Note that the insulating film 107 that is in contact with the oxide semiconductor film 108 functioning as a channel region of the transistor 100 is preferably an oxide insulating film and preferably includes a region including oxygen in excess of the stoichiometric composition (oxygen-excess region). In other words, the insulating film 107 is an insulating film capable of releasing oxygen. In order to provide the oxygen excess region in the insulating film 107, the insulating film 107 is formed in an oxygen atmosphere, for example. Alternatively, the oxygen excess region may be formed by introduction of oxygen into the insulating film 107 after the deposition. As a method for introducing oxygen, an ion implantation method, an ion doping method, a plasma immersion ion implantation method, plasma treatment, or the like may be employed.

In the case where hafnium oxide is used for the insulating film 107, the following effect is attained. Hafnium oxide has a higher dielectric constant than silicon oxide and silicon oxynitride. Therefore, hafnium oxide, can reduce the leakage current due to tunnel current because the use of hafnium oxide can increase the thickness of the insulating film 107 as compared with the use of silicon oxide. That is, it is possible to provide a transistor with a low off-state current. Moreover, hafnium oxide with a crystalline structure has a higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited thereto.

In this embodiment, a silicon nitride film is formed as the insulating film 106, and a silicon oxide film is formed as the insulating film 107. The silicon nitride film has a higher dielectric constant than a silicon oxide film and needs a greater thickness for capacitance equivalent to that of the silicon oxide film. Thus, when the silicon nitride film is included in the gate insulating film of the transistor 100, the physical thickness of the insulating film can be increased. This makes it possible to reduce a decrease in withstand voltage of the transistor 100 and furthermore to increase the withstand voltage, thereby reducing electrostatic discharge damage to the transistor 100.

<<Oxide Semiconductor Film>>

The oxide semiconductor film 108 can be formed using the materials described above.

In the case where the oxide semiconductor film 108 includes In-M-Zn oxide, it is preferable that the atomic ratio of metal elements of a sputtering target used for forming the In-M-Zn oxide satisfy In≥M and Zn≥M As the atomic ratio of metal elements of such a sputtering target, In:M:Zn=1:1:1, In:M:Zn=1:1:1.2, In:M:Zn=2:1:3, In:M:Zn=3:1:2, and In:M:Zn=4:2:4.1 are preferable.

In the case where the oxide semiconductor film 108 is formed of In-M-Zn oxide, it is preferable to use a target including polycrystalline In-M-Zn oxide as the sputtering target. The use of the target including polycrystalline In-M-Zn oxide facilitates formation of the oxide semiconductor film 108 having crystallinity. Note that the atomic ratios of metal elements in the formed oxide semiconductor film 108 vary from the above atomic ratio of metal elements of the sputtering target within a range of ±40% as an error. For example, when a sputtering target with an atomic ratio of In to Ga and Zn of 4:2:4.1 is used, the atomic ratio of In to Ga and Zn in the oxide semiconductor film 108 may be 4:2:3 or in the vicinity of 4:2:3.

The first oxide semiconductor film 108a can be formed using the sputtering target having an atomic ratio of In:M:Zn=2:1:3, In:M:Zn=3:1:2, or In:M:Zn=4:2:4.1, for example. The second oxide semiconductor film 108b can be formed using the sputtering target having an atomic ratio of In:M:Zn=1:1:1 or In:M:Zn=1:1:1.2, for example. Note that the atomic ratio of metal elements in a sputtering target used for forming the second oxide semiconductor film 108b does not necessarily satisfy In≥M and Zn≥M, and may satisfy In≥M and Zn<M, such as In:M:Zn=1:3:2.

The energy gap of the oxide semiconductor film 108 is 2 eV or more, preferably 2.5 eV or more, and further preferably 3 eV or more. The use of an oxide semiconductor having a wide energy gap can reduce off-state current of the transistor 100. In particular, an oxide semiconductor film having an energy gap of 2 eV or more, preferably 2 eV or more and 3.0 eV or less is preferably used as the first oxide semiconductor film 108a, and an oxide semiconductor film having an energy gap of 2.5 eV or more and 3.5 eV or less is preferably used as the second oxide semiconductor film 108b. Furthermore, the second oxide semiconductor film 108b preferably has a higher energy gap than that of the first oxide semiconductor film 108a.

Each thickness of the first oxide semiconductor film 108a and the second oxide semiconductor film 108b is larger than or equal to 3 nm and smaller than or equal to 200 nm, preferably larger than or equal to 3 nm and smaller than or equal to 100 nm and further preferably larger than or equal to 3 nm and smaller than or equal to 50 nm. Note that the above-described thickness relationships between them are preferably satisfied.

An oxide semiconductor film with low carrier density is used as the second oxide semiconductor film 108b. For example, the carrier density of the second oxide semiconductor film 108b is lower than or equal to $1 \times 10^{17}/cm^3$, preferably lower than or equal to $1 \times 10^{15}/cm^3$, further preferably lower than or equal to $1 \times 10^{13}/cm^3$, and still further preferably lower than or equal to $1 \times 10^{11}/cm^3$.

Note that without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the first oxide semiconductor film 108a and the second oxide semiconductor film 108b be set to be appropriate.

Note that it is preferable to use, as the first oxide semiconductor film 108a and the second oxide semiconductor film 108b, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1 \times 10^6$ μm and a channel length of 10 μm, the off-state current can be less than or equal to the measurement limit of a semiconductor parameter analyzer, that is, less than or equal to $1\times10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, alkaline earth metal, and the like are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film which contains hydrogen is likely to be normally on. Accordingly, it is preferable that hydrogen be reduced as much as possible in the oxide semiconductor film 108. Specifically, in the oxide semiconductor film 108, the concentration of hydrogen which is measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, and still further preferably lower than or equal to $1\times10^{16}$ atoms/cm$^3$.

The first oxide semiconductor film 108a preferably includes a region having a lower hydrogen concentration than the second oxide semiconductor film 108b. When the first oxide semiconductor film 108a includes the region having a lower hydrogen concentration than the second oxide semiconductor film 108b, the semiconductor device can be highly reliable.

When silicon or carbon that is one of elements belonging to Group 14 is included in the first oxide semiconductor film 108a, oxygen vacancy is increased in the first oxide semiconductor film 108a, and the first oxide semiconductor film 108a becomes an n-type film. Thus, the concentration of silicon or carbon (the concentration is measured by SIMS) in the first oxide semiconductor film 108a or the concentration of silicon or carbon (the concentration is measured by SIMS) in the vicinity of an interface with the first oxide semiconductor film 108a is set to be lower than or equal to $2\times10^{18}$ atoms/cm$^3$, preferably lower than or equal to $2\times10^{17}$ atoms/cm$^3$.

In addition, the concentration of alkali metal or alkaline earth metal of the first oxide semiconductor film 108a, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the first oxide semiconductor film 108a.

Furthermore, when including nitrogen, the first oxide semiconductor film 108a easily becomes n-type by generation of electrons serving as carriers and an increase of carrier density. Thus, a transistor including an oxide semiconductor film which contains nitrogen is likely to have normally-on characteristics. For this reason, nitrogen in the oxide semiconductor film is preferably reduced as much as possible; the concentration of nitrogen which is measured by SIMS is preferably set to be, for example, lower than or equal to $5\times10^{18}$ atoms/cm$^3$.

Each of the first oxide semiconductor film 108a and the second oxide semiconductor film 108b may have a non-single-crystal structure, for example. The non-single crystal structure includes a c-axis aligned crystalline oxide semiconductor (CAAC-OS) described later, a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Film Functioning as Protective Insulating Film of Transistor>>

The insulating films 114 and 116 each have a function of supplying oxygen to the oxide semiconductor film 108. The insulating film 118 has a function of a protective insulating film of the transistor 100. The insulating films 114 and 116 include oxygen. Furthermore, the insulating film 114 is an insulating film capable of transmitting oxygen. The insulating film 114 also functions as a film which relieves damage to the oxide semiconductor film 108 at the time of forming the insulating film 116 in a later step.

A silicon oxide film, a silicon oxynitride film, or the like with a thickness greater than or equal to 5 nm and less than or equal to 150 nm, preferably greater than or equal to 5 nm and less than or equal to 50 nm, can be used as the insulating film 114.

In addition, it is preferable that the number of defects in the insulating film 114 be small and typically, the spin density corresponding to a signal that appears at g=2.001 due to a dangling bond of silicon be lower than or equal to $3\times10^{17}$ spins/cm$^3$ by electron spin resonance (ESR) measurement. This is because if the density of defects in the insulating film 114 is high, oxygen is bonded to the defects and the amount of oxygen that transmits the insulating film 114 is decreased.

Note that all oxygen entering the insulating film 114 from the outside does not move to the outside of the insulating film 114 and some oxygen remains in the insulating film 114. Furthermore, movement of oxygen occurs in the insulating film 114 in some cases in such a manner that oxygen enters the insulating film 114 and oxygen included in the insulating film 114 moves to the outside of the insulating film 114. When an oxide insulating film capable of transmitting oxygen is formed as the insulating film 114, oxygen released from the insulating film 116 provided over the insulating film 114 can be moved to the oxide semiconductor film 108 through the insulating film 114.

Note that the insulating film 114 can be formed using an oxide insulating film having a low density of states due to nitrogen oxide. Note that the density of states due to nitrogen oxide can be formed between the energy of the valence band maximum ($E_{v\_os}$) and the energy of the conduction band minimum ($E_{c\_os}$) of the oxide semiconductor film. A silicon oxynitride film that releases less nitrogen oxide, an aluminum oxynitride film that releases less nitrogen oxide, and the like can be used as the above oxide insulating film.

Note that a silicon oxynitride film that releases less nitrogen oxide is a film of which the amount of released ammonia is larger than the amount of released nitrogen oxide in TDS analysis; the amount of released ammonia is typically greater than or equal to $1\times10^{18}$/cm$^3$ and less than or equal to $5\times10^{19}$/cm$^3$. Note that the amount of released ammonia is the amount of ammonia released by heat treatment with which the surface temperature of a film becomes higher than or equal to 50° C. and lower than or equal to 650° C., preferably higher than or equal to 50° C. and lower than or equal to 550° C.

Nitrogen oxide (NO$_x$; x is greater than 0 and less than or equal to 2, preferably greater than or equal to 1 and less than or equal to 2), typically NO$_2$ or NO, forms levels in the insulating film 114, for example. The level is positioned in the energy gap of the oxide semiconductor film 108. Therefore, when nitrogen oxide is diffused to the interface between the insulating film 114 and the oxide semiconductor film 108, an electron is in some cases trapped by the level on the insulating film 114 side. As a result, the trapped electron remains in the vicinity of the interface between the insulating film 114 and the oxide semiconductor film 108; thus, the threshold voltage of the transistor is shifted in the positive direction.

Nitrogen oxide reacts with ammonia and oxygen in heat treatment. Since nitrogen oxide included in the insulating film 114 reacts with ammonia included in the insulating film 116 in heat treatment, nitrogen oxide included in the insulating film 114 is reduced. Therefore, an electron is hardly trapped at the interface between the insulating film 114 and the oxide semiconductor film 108.

By using such an oxide insulating film, the insulating film 114 can reduce the shift in the threshold voltage of the transistor, which leads to a smaller change in the electrical characteristics of the transistor.

Note that in an ESR spectrum at 100 K or lower of the insulating film 114, by heat treatment of a manufacturing process of the transistor, typically heat treatment at a temperature higher than or equal to 300° C. and lower than 350° C., a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals that are obtained by ESR measurement using an X-band are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is lower than $1\times10^{18}$ spins/cm$^3$, typically higher than or equal to $1\times10^{17}$ spins/cm$^3$ and lower than $1\times10^{18}$ spins/cm$^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide (NO$_x$; x is greater than 0 and less than or equal to 2, preferably greater than or equal to 1 and less than or equal to 2). Typical examples of nitrogen oxide include nitrogen monoxide and nitrogen dioxide. In other words, the lower the total spin density of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is, the lower the content of nitrogen oxide in the oxide insulating film is.

The concentration of nitrogen of the above oxide insulating film measured by SIMS is lower than or equal to $6\times10^{20}$ atoms/cm$^3$.

The above oxide insulating film is formed by a PECVD method at a film surface temperature higher than or equal to 220° C. and lower than or equal to 350° C. using silane and dinitrogen monoxide, whereby a dense and hard film can be formed.

The insulating film 116 is formed using an oxide insulating film that contains oxygen in excess of that in the stoichiometric composition. Part of oxygen is released by heating from the oxide insulating film including oxygen in excess of that in the stoichiometric composition. The oxide insulating film including oxygen in excess of that in the stoichiometric composition is an oxide insulating film of which the amount of released oxygen converted into oxygen atoms is greater than or equal to $1.0\times10^{19}$ atoms/cm$^3$, preferably greater than or equal to $3.0\times10^{20}$ atoms/cm$^3$, in TDS analysis. Note that the temperature of the film surface in the TDS analysis is preferably higher than or equal to 100° C. and lower than or equal to 700° C., or higher than or equal to 100° C. and lower than or equal to 500° C.

A silicon oxide film, a silicon oxynitride film, or the like with a thickness greater than or equal to 30 nm and less than or equal to 500 nm, preferably greater than or equal to 50 nm and less than or equal to 400 nm, can be used as the insulating film 116.

It is preferable that the number of defects in the insulating film 116 be small, and typically the spin density corresponding to a signal which appears at g=2.001 due to a dangling bond of silicon be lower than $1.5\times10^{18}$ spins/cm$^3$, preferably lower than or equal to $1\times10^{18}$ spins/cm$^3$, by ESR measurement. Note that the insulating film 116 is provided more apart from the oxide semiconductor film 108 than the insulating film 114 is; thus, the insulating film 116 may have higher density of defects than the insulating film 114.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114 may be employed.

The insulating film 118 includes nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118. A nitride insulating film, for example, can be used as the insulating film 118. The nitride insulating film is formed using silicon nitride, silicon nitride oxide, aluminum nitride, aluminum nitride oxide, or the like. Note that instead of the nitride insulating film having a blocking effect against oxygen, hydrogen, water, alkali metal, alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and the like can be given.

Although the variety of films such as the conductive films, the insulating films, and the oxide semiconductor films which are described above can be formed by a sputtering method or a PECVD method, such films may be formed by another method, e.g., a thermal CVD method. Examples of the thermal CVD method include a metal organic chemical vapor deposition (MOCVD) method and an atomic layer deposition (ALD) method.

A thermal CVD method has an advantage that no defect due to plasma damage is generated because it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first source gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas which is obtained by vaporizing liquid containing a solvent and a hafnium precursor compound (e.g., a hafnium alkoxide or a hafnium amide such as tetrakis(dimethylamide)hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas which is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., $O_2$ or dinitrogen monoxide) are supplied to react with the adsorbate.

For example, in the case where a tungsten film is formed with a deposition apparatus using an ALD method, a $WF_6$ gas and a $B_2H_6$ gas are sequentially introduced plural times to form an initial tungsten film, and then a $WF_6$ gas and an $H_2$ gas are used, so that a tungsten film is formed. Note that an $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced plural times to form an InO layer, a GaO layer is formed using a $Ga(CH_3)_3$ gas and an $O_3$ gas, and then a ZnO layer is formed using a $Zn(CH_3)_2$ gas and an $O_3$ gas. Note that the order of these layers is not limited to this example. A mixed compound layer such as an In—Ga—O layer, an In—Zn—O layer, or a Ga—Zn—O layer may be formed by mixing these gases. Note that although an $H_2O$ gas which is obtained by bubbling water with an inert gas such as Ar may be used instead of an $O_3$ gas, it is preferable to use an $O_3$ gas, which does not contain H. Furthermore, instead of an $In(CH_3)_3$ gas, an $In(C_2H_5)_3$ gas may be used. Instead of a $Ga(CH_3)_3$ gas, a $Ga(C_2H_5)_3$ gas may be used. Furthermore, a $Zn(CH_3)_2$ gas may be used.

This embodiment can be combined with any of the other embodiments in this specification as appropriate.

Embodiment 8

In this embodiment, the input/output device of one embodiment of the present invention or structures of a transistor that can be used in the input/output device of one embodiment of the present invention will be described with reference to FIGS. 34A to 34C.

<Structure Example of Semiconductor Device>

Figure 34A:
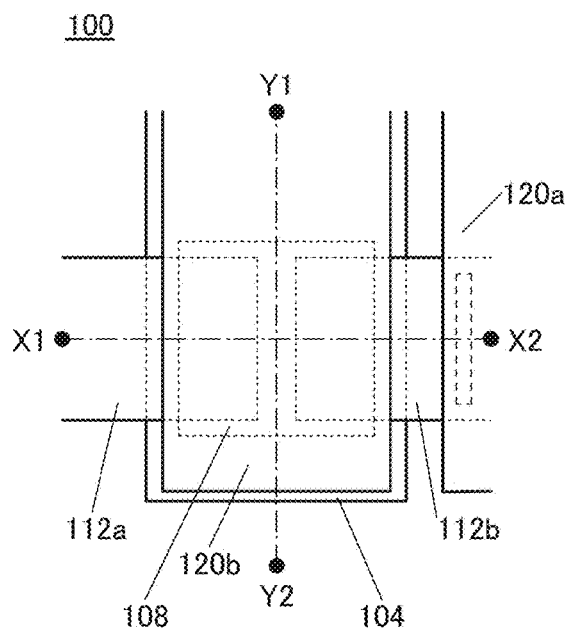
FIGS. 34A to 34C illustrate a structure of a transistor of an embodiment.
Figure 34B:
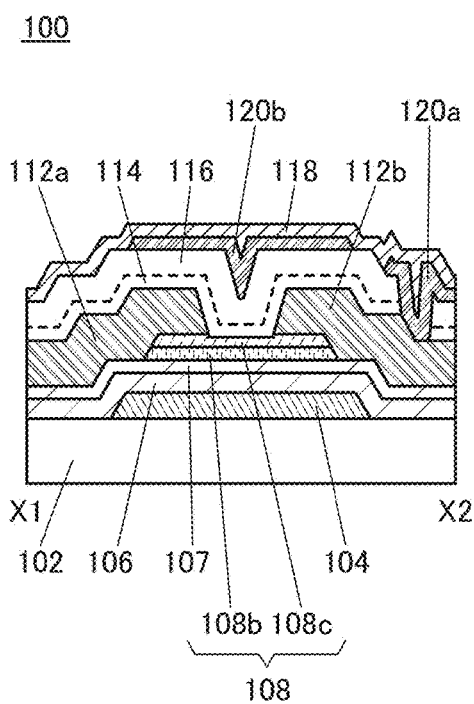
Figure 34C:
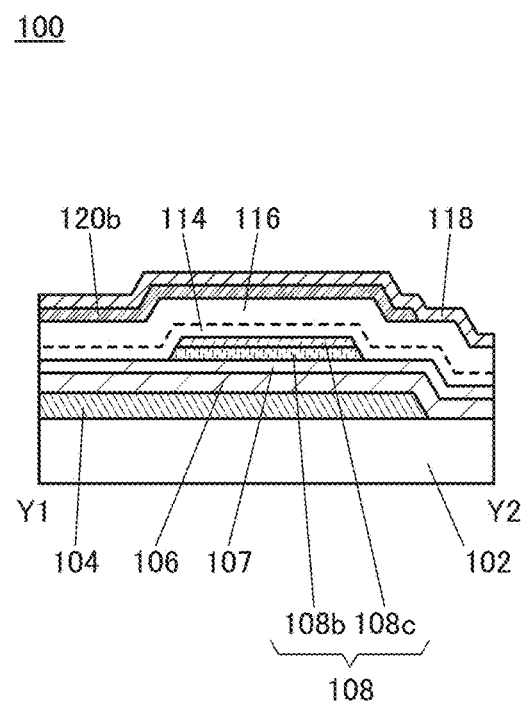

FIG. 34A is a top view of the transistor 100. FIG. 34B is a cross-sectional view taken along the section line X1-X2 in FIG. 34A, and FIG. 34C is a cross-sectional view taken along the section line Y1-Y2 in FIG. 34A. Note that in FIG. 34A, some components of the transistor 100 (e.g., an insulating film functioning as a gate insulating film) are not illustrated to avoid complexity. Furthermore, the direction of the section line X1-X2 may be called a channel length direction, and the direction of the section line Y1-Y2 may be called a channel width direction. As in FIG. 34A, some components are not illustrated in some cases in top views of transistors described below.

The transistor 100 can be used for the input/output device described in Embodiment 6.

For example, when the transistor 100 is used as the transistor MD, the substrate 102, the conductive film 104, a stacked film of the insulating films 106 and 107, the oxide semiconductor film 108, the conductive film 112*a*, the conductive film 112*b*, a stacked film of the insulating films 114 and 116, the insulating film 118, and a conductive film 120*b* can be referred to as the insulating film 701C, the conductive film 704, the insulating film 706, the semiconductor film 708, the conductive film 712A, the conductive film 712B, the insulating film 716, the insulating film 721B, and the conductive film 724, respectively.

The transistor 100 includes the conductive film 104 functioning as a first gate electrode over the substrate 102, the insulating film 106 over the substrate 102 and the conductive film 104, the insulating film 107 over the insulating film 106, the oxide semiconductor film 108 over the insulating film 107, the conductive films 112*a* and 112*b* functioning as a source electrode and a drain electrode, respectively, electrically connected to the oxide semiconductor film 108, the insulating films 114 and 116 over the oxide semiconductor film 108 and the conductive films 112*a* and 112*b*, a conductive film 120*a* that is over the insulating film 116 and electrically connected to the conductive film 112*b*, the conductive film 120*b* over the insulating film 116, and the insulating film 118 over the insulating film 116 and the conductive films 120*a* and 120*b*.

The insulating films 106 and 107 function as a first gate insulating film of the transistor 100. The insulating films 114 and 116 function as a second gate insulating film of the transistor 100. The insulating film 118 functions as a protective insulating film of the transistor 100. In this specification and the like, the insulating films 106 and 107 are collectively referred to as a first insulating film, the insulating films 114 and 116 are collectively referred to as a second insulating film, and the insulating film 118 is referred to as a third insulating film in some cases.

The conductive film 120*b* can be used as a second gate electrode of the transistor 100.

In the case where the transistor 100 is used in a pixel portion of a display panel, the conductive film 120*a* can be used as an electrode of a display element, or the like.

The oxide semiconductor film 108 includes the oxide semiconductor film 108*b* on the conductive film 104 (functioning as a first gate electrode) side, and an oxide semiconductor film 108*c* over the oxide semiconductor film 108*b*. The oxide semiconductor film 108*b* and the oxide semiconductor film 108*c* contain In, M (M is Al, Ga, Y, or Sn), and Zn.

The oxide semiconductor film 108*b* preferably includes a region in which the atomic proportion of In is larger than the atomic proportion of M, for example. The oxide semiconductor film 108*c* preferably includes a region in which the atomic proportion of In is smaller than that in the oxide semiconductor film 108*b*.

The oxide semiconductor film 108*b* including the region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs, preferably exceed 30 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the oxide semiconductor film 108*b* including the region in which the atomic proportion of In is larger than that of M makes it easier to change electrical characteristics of the transistor 100 in light irradiation. However, in the semiconductor device of one embodiment of the present invention, the oxide semiconductor film 108*c* is formed over the oxide semiconductor film 108*b*. Furthermore, the oxide semiconductor film 108*c* including the region in which the atomic proportion of In is smaller than that in the oxide semiconductor film 108*b* has larger Eg than the oxide semiconductor film 108*b*. For this reason, the oxide semiconductor film 108 which has a stacked-layer structure of the oxide semiconductor film 108*b* and the oxide semiconductor film 108*c* has high resistance to a negative bias stress test with light irradiation.

Impurities such as hydrogen or moisture entering the channel region of the oxide semiconductor film 108, particularly the oxide semiconductor film 108*b* adversely affect the transistor characteristics and therefore cause a problem. Moreover, it is preferable that the amount of impurities such as hydrogen or moisture in the channel region of the oxide semiconductor film 108*b* be as small as possible. Furthermore, oxygen vacancies formed in the channel region in the oxide semiconductor film 108*b* adversely affect the transistor characteristics and therefore cause a problem. For example, oxygen vacancies formed in the channel region in the oxide semiconductor film 108*b* are bonded to hydrogen to serve as a carrier supply source. The carrier supply source generated in the channel region in the oxide semiconductor film 108*b* causes a change in the electrical characteristics, typically, a shift in the threshold voltage, of the transistor 100 including the oxide semiconductor film 108*b*. Therefore, it is preferable that the amount of oxygen vacancies in the channel region of the oxide semiconductor film 108*b* be as small as possible.

In view of this, one embodiment of the present invention is a structure in which insulating films in contact with the oxide semiconductor film 108, specifically the insulating film 107 formed under the oxide semiconductor film 108 and the insulating films 114 and 116 formed over the oxide semiconductor film 108 include excess oxygen. Oxygen or excess oxygen is transferred from the insulating film 107 and the insulating films 114 and 116 to the oxide semiconductor film 108, whereby the oxygen vacancies in the oxide semiconductor film can be reduced. As a result, a change in electrical characteristics of the transistor 100, particularly a change in electrical characteristics of the transistor 100 due to light irradiation, can be reduced.

In one embodiment of the present invention, a manufacturing method is used in which the number of manufacturing steps is not increased or an increase in the number of manufacturing steps is extremely small, because the insulating film 107 and the insulating films 114 and 116 are made to contain excess oxygen. Thus, the transistors 100 can be manufactured with high yield.

Specifically, in a step of forming the oxide semiconductor film 108*b*, the oxide semiconductor film 108*b* is formed by a sputtering method in an atmosphere containing an oxygen gas, whereby oxygen or excess oxygen is added to the insulating film 107 over which the oxide semiconductor film 108*b* is formed.

Furthermore, in a step of forming the conductive films 120a and 120b, the conductive films 120a and 120b are formed by a sputtering method in an atmosphere containing an oxygen gas, whereby oxygen or excess oxygen is added to the insulating film 116 over which the conductive films 120a and 120b are formed. Note that in some cases, oxygen or excess oxygen is added also to the insulating film 114 and the oxide semiconductor film 108 under the insulating film 116 when oxygen or excess oxygen is added to the insulating film 116.

<Oxide Conductor>

Next, an oxide conductor is described. In a step of forming the conductive films 120a and 120b, the conductive films 120a and 120b serve as a protective film for suppressing release of oxygen from the insulating films 114 and 116. The conductive films 120a and 120b serve as semiconductors before a step of forming the insulating film 118 and serve as conductors after the step of forming the insulating film 118.

To allow the conductive films 120a and 120b to serve as conductors, an oxygen vacancy is formed in the conductive films 120a and 120b and hydrogen is added from the insulating film 118 to the oxygen vacancy, whereby a donor level is formed in the vicinity of the conduction band. As a result, the conductivity of each of the conductive films 120a and 120b is increased, so that the conductive films 120a and 120b become conductors. The conductive films 120a and 120b having become conductors each can be referred to as oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small in an oxide conductor, and an oxide conductor has a visible light transmitting property comparable to that of an oxide semiconductor.

<Components of Semiconductor Device>

Components of the semiconductor device of this embodiment are described below in detail.

As materials described below, materials similar to the materials described in Embodiment 7 can be used.

The material that can be used for the substrate 102 described in Embodiment 7 can be used for the substrate 102 described in this embodiment. Furthermore, the materials that can be used for the insulating films 106 and 107 described in Embodiment 7 can be used for the insulating films 106 and 107 described in this embodiment.

In addition, the materials that can be used for the conductive films functioning as the gate electrode, the source electrode, and the drain electrode described in Embodiment 7 can be used for the conductive films functioning as the first gate electrode, the source electrode, and the drain electrode described in this embodiment.

<<Oxide Semiconductor Film>>

The oxide semiconductor film 108 can be formed using the materials described above.

In the case where the oxide semiconductor film 108b includes In-M-Zn oxide, it is preferable that the atomic ratio of metal elements of a sputtering target used for forming the In-M-Zn oxide satisfy In >M The atomic ratio between metal elements in such a sputtering target is, for example, In:M:Zn=2:1:3, In:M:Zn=3:1:2, or In:M:Zn=4:2:4.1.

In the case where the oxide semiconductor film 108c is In-M-Zn oxide, it is preferable that the atomic ratio of metal elements of a sputtering target used for forming a film of the In-M-Zn oxide satisfy In The atomic ratio of metal elements in such a sputtering target is, for example, In:M:Zn=1:1:1, In:M:Zn=1:1:1.2, In:M:Zn=1:3:2, In:M:Zn=1:3:4, or In:M:Zn=1:3:6.

In the case where the oxide semiconductor film 108b and the oxide semiconductor film 108c are formed of In-M-Zn oxide, it is preferable to use a target including polycrystalline In-M-Zn oxide as the sputtering target. The use of the target including polycrystalline In-M-Zn oxide facilitates formation of the oxide semiconductor film 108b and the oxide semiconductor film 108c having crystallinity. Note that the atomic ratios of metal elements in each of the formed oxide semiconductor film 108b and the formed oxide semiconductor film 108c vary from the above atomic ratio of metal elements of the sputtering target within a range of ±40% as an error. For example, when a sputtering target of the oxide semiconductor film 108b with an atomic ratio of In to Ga and Zn of 4:2:4.1 is used, the atomic ratio of In to Ga and Zn in the oxide semiconductor film 108b may be 4:2:3 or in the vicinity of 4:2:3.

The energy gap of the oxide semiconductor film 108 is 2 eV or more, preferably 2.5 eV or more, and further preferably 3 eV or more. The use of an oxide semiconductor having a wide energy gap can reduce off-state current of the transistor 100. In particular, an oxide semiconductor film having an energy gap of 2 eV or more, preferably 2 eV or more and 3.0 eV or less, is preferably used as the oxide semiconductor film 108b, and an oxide semiconductor film having an energy gap of 2.5 eV or more and 3.5 eV or less is preferably used as the oxide semiconductor film 108c. Furthermore, the oxide semiconductor film 108c preferably has a higher energy gap than the oxide semiconductor film 108b.

Each thickness of the oxide semiconductor film 108b and the oxide semiconductor film 108c is greater than or equal to 3 nm and less than or equal to 200 nm, preferably greater than or equal to 3 nm and less than or equal to 100 nm and further preferably greater than or equal to 3 nm and less than or equal to 50 nm.

An oxide semiconductor film with a low carrier density is used as the oxide semiconductor film 108c. For example, the carrier density of the oxide semiconductor film 108c is lower than or equal to $1 \times 10^{17}/\text{cm}^3$, preferably lower than or equal to $1 \times 10^{15}/\text{cm}^3$, further preferably lower than or equal to $1 \times 10^{13}/\text{cm}^3$, and still further preferably lower than or equal to $1 \times 10^{11}/\text{cm}^3$.

Note that without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor film 108b and the oxide semiconductor film 108c be set to be appropriate.

Note that it is preferable to use, as the oxide semiconductor film 108b and the oxide semiconductor film 108c, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1 \times 10^6$ μm and a channel length L of 10 μm, the off-state current can be less than or equal to the measurement limit of a semiconductor parameter analyzer, that is, less than or equal to $1 \times 10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, and alkaline earth metal are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film which contains hydrogen is likely to be normally on. Accordingly, it is preferable that hydrogen be reduced as much as possible in the oxide semiconductor film 108. Specifically, in the oxide semiconductor film 108, the concentration of hydrogen which is measured by SIMS is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, further preferably lower than or equal to $5 \times 10^{18}$ atoms/cm$^3$, further preferably lower than or equal to $1 \times 10^{18}$ atoms/cm$^3$, further preferably lower than or equal to $5 \times 10^{17}$ atoms/cm$^3$, and still further preferably lower than or equal to $1 \times 10^{16}$ atoms/cm$^3$.

The oxide semiconductor film 108b preferably includes a region in which hydrogen concentration is smaller than that in the oxide semiconductor film 108c. A semiconductor device including the oxide semiconductor film 108b having the region in which hydrogen concentration is smaller than that in the oxide semiconductor film 108c can be increased in reliability.

When silicon or carbon that is one of elements belonging to Group 14 is included in the oxide semiconductor film 108b, oxygen vacancy increases in the oxide semiconductor film 108b, and the oxide semiconductor film 108b becomes an n-type film. Thus, the concentration of silicon or carbon (the concentration is measured by SIMS) in the oxide semiconductor film 108b or the concentration of silicon or carbon (the concentration is measured by SIMS) in the vicinity of an interface with the oxide semiconductor film 108b is set to be lower than or equal to $2 \times 10^{18}$ atoms/cm$^3$, preferably lower than or equal to $2 \times 10^{17}$ atoms/cm$^3$.

In addition, the concentration of alkali metal or alkaline earth metal of the oxide semiconductor film 108b, which is measured by SIMS, is lower than or equal to $1 \times 10^{18}$ atoms/cm$^3$, preferably lower than or equal to $2 \times 10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the oxide semiconductor film 108b.

Furthermore, when including nitrogen, the oxide semiconductor film 108b easily becomes n-type by generation of electrons serving as carriers and an increase of carrier density.

Thus, a transistor including an oxide semiconductor film which contains nitrogen is likely to have normally-on characteristics. For this reason, nitrogen in the oxide semiconductor film is preferably reduced as much as possible; the concentration of nitrogen which is measured by SIMS is preferably set to be, for example, lower than or equal to $5 \times 10^{18}$ atoms/cm$^3$.

The oxide semiconductor film 108b and the oxide semiconductor film 108c may have a non-single-crystal structure, for example. The non-single crystal structure includes a c-axis aligned crystalline oxide semiconductor (CAAC-OS) described later, a polycrystalline structure, a microcrystalline structure, or an amorphous structure, for example. Among the non-single crystal structure, the amorphous structure has the highest density of defect states, whereas CAAC-OS has the lowest density of defect states.

<<Insulating Films Functioning as Second Gate Insulating Film>>

The insulating films 114 and 116 function as a second gate insulating film of the transistor 100. In addition, the insulating films 114 and 116 each have a function of supplying oxygen to the oxide semiconductor film 108. That is, the insulating films 114 and 116 contain oxygen. Furthermore, the insulating film 114 is an insulating film which can transmit oxygen. Note that the insulating film 114 also functions as a film which relieves damage to the oxide semiconductor film 108 at the time of forming the insulating film 116 in a later step.

For example, the insulating films 114 and 116 described in Embodiment 7 can be used as the insulating films 114 and 116 described in this embodiment.

<<Oxide Semiconductor Film Functioning as Conductive Film, Oxide Semiconductor Film Functioning as Second Gate Electrode>>

A material similar to the material of the oxide semiconductor film 108 described above can be used for the conductive film 120a functioning as a conductive film and the conductive film 120b functioning as the second gate electrode.

That is, the conductive film 120a functioning as a conductive film and the conductive film 120b functioning as a second gate electrode contain a metal element which is the same as that contained in the oxide semiconductor film 108 (the oxide semiconductor film 108b and the oxide semiconductor film 108c). For example, the conductive film 120b functioning as a second gate electrode and the oxide semiconductor film 108 (the oxide semiconductor film 108b and the oxide semiconductor film 108c) contain the same metal element; thus, the manufacturing cost can be reduced.

For example, in the case where the conductive film 120a functioning as a conductive film and the conductive film 120b functioning as a second gate electrode are each In-M-Zn oxide, the atomic ratio of metal elements in a sputtering target used for forming the In-M-Zn oxide preferably satisfies In≥M. The atomic ratio of metal elements in such a sputtering target is In:M:Zn=2:1:3, In:M:Zn=3:1:2, In:M:Zn=4:2:4.1, or the like.

The conductive film 120a functioning as a conductive film and the conductive film 120b functioning as a second gate electrode can each have a single-layer structure or a stacked-layer structure of two or more layers. Note that in the case where the conductive films 120a and 120b each have a stacked-layer structure, the composition of the sputtering target is not limited to that described above.

<<Insulating Film Functioning as Protective Insulating Film of Transistor>>

The insulating film 118 functions as a protective insulating film of the transistor 100.

The insulating film 118 includes one or both of hydrogen and nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118.

The insulating film 118 has a function of supplying one or both of hydrogen and nitrogen to the conductive film 120a functioning as a conductive film and the conductive film 120b functioning as a second gate electrode. The insulating film 118 preferably includes hydrogen and has a function of supplying the hydrogen to the conductive films 120a and 120b. The conductive films 120a and 120b supplied with hydrogen from the insulating film 118 function as conductors.

A nitride insulating film, for example, can be used as the insulating film 118. The nitride insulating film is formed using silicon nitride, silicon nitride oxide, aluminum nitride, aluminum nitride oxide, or the like.

Although the variety of films such as the conductive films, the insulating films, and the oxide semiconductor films which are described above can be formed by a sputtering method or a PECVD method, such films may be formed by another method, e.g., a thermal CVD method. Examples of the thermal CVD method include an MOCVD method and an ALD method.

A thermal CVD method has an advantage that no defect due to plasma damage is generated because it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first source gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas which is obtained by vaporizing liquid containing a solvent and a hafnium precursor compound (e.g., a hafnium alkoxide or a hafnium amide such as tetrakis(dimethylamide)hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas which is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., $O_2$ or dinitrogen monoxide) are supplied to react with the adsorbate.

For example, in the case where a tungsten film is formed with a deposition apparatus using an ALD method, a $WF_6$ gas and a $B_2H_6$ gas are sequentially introduced plural times to form an initial tungsten film, and then a $WF_6$ gas and an $H_2$ gas are used, so that a tungsten film is formed. Note that an $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced plural times to form an InO layer, a GaO layer is formed using a Ga(CH$_3$)$_3$ gas and an O$_3$ gas, and then a ZnO layer is formed using a Zn(CH$_3$)$_2$ gas and an O$_3$ gas. Note that the order of these layers is not limited to this example. A mixed compound layer such as an In—Ga—O layer, an In—Zn—O layer, or a Ga—Zn—O layer may be formed by mixing these gases. Note that although an H$_2$O gas which is obtained by bubbling water with an inert gas such as Ar may be used instead of an O$_3$ gas, it is preferable to use an O$_3$ gas, which does not contain H. Furthermore, instead of an In(CH$_3$)$_3$ gas, an In(C$_2$H$_5$)$_3$ gas may be used. Instead of a Ga(CH$_3$)$_3$ gas, a Ga(C$_2$H$_5$)$_3$ gas may be used. Furthermore, a Zn(CH$_3$)$_2$ gas may be used.

This embodiment can be combined with any of the other embodiments in this specification as appropriate.

Embodiment 9

In this embodiment, the structure of a data processing device of one embodiment of the present invention is described with reference to FIGS. 35A and 35B, FIGS. 36A to 36C, FIGS. 37A and 37B, and FIG. 38.

Figure 35A:
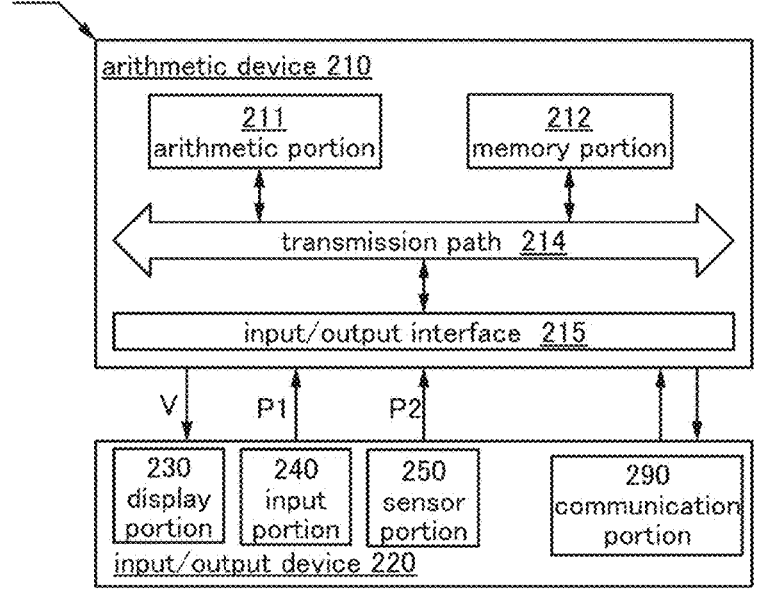
FIGS. 35A and 35B illustrate a structure of a data processing device of an embodiment.
Figure 35B:
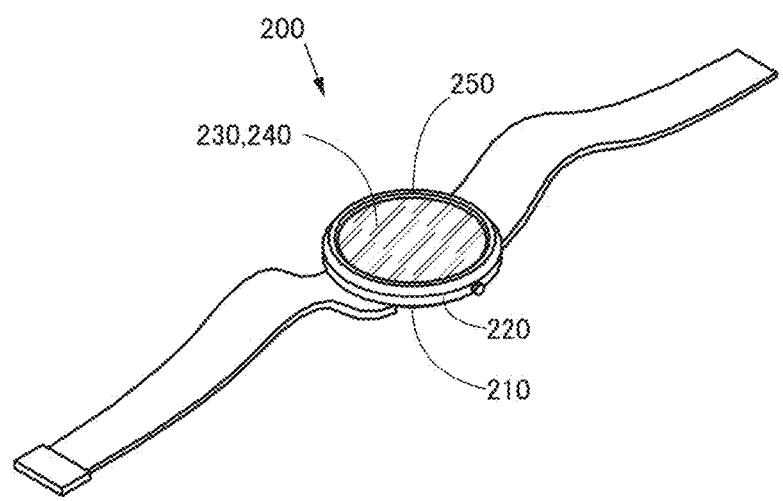

FIG. 35A is a block diagram illustrating the structure of a data processing device 200. FIG. 35B is a projection view illustrating an example of an external view of the data processing device 200.

Figure 36A:
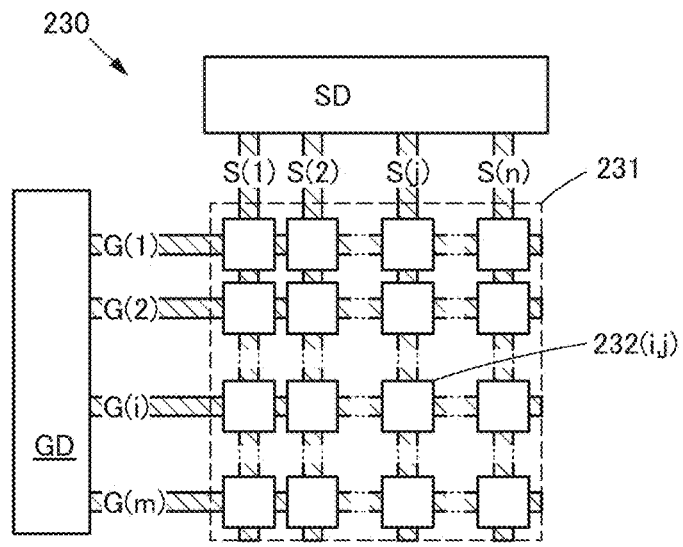
FIGS. 36A to 36C illustrate structures of display portions of an embodiment.
Figure 36B:
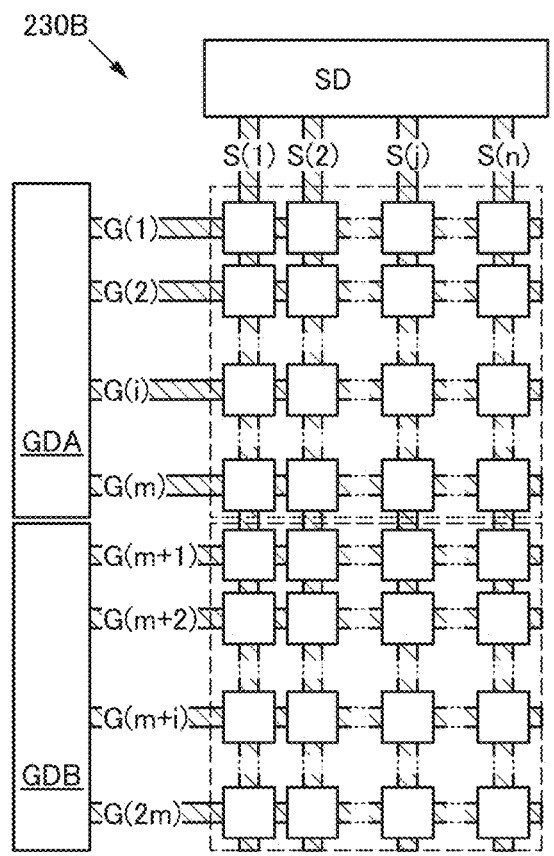
Figure 36C:
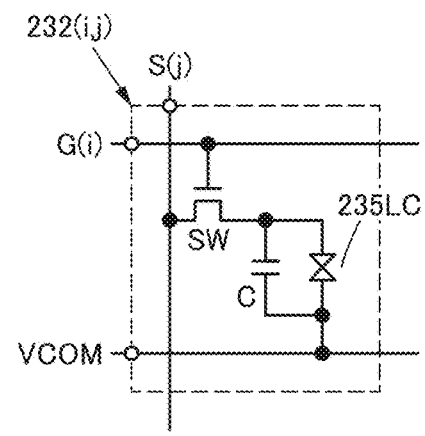

FIG. 36A is a diagram illustrating the structure of a display portion 230. FIG. 36B is a diagram illustrating the structure of a display portion 230B. FIG. 36C is a circuit diagram illustrating the structure of a pixel 232 (i, j).

<Structural Example of Data Processing Device>

The data processing device 200 described in this embodiment includes an arithmetic device 210 and an input/output device 220 (see FIG. 35A).

The arithmetic device 210 has a function of receiving positional data P1 and supplying image data V and control data.

The input/output device 220 has a function of supplying the positional data P1 and receive the image data V and the control data.

The input/output device 220 includes the display portion 230 that displays the image data V and an input portion 240 that supplies the positional data P1.

The display portion 230 includes a display element and a pixel circuit for driving the display element.

The input portion 240 has functions of sensing the position of a pointer and supplying the positional data P1 sensed in accordance with the position.

The arithmetic device 210 is configured to determine the moving speed of the pointer in accordance with the positional data P1, and the like.

The arithmetic device 210 is configured to determine the contrast or brightness of the image data V in accordance with the moving speed, and the like.

With this structure, eyestrain on a user caused when the display position of image data is moved can be reduced, that is, eye-friendly display can be achieved. As a result, a novel data processing device with high convenience or high reliability can be provided.

<Structure>

The data processing device of one embodiment of the present invention includes the arithmetic device 210 or the input/output device 220.

<<Arithmetic Device 210>>

The arithmetic device 210 includes an arithmetic portion 211 and a memory portion 212. The arithmetic device 210 further includes a transmission path 214 and an input/output interface 215 (see FIG. 35A).

<<Arithmetic Portion 211>>

The arithmetic portion 211 is configured to, for example, execute a program.

For example, a CPU described in Embodiment 10 can be used for the arithmetic portion 211. In that case, power consumption can be reduced.

<<Memory Portion 212>>

The memory portion 212 is configured to, for example, store the program executed by the arithmetic portion 211, initial data, setting data, an image, or the like.

Specifically, a hard disk, a flash memory, a memory including a transistor including an oxide semiconductor, or the like can be used for the memory portion 212.

<<Input/Output Interface 215 and Transmission Path 214>>

The input/output interface 215 includes a terminal or a wiring and is configured to supply and receive data. For example, the input/output interface 215 can be electrically connected to the transmission path 214 and the input/output device 220.

The transmission path 214 includes a wiring and is configured to supply and receive data. For example, the transmission path 214 can be electrically connected to the input/output interface 215. In addition, the transmission path 214 can be electrically connected to the arithmetic portion 211, the memory portion 212, or the input/output interface 215

<<Input/Output Device 220>>

The input/output device 220 includes the display portion 230, the input portion 240, a sensor portion 250, or a communication portion 290. For example, the input/output device described in Embodiment 2, Embodiment 4, or the like can be used as the input/output device of this embodiment.

<<Display Portion 230>>

The display portion 230 includes a display region 231, the driver circuit GD, and the driver circuit SD (see FIG. 36A).

The display region 231 includes a plurality of pixels 232 (i, 1) to 232 (i, n) arranged in the row direction, a plurality of pixels 232 (1, j) to 232 (m, j) arranged in the column direction, the scan line G (i) electrically connected to the plurality of pixels 232 (i, 1) to 232 (i, n), the signal line S (j) electrically connected to the pixels 232 (1, j) to 232 (m, j) arranged in the column direction crossing the row direction. Note that i is an integer greater than or equal to 1 and less than or equal to m, j is an integer greater than or equal to 1 and less than or equal to n, and each of m and n is an integer greater than or equal to 1.

Note that the pixel 232 (i, j) is electrically connected to the scan line G1 (i), the signal line S (j), and the wiring VCOM (see FIG. 36C).

The display portion 230 can include a plurality of driver circuits. For example, the display portion 230B can include a driver circuit GDA and a driver circuit GDB (see FIG. 36B).

<<Driver Circuit GD>>

The driver circuit GD is configured to supply a selection signal in accordance with the control data.

For example, the driver circuit GD is configured to supply a selection signal to one scan line at a frequency of 30 Hz or higher, preferably 60 Hz or higher, in accordance with the control data. Accordingly, moving images can be smoothly displayed.

For example, the driver circuit GD is configured to supply a selection signal to one scan line at a frequency of lower than 30 Hz, preferably lower than 1 Hz, more preferably less than once per minute, in accordance with the control data. Accordingly, a still image can be displayed while flickering is suppressed.

For example, in the case where a plurality of driver circuits is provided, the driver circuits GDA and GDB may supply the selection signals at different frequencies. Specifically, the selection signal can be supplied at a higher frequency to a region on which moving images are smoothly displayed than to a region on which a still image is displayed in a state where flickering is suppressed.

<<Driver Circuit SD>>

The driver circuit SD is configured to supply a video signal in accordance with the image data V.

<<Pixel 232 (i, j)>>

The pixel 232 (i, j) includes a display element 235LC. The pixel 232 (i, j) further includes the pixel circuit for driving the display element 235LC (see FIG. 36C).

<<Display Element 235LC>>

For example, a display element having a function of controlling light transmission can be used as the display element 235LC. Specifically, a polarizing plate and a liquid crystal element, a MEMS shutter display element, or the like can be used as the display element 235LC.

For example, a liquid crystal element that can be driven by an in-plane switching (IPS) mode, a fringe field switching (FFS) mode, or the like can be used for the display element.

A liquid crystal element that can be driven by any of the following driving methods can be used as the display element: a multi-domain vertical alignment (MVA) mode, an electrically tilted vertical alignment (EVA) mode, a patterned vertical alignment (PVA) mode, a continuous pinwheel alignment (CPA) mode, an advanced super-view (ASV) mode, a polymer sustained alignment (PSA) mode, an ultra violet induced multi-domain vertical alignment ($UV^2A$) mode, a field induced photo-reactive alignment (FPA) mode, a transverse bend alignment (TBA) mode, and a super-fast response (SFR) mode.

Alternatively, a liquid crystal element that can be driven by any of the following driving methods can be used as the display element: a twisted nematic (TN) mode, a ferroelectric liquid crystal (FLC) mode, an antiferroelectric liquid crystal (AFLC) mode, an axially symmetric aligned microcell (ASM) mode, and an optically compensated birefringence (OCB) mode.

A liquid crystal element includes a layer containing a liquid crystal material and an electrode which is provided so that an electric field for controlling the alignment of the liquid crystal material can be applied. For example, the orientation of the liquid crystal material can be controlled by an electric field in a direction intersecting with the thickness direction of the layer containing a liquid crystal material (also referred to as the vertical direction).

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer containing a liquid crystal material. These liquid crystal materials exhibit a cholesteric phase, a smectic phase, a cubic phase, a chiral nematic phase, an isotropic phase, or the like depending on conditions. Alternatively, a liquid crystal material which exhibits a blue phase can be used for the layer containing a liquid crystal material.

<<Pixel Circuit>>

The configuration of the pixel circuit can be designed according to the display element.

For example, a pixel circuit which is electrically connected to the scan line G1 (i), the signal line S (j), and the wiring VCOM and which drives the display element 235LC is described (see FIG. 36C).

A switch, a capacitor, and the like can be used in the pixel circuit. In addition, a transistor, a diode, a resistor, a capacitor, an inductor, and the like can be used.

For example, one or a plurality of transistors can be used as a switch. Alternatively, a plurality of transistors connected in parallel, in series, or in combination of parallel connection and series connection can be used as a switch.

For example, a capacitor may be formed by one electrode of the display element 235LC and a conductive film having a region overlapping with the one electrode.

For example, the pixel circuit includes a transistor functioning as a switch SW, the display element 235LC, and a capacitor C. A gate electrode of the transistor is electrically connected to the scan line G (i), and a first electrode of the transistor is electrically connected to the signal line S (j). The one electrode of the display element 235LC is electrically connected to a second electrode of the transistor, and the other electrode of the display element 235LC is electrically connected to the wiring VCOM. A first electrode of the capacitor C1 is electrically connected to the second electrode of the transistor, and a second electrode of the capacitor C1 is electrically connected to the wiring VCOM.

<<Transistor>>

For example, semiconductor films formed at the same step can be used for transistors in the driver circuit and the pixel circuit.

As the transistors in the driver circuit and the pixel circuit, bottom-gate transistors, top-gate transistors, or the like can be used.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 4 can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature for forming a transistor using polysilicon in a semiconductor is lower than the temperature for forming a transistor using single crystal silicon in a semiconductor.

In addition, the transistor using polysilicon in a semiconductor has higher field-effect mobility than the transistor using amorphous silicon in a semiconductor, and therefore a pixel including the transistor using polysilicon can have a high aperture ratio. Moreover, pixels arranged at high resolution, a gate driver circuit, and a source driver circuit can be formed over the same substrate. As a result, the number of components included in an electronic device can be reduced.

In addition, the transistor using polysilicon in a semiconductor has higher reliability than the transistor using amorphous silicon in a semiconductor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor for a semiconductor film can be used.

A pixel circuit including the transistor that uses an oxide semiconductor for the semiconductor film can hold a video signal for a longer time than a pixel circuit including the transistor that uses amorphous silicon for a semiconductor film. Specifically, the selection signal can be supplied at a frequency of lower than 30 Hz, preferably lower than 1 Hz, more preferably less than once per minute while flickering is suppressed. Consequently, eyestrain on a user of the data processing device can be reduced, and power consumption for driving can be reduced.

Alternatively, for example, a transistor including a compound semiconductor can be used. Specifically, a semiconductor containing gallium arsenide can be used for a semiconductor film.

For example, a transistor including an organic semiconductor can be used. Specifically, an organic semiconductor containing any of polyacenes and graphene can be used for the semiconductor film.

<<Input Portion 240>>

Any of a variety of human interfaces or the like can be used as the input portion 240 (see FIG. 35A).

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain operation instruction associated with a certain gesture by using the gesture.

For instance, the user can supply a "scrolling instruction" for changing a portion where image data is displayed by using a gesture of touching and moving his/her finger on the touch panel.

<<Sensor Portion 250>>

The sensor portion 250 is configured to acquire data P2 by detecting the surrounding state.

For example, a camera, an acceleration sensor, a direction sensor, a pressure sensor, a temperature sensor, a humidity sensor, an illuminance sensor, or a global positioning system (GPS) signal receiving circuit can be used as the sensor portion 250.

<<Communication Portion 290>>

The communication portion 290 is configured to supply and acquire data to/from a network.

<<Program>>

Figure 37A:
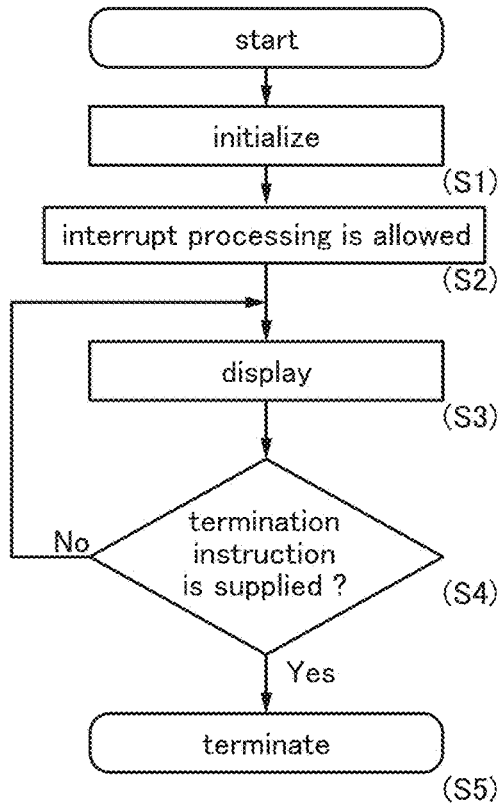
FIGS. 37A and 37B are flow charts of programs of an embodiment.
Figure 37B:
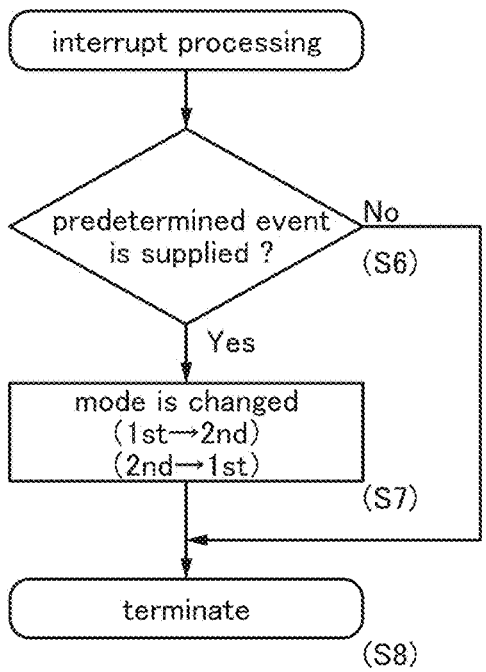
Figure 38:
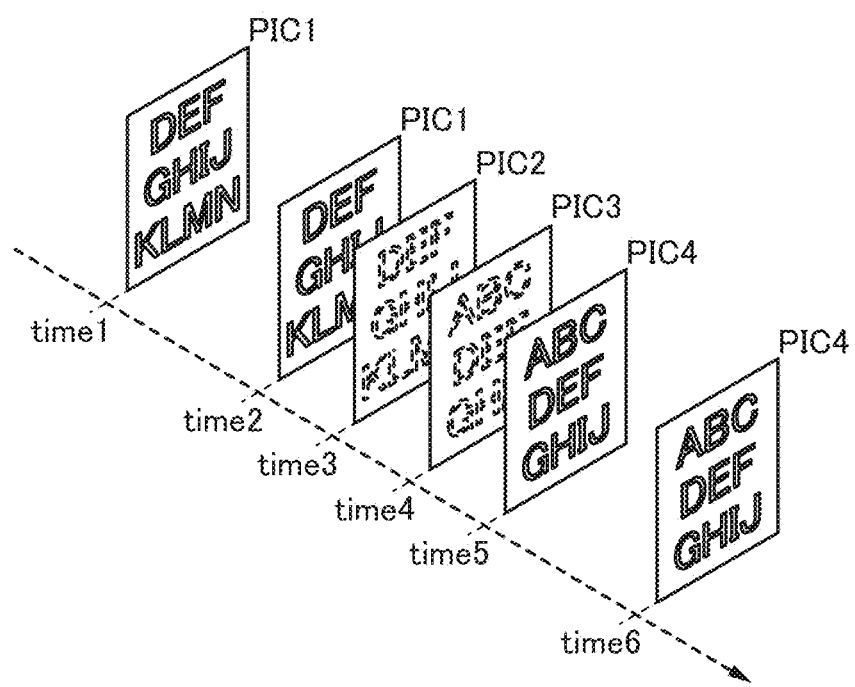
FIG. 38 schematically illustrates image data of an embodiment.

One embodiment of the present invention is described using a program of one embodiment of the present invention with reference to FIGS. 37A and 37B and FIG. 38.

FIG. 37A is a flow chart showing main processing of the program of one embodiment of the present invention, and FIG. 37B is a flow chart showing interrupt processing.

FIG. 38 schematically illustrates a method of displaying image data on the display portion 230.

The program of one embodiment of the present invention includes the following steps (see FIG. 37A).

In a first step, setting is initialized (see S1 in FIG. 37A).

For instance, predetermined image data and a second mode can be used for the initialization.

For example, a still image can be used as the predetermined image data. Alternatively, a mode in which the selection signal is supplied at a frequency of lower than 30 Hz, preferably lower than 1 Hz, more preferably less than once per minute can be used as the second mode.

In a second step, interrupt processing is allowed (see S2 in FIG. 37A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

In a third step, image data is displayed in a mode selected in the first step or the interrupt processing (see S3 in FIG. 37A).

For instance, predetermined image data is displayed in the second mode, in accordance with the initialization.

Specifically, the predetermined image data is displayed in a mode in which the selection signal is supplied to one scan line at a frequency of lower than 30 Hz, preferably lower than 1 Hz, more preferably less than once per minute.

For example, the selection signal is supplied at Time T1 so that first image data PIC1 is displayed on the display portion 230 (see FIG. 38). At Time T2, which is, for example, one second after Time T1, the selection signal is supplied so that the predetermined image data is displayed.

Alternatively, in the case where a predetermined event is not supplied in the interrupt processing, image data is displayed in the second mode.

For example, the selection signal is supplied at Time T5 so that fourth image data PIC4 is displayed on the display portion 230. At Time T6, which is, for example, one second after Time T5, the selection signal is supplied so that the same image data is displayed. Note that the length of a period from Time T5 to Time T6 can be equal to that of a period from Time T1 to Time T2.

For instance, in the case where the predetermined event is supplied in the interrupt processing, predetermined image data is displayed in the first mode.

Specifically, in the case where an event associated with a "page turning instruction" is supplied in the interrupt processing, image data is switched from one to another in a mode in which the selection signal is supplied to one scan line at a frequency of 30 Hz or higher, preferably 60 Hz or higher.

Alternatively, in the case where an event associated with the "scrolling instruction" is supplied in the interrupt processing, second image data PIC2, which includes part of the displayed first image data PIC1 and the following part, is displayed in a mode in which the selection signal is supplied to one scan line at a frequency of 30 Hz or higher, preferably 60 Hz or higher.

Thus, a moving image can be displayed smoothly by switching images in accordance with the "page tuning instruction," for example. Alternatively, a moving image in which an image is gradually moved in accordance with the "scrolling instruction" can be displayed smoothly.

Specifically, the selection signal is supplied at Time T3 after the event associated with the "scrolling instruction" is supplied so that the second image data PIC2 whose display position and the like are changed from those of the first image data PIC1 is displayed (see FIG. 38). The selection signal is supplied at Time T4 so that third image data PIC3 whose display position and the like are changed from those of the second image data PIC2 is displayed. Note that each of a period from Time T2 to Time T3, a period from Time T3 to Time T4, and a period from Time T4 to Time T5 is shorter than the period from Time T1 to Time T2.

In a fourth step, the next step is determined as follows: a fifth step is selected when a termination instruction has been supplied, whereas the third step is selected when the termination instruction has not been supplied (see S4 in FIG. 37A).

Note that in the interrupt processing, for example, the termination instruction can be supplied.

In the fifth step, the program terminates (S5 in FIG. 37A).

The interrupt processing includes sixth to ninth steps described below (see FIG. 37B).

In the sixth step, the processing proceeds to the seventh step when a predetermined event has been supplied during a predetermined period, whereas the processing proceeds to the eighth step when the predetermined event has not been supplied (see S6 in FIG. 37B).

For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than 0.5 seconds, still further preferably shorter than or equal to 0.1 seconds.

For example, the predetermined event can include an event associated with the termination instruction.

In the seventh step, the mode is changed (see S7 in FIG. 37B). Specifically, the mode is changed to the second mode when the first mode has been selected, or the mode is changed to the first mode when the second mode has been selected.

In the eighth step, the interrupt processing terminates (see S8 in FIG. 37B).

<<Predetermined Event>>

A variety of instructions can be associated with a variety of events.

The following instructions can be given as examples: "page-turning instruction" for switching displayed image data from one to another and "scroll instruction" for moving the display position of part of image data and displaying another part continuing from that part.

For example, the following events can be used: events supplied using a pointing device such as a mouse (e.g., "click" and "drag") and events supplied to a touch panel with a finger or the like used as a pointer (e.g., "tap", "drag" and "swipe").

For example, the position of a slide bar pointed by a pointer, the swipe speed, and the drag speed can be used as parameters assigned to an instruction associated with the predetermined event.

Specifically, a parameter that determines the page-turning speed or the like can be used to execute the "page-turning instruction" and a parameter that determines the moving speed of the display position or the like can be used to execute the "scroll instruction."

For example, the display brightness, contrast, or saturation may be changed in accordance with the page-turning speed and/or the scroll speed.

Specifically, in the case where the page-turning speed and/or the scroll speed are/is higher than the predetermined speed, the display brightness may be decreased in synchronization with the speed.

Alternatively, in the case where the page-turning speed and/or the scroll speed are/is higher than the predetermined speed, the contrast may be decreased in synchronization with the speed.

For example, the speed at which user's eyes cannot follow displayed images can be used as the predetermined speed.

The contrast can be reduced in such a manner that the gray level of a bright region (with a high gray level) included in image data is brought close to the gray level of a dark region (with a low gray level) included in the image data.

Alternatively, the contrast can be reduced in such a manner that the gray level of the dark region included in image data is brought close to the gray level of the bright region included in the image data.

Specifically, in the case where the page-turning speed and/or the scroll speed are/is higher than the predetermined speed, display may be performed such that the yellow tone is increased or the blue tone is decreased in synchronization with the speed.

Note that this embodiment can be combined with any of the other embodiments in this specification as appropriate.

Embodiment 10

In this embodiment, the structures of a data processing device and a data processing system which are embodiments of the present invention are described with reference to FIGS. 39A and 39B and FIGS. 40A and 40B.

Figure 39A:
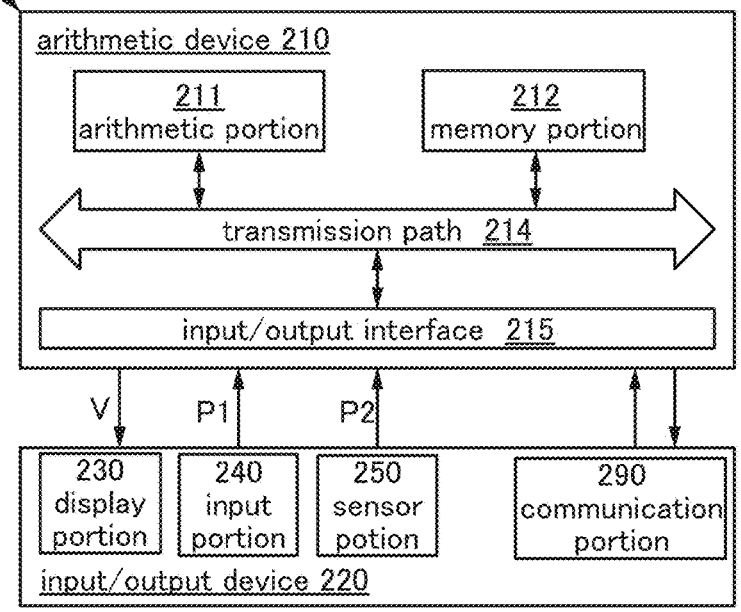
FIGS. 39A and 39B illustrate structures of a data processing device and a data processing system of an embodiment.
Figure 39B:
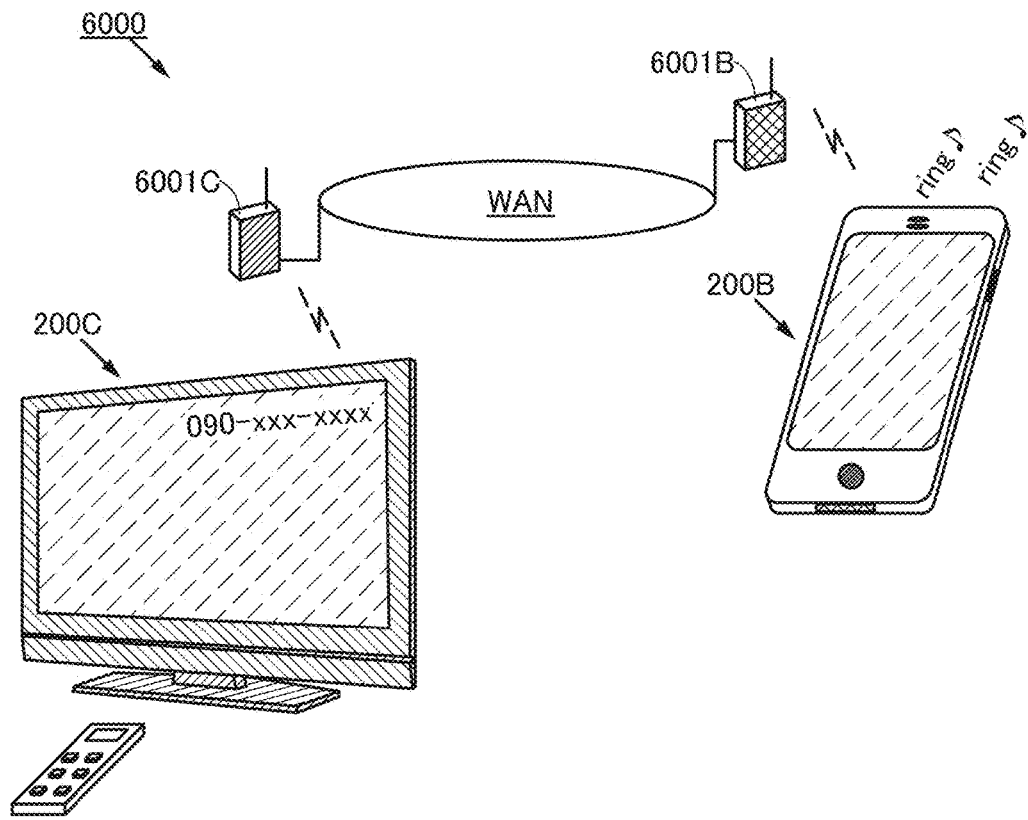

FIG. 39A is a block diagram illustrating the structure of a data processing device 200B. FIG. 39B is a schematic view illustrating the structure of a data processing system 6000.

Figure 40A:
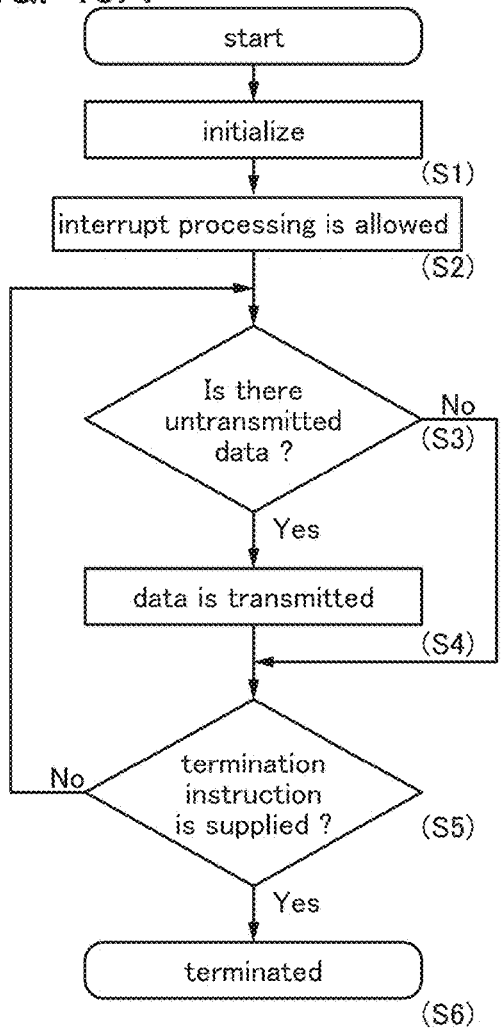
FIGS. 40A and 40B are flow charts of programs of an embodiment.
Figure 40B:
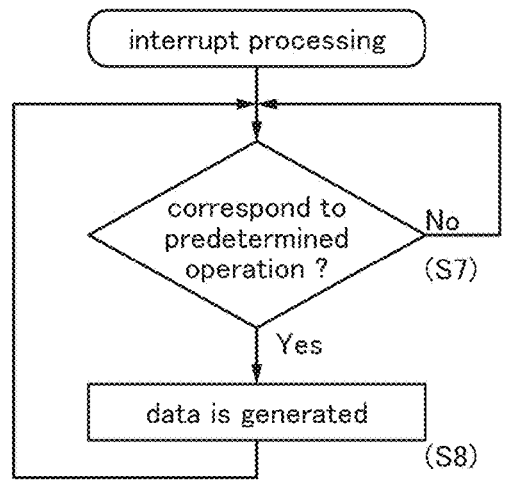

FIG. 40A is a flow chart showing main processing of the program executed by the data processing device 200B of one embodiment of the present invention, and FIG. 40B is a flow chart showing interrupt processing.

<Structural Example of Data Processing Device>

The data processing device 200B described in this embodiment includes the arithmetic device 210 and the input/output device 220 (see FIG. 39A).

The arithmetic device 210 is configured to receive positional data P1 and supply image data V.

The input/output device 220 is configured to supply the positional data P1 and receive the image data V.

The input/output device 220 includes a display portion 230 that displays the image data V and an input portion 240 that supplies the positional data P1.

The input portion 240 is configured to sense the position of a pointer and supply the positional data P1 sensed in accordance with the position.

In addition, the data processing device 200B has a remote access function. For example, the data processing device 200B can acquire an instruction from the communication portion 290 via the network and operate. Specifically, the data processing device 200B is configured to acquire a photographing instruction from the communication portion 290 via the network and take an image with a camera included in the sensor portion 250.

<Structure>

The data processing device of one embodiment of the present invention includes the arithmetic device 210 or the input/output device 220.

<<Arithmetic Device 210>>

The arithmetic device 210 includes the arithmetic portion 211 and the memory portion 212. The arithmetic device 210 further includes the transmission path 214 and the input/output interface 215 (see FIG. 39A).

<<Arithmetic Portion 211>>

The arithmetic portion 211 is configured to, for example, execute a program.

For example, a CPU described in Embodiment 11 can be used for the arithmetic portion 211. In that case, power consumption can be reduced.

<<Memory Portion 212>>

The memory portion 212 has a function of, for example, storing the program executed by the arithmetic portion 211, initial data, setting data, an image, or the like.

Specifically, a hard disk, a flash memory, a memory including a transistor including an oxide semiconductor, or the like can be used for the memory portion 212.

<<Input/Output Interface 215 and Transmission Path 214>>

The input/output interface 215 includes a terminal or a wiring and is configured to supply and receive data. For example, the input/output interface 215 can be electrically connected to the transmission path 214 and the input/output device 220.

The transmission path 214 includes a wiring and is configured to supply and receive data. For example, the transmission path 214 can be electrically connected to the input/output interface 215. In addition, the transmission path 214 can be electrically connected to the arithmetic portion 211, the memory portion 212, or the input/output interface 215.

<<Input/Output Device 220>>

The input/output device 220 includes the display portion 230, the input portion 240, the sensor portion 250, or the communication portion 290. For example, the input/output device described in Embodiment 2, Embodiment 4, or the like can be used as the input/output device 220.

<<Display Portion 230>>

The display portion 230 has a function of displaying the image data V.

<<Input Portion 240>>

A human interface or the like can be used as the input portion 240 (see FIG. 39A).

For example, a keyboard, a mouse, a touch sensor, a microphone, a camera, or the like can be used as the input portion 240.

Note that a touch sensor having a region overlapping with the display portion 230 can be used for the input portion 240. Note that the input/output device that includes the display portion 230 and the touch sensor having a region overlapping with the display portion 230 can be referred to as a touch panel.

For example, a user can make various gestures (e.g., tap, drag, swipe, and pinch in) using his/her finger as a pointer on the touch sensor.

The arithmetic device 210, for example, analyzes data on the position, track, or the like of the finger on the touch panel and determines that a specific gesture is supplied when the analysis results meet predetermined conditions. Furthermore, a certain operation instruction can be associated with a certain gesture in advance. Thus, the user can supply the certain operation instruction by the gesture.

For instance, the user can supply a "scrolling instruction" for changing a portion where image data is displayed by using a gesture of touching and moving his/her finger on the touch panel.

<<Sensor Portion 250>>

The sensor portion 250 is configured to acquire data P2 by detecting the surrounding state.

For example, a camera, an acceleration sensor, a direction sensor, a pressure sensor, a temperature sensor, a humidity sensor, an illuminance sensor, or a global positioning system (GPS) signal receiving circuit can be used as the sensor portion 250.

<<Communication Portion 290>>

The communication portion 290 is configured to supply and acquire data to/from a network or another data processing device.

<<Program>>

In this embodiment, a program structure of one embodiment of the present invention is described with reference to FIGS. 40A and 40B.

The program of one embodiment of the present invention can be executed by the arithmetic portion 211 and includes the following steps.

<<First Step>>

In a first step, setting is initialized (see S1 in FIG. 40A).

For example, in the case where data generated when the program has been previously executed is stored, operation for erasing the data can be performed in the initialization. In addition, operation for initializing the value of a counter can be performed in the initialization.

<<Second Step>>

In a second step, interrupt processing is allowed (see S2 in FIG. 40A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is ready to be executed after the program is started up.

<<Third Step>>

In a third step, the program moves to a fourth step when untransmitted data remains, while the program moves to a fifth step when there is no untransmitted data (see S3 in FIG. 40A).

As an example, when data generated in the interrupt processing has not been transmitted yet, the program moves to the fourth step.

When the data generated in the interrupt processing has already been transmitted, the program moves to the fifth step.

<<Fourth Step>>

In the fourth step, the untransmitted data is transmitted (see S4 in FIG. 40A). To improve security, encrypted data is preferably transmitted.

For example, the untransmitted data is transmitted to a predetermined server connected to a network.

Thus, data indicating that predetermined operation has been performed can be accumulated in the predetermined server.

<<Fifth Step>>

When a termination instruction is supplied in the fifth step, a sixth step is selected, and when the termination instruction is not supplied in the fifth step, the third step is selected (see S5 in FIG. 40A).

Note that in the interrupt processing, for example, the termination instruction can be supplied.

<<Sixth Step>>

The program is terminated in the sixth step (S6 in FIG. 40A). Note that when the main processing is terminated, the interrupt processing is also terminated.

The interrupt processing includes seventh and eighth steps described below (see FIG. 40B).

<<Seventh Step>>

In the seventh step, when operation which has been performed by the arithmetic portion in a predetermined period correspond to the predetermined operation, the program moves to the eighth step, and when the operation which has been performed by the arithmetic portion in the predetermined period does not correspond to the predetermined operation, the seventh step is repeated, again (see S7 in FIG. 40B).

For example, whether the predetermined event is supplied in a predetermined period or not can be a branch condition. Specifically, the predetermined period can be longer than 0 seconds and shorter than or equal to 5 seconds, preferably shorter than or equal to 1 second, further preferably shorter than 0.5 seconds, still further preferably shorter than or equal to 0.1 seconds. Accordingly, whether the operation corresponding to the predetermined operation is performed in the operation period of the interrupt processing can be monitored.

Note that the predetermined operation described below can be an object to be monitored.

<<Eighth Step>>

In the eighth step, data is generated (S8 in FIG. 40B).

For example, data on the predetermined operation which has been performed by the arithmetic portion in the predetermined period can be generated.

<<Predetermined Operation>>

For example, operation of recognizing a source of data acquired from a network can be included in the predetermined operation. Specifically, operation of recognizing a phone number of a caller, account data of an e-mail sender, account data of an SNS, URL address data, or the like can be included in the predetermined operation. Furthermore, operation of acquiring positional data of the data processing device 200B with a global positioning system or with remote access can be included in the predetermined operation.

In addition, data for identifying these sources can be included in the data generated in the eighth step.

For example, operation of applications executed by the data processing device 200B can be included in the predetermined operation. Specifically, an Internet browser, SNS client software, or operation of a game and the like can be included in the predetermined operation.

For example, operation of recognizing an instruction to terminate the program can be included in the predetermined operation.

In such a manner, data on use states or use history of the data processing device 200B of a user can be supplied to the network.

<Structure Example of Data Processing System>

The data processing system 6000 of one embodiment of the present invention is described with reference to FIG. 39B.

The data processing system 6000 includes the data processing device 200B which supplies data and a data processing device 200C which acquires and displays the data (see FIG. 39B).

Note that a plurality of data processing devices 200B, each of which supplies identification data, can also be used, in which case, one data processing device 200B is distinguished from another data processing device 200B, and data can be displayed on the data processing device 200C while data supplied from one data processing device 200B is distinguished from that of another data processing device 200B.

Note that the data processing system 6000 utilizes a network. The network includes an access point 6001B and an access point 6001C. Furthermore, the network has a server.

The access point 6001B is configured to receive data supplied from the data processing device 200B. The access point 6001C is configured to receive data supplied from the data processing device 200C.

For example, a router can be used as the access point 6001B or the access point 6001C.

<<Data Processing Device 200B>>

The data processing device 200B has the structure described above. In addition, the data processing device 200B is configured to supply predetermined data to a predetermined server.

For example, a mobile phone or a smartphone can be used as the data processing device 200B.

<<Data Processing Device 200C>>

For example, a data processing device having a structure similar to that of the data processing device 200B can be used as the data processing device 200C.

Furthermore, a smart TV, a computer, a mobile phone, or a smartphone can be used as the data processing device 200C.

For example, the data processing device 200C is configured to acquire data from the access point 6001C and display the data.

The data processing device 200C is configured to monitor a predetermined server. Thus, data supplied to the predetermined server by the data processing device 200B can be acquired by the data processing device 200C.

For example, the predetermined server is monitored by dedicated communication software, an Internet browser, an SNS or e-mail client software, or the like, whereby data can be acquired.

The acquired data can be displayed on the data processing device 200C. For example, a phone number of a caller, account data of an e-mail sender, account data of an SNS, URL address data, or the like which are supplied from the data processing device 200B can be displayed.

Furthermore, the positional data of the data processing device 200B acquired with a global positioning system can be plot on a map and displayed.

Specifically, the data can be displayed in a pop-up window.

Accordingly, the use states of the data processing device 200B can be monitored by a user of the data processing device 200C.

For example, the user of the data processing device 200C can intercept and record the content of a call of the user of the data processing device 200B. Furthermore, the user of the data processing device 200C can remotely access the data processing device 200B and take a picture of a use environment of the data processing device 200B with a camera. Furthermore, the user of the data processing device 200C can monitor the positional data of the data processing device 200B.

Accordingly, for example, a person to be protected can be monitored by a protector. Furthermore, a ward can be monitored by a guardian. Furthermore, a person under curatorship can be monitored by a curator.

Note that this embodiment can be combined with any of the other embodiments in this specification as appropriate.

Embodiment 11

In this embodiment, a semiconductor device (memory device) that can retain stored data even when not powered and that has an unlimited number of write cycles, and a CPU including the semiconductor device is described. The CPU described in this embodiment can be used for the data processing device described in Embodiment 9 or 10, for example.

<<Memory Device>>

Figure 41A:
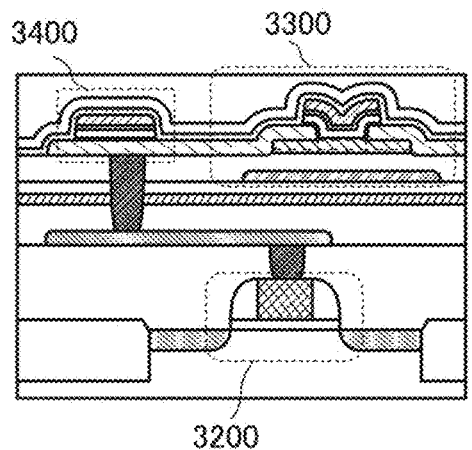
FIGS. 41A to 41C are a cross-sectional view and circuit diagrams illustrating structures of a semiconductor device of an embodiment.
Figure 41B:
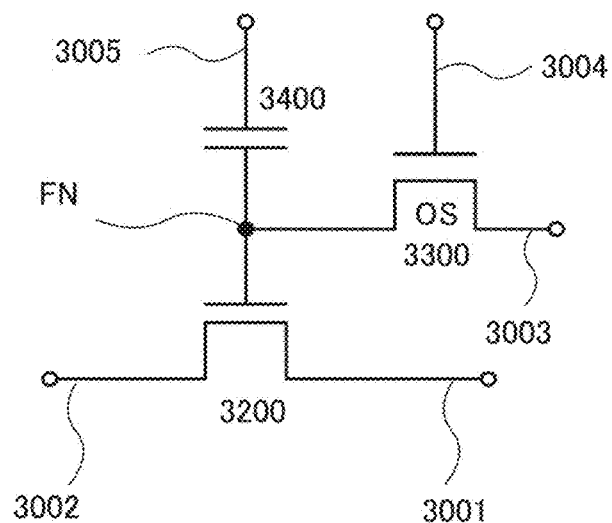
Figure 41C:
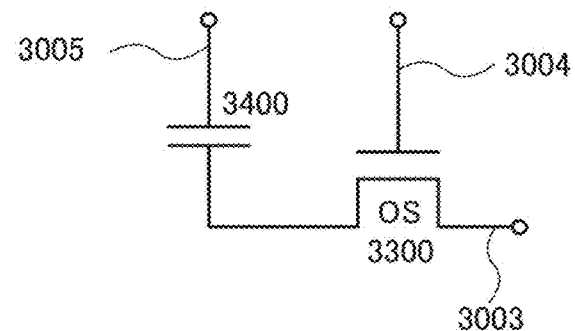

An example of a semiconductor device (memory device) that can retain stored data even when not powered and that has an unlimited number of write cycles is shown in FIGS. 41A to 41C. Note that FIG. 41B is a circuit diagram of the structure in FIG. 41A.

The semiconductor device illustrated in FIGS. 41A and 41B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. In contrast, a transistor including an oxide semiconductor has low off-state current.

The transistor 3300 is a transistor in which a channel is formed in a semiconductor layer including an oxide semiconductor. Since the off-state current of the transistor 3300 is small, stored data can be retained for a long period. In other words, power consumption can be sufficiently reduced because a semiconductor memory device in which refresh operation is unnecessary or the frequency of refresh operation is extremely low can be provided.

In FIG. 41B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 41A has a feature that the potential of the gate electrode of the transistor 3200 can be retained, and thus enables writing, retaining, and reading of data as follows.

Writing and holding of data is described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate electrode of the transistor 3200 (writing). Here, one of two kinds of charges providing different potentials (hereinafter referred to as a low-level charge and a high-level charge) is applied. After that, the potential of the fourth wiring 3004 is set to a potential at which the transistor 3300 is turned off, so that the transistor 3300 is turned off. Thus, the charge supplied to the gate electrode of the transistor 3200 is retained (retaining).

Since the off-state current of the transistor 3300 is extremely low, the charge of the gate electrode of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate electrode of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 that is needed to turn on the transistor 3200. Thus, the potential of the fifth wiring 3005 is set to a potential $V_0$ that is between $V_{th\_H}$ and $V_{th\_L}$, whereby charge supplied to the gate electrode of the transistor 3200 can be determined. For example, in the case where the high-level charge is supplied to the gate electrode of the transistor 3200 in writing and the potential of the fifth wiring 3005 is $V_0$ ($>V_{th\_H}$), the transistor 3200 is turned on. In the case where the low-level charge is supplied to the gate electrode of the transistor 3200 in writing, even when the potential of the fifth wiring 3005 is $V_0$ ($<V_{th\_L}$), the transistor 3200 remains off. Thus, the data retained in the gate electrode of the transistor 3200 can be read by determining the potential of the second wiring 3002.

Note that in the case where memory cells are arrayed, it is necessary that only data of a designated memory cell(s) can be read. For example, the fifth wiring 3005 of memory cells from which data is not read may be supplied with a potential at which the transistor 3200 is turned off regardless of the potential supplied to the gate electrode, that is, a potential lower than $V_{th\_H}$, whereby only data of a designated memory cell(s) can be read. Alternatively, the fifth wiring 3005 of the memory cells from which data is not read may be supplied with a potential at which the transistor 3200 is turned on regardless of the potential supplied to the gate electrode, that is, a potential higher than $V_{th\_L}$, whereby only data of a designated memory cell(s) can be read.

The semiconductor device illustrated in FIG. 41C is different from the semiconductor device illustrated in FIG. 41A in that the transistor 3200 is not provided. In this case, data writing and retaining operations can be performed in a manner similar to those of the semiconductor device illustrated in FIG. 41A.

Next, reading of data of the semiconductor device illustrated in FIG. 41C is described. When the transistor 3300 is turned on, the third wiring 3003 that is in a floating state and the capacitor 3400 are electrically connected to each other, and the charge is redistributed between the third wiring 3003 and the capacitor 3400. As a result, the potential of the third wiring 3003 is changed. The amount of change in the potential of the third wiring 3003 varies depending on the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, CB is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the third wiring 3003 in the case of retaining the potential $V_1$ ($=(C_B \times V_{B0} + C \times V_1)/(C_B + C)$) is higher than the potential of the third wiring 3003 in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor containing the first semiconductor material may be used in a driver circuit for driving a memory cell, and a transistor containing the second semiconductor material may be stacked over the driver circuit as the transistor 3300.

When including a transistor in which a channel formation region is formed using an oxide semiconductor and which has an extremely small off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

The above memory device can also be used in an LSI such as a digital signal processor (DSP), a custom LSI, or a programmable logic device (PLD) and a radio frequency identification (RF-ID) tag, in addition to a central processing unit (CPU), for example.

<CPU>

Figure 42:
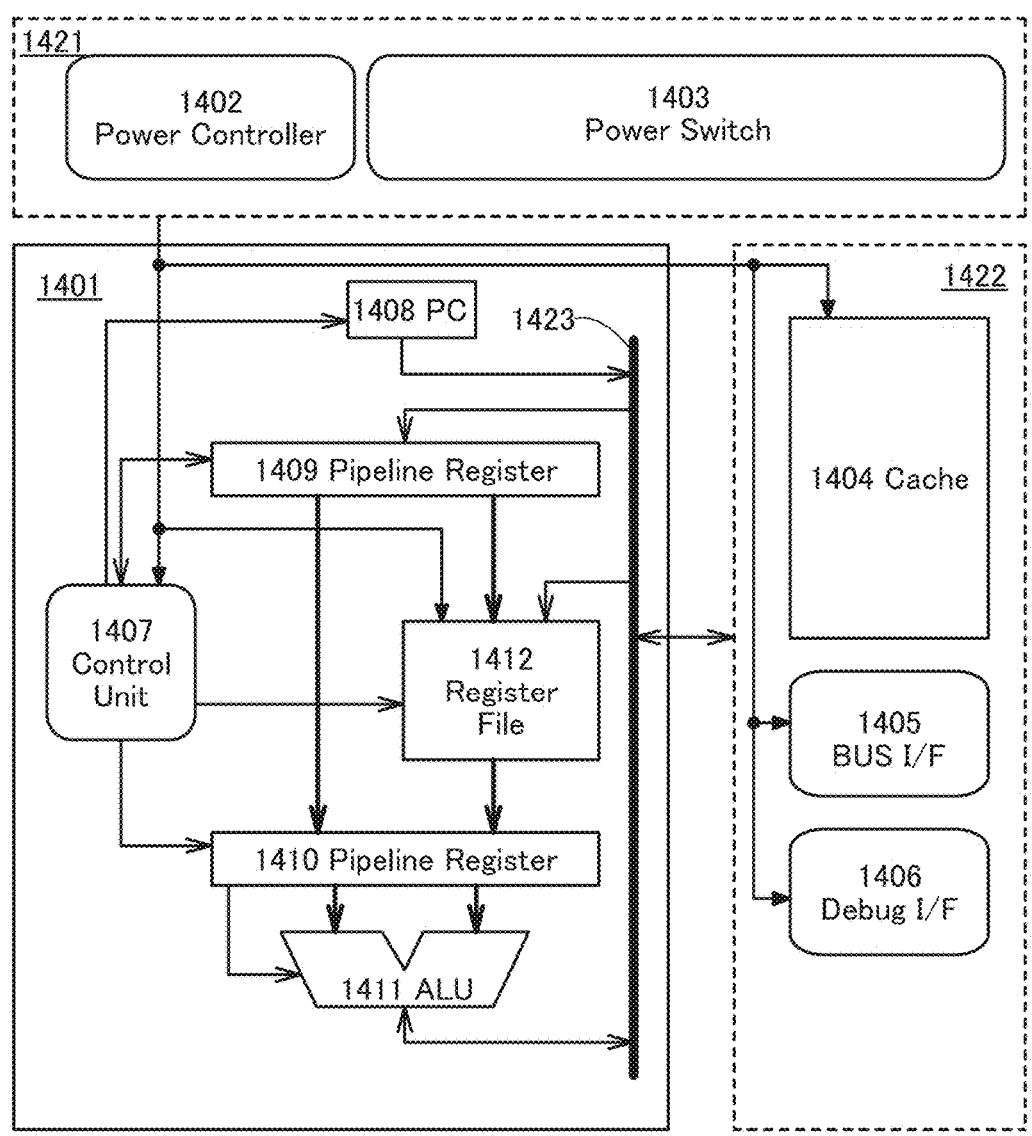
FIG. 42 is a block diagram illustrating a structure of a CPU of an embodiment.

A semiconductor device 1400 illustrated in FIG. 42 includes a CPU core 1401, a power management unit 1421, and a peripheral circuit 1422. The power management unit 1421 includes a power controller 1402 and a power switch 1403. The peripheral circuit 1422 includes a cache 1404 including cache memory, a bus interface (BUS I/F) 1405, and a debug interface (Debug I/F) 1406. The CPU core 1401 includes a data bus 1423, a control unit 1407, a program counter (PC) 1408, a pipeline register 1409, a pipeline register 1410, an arithmetic logic unit (ALU) 1411, and a register file 1412. Data is transmitted between the CPU core 1401 and the peripheral circuit 1422 such as the cache 1404 via the data bus 1423.

The semiconductor device (cell) can be applied to many logic circuits typified by the power controller 1402 and the control unit 1407, particularly to all logic circuits that can be constituted using standard cells. Accordingly, the semiconductor device 1400 can be small. The semiconductor device 1400 can have reduced power consumption. The semiconductor device 1400 can have a higher operating speed. The semiconductor device 1400 can have a smaller power supply voltage variation.

When p-channel Si transistors and the transistor described in the above embodiment which includes an oxide semiconductor (preferably an oxide containing In, Ga, and Zn) in a channel formation region are used in the semiconductor device (cell) and the semiconductor device (cell) is applied to the semiconductor device 1400, the semiconductor device 1400 can be small. The semiconductor device 1400 can have reduced power consumption. The semiconductor device 1400 can have a higher operating speed. Particularly when the Si transistors are only p-channel ones, the manufacturing cost can be reduced.

The control unit 1407 has functions of decoding and executing instructions contained in a program such as inputted applications by integrally controlling the operations of the PC 1408, the pipeline registers 1409 and 1410, the ALU 1411, the register file 1412, the cache 1404, the bus interface 1405, the debug interface 1406, and the power controller 1402.

The ALU 1411 has a function of performing a variety of arithmetic operations such as four arithmetic operations and logic operations.

The cache 1404 has a function of temporarily storing frequently used data. The PC 1408 is a register having a function of storing an address of an instruction to be executed next. Although not illustrated in FIG. 42, the cache 1404 includes a cache controller for controlling the operation of the cache memory.

The pipeline register 1409 has a function of temporarily storing instruction data.

The register file 1412 includes a plurality of registers including a general purpose register and can store data that is read from the main memory, data obtained as a result of arithmetic operations in the ALU 1411, or the like.

The pipeline register 1410 has a function of temporarily storing data used for arithmetic operations of the ALU 1411, data obtained as a result of arithmetic operations of the ALU 1411, or the like.

The bus interface 1405 functions as a path for data between the semiconductor device 1400 and devices outside the semiconductor device 1400. The debug interface 1406 functions as a path of a signal for inputting an instruction to control debugging to the semiconductor device 1400.

The power switch 1403 has a function of controlling supply of the power supply voltage to circuits other than the power controller 1402 in the semiconductor device 1400. These circuits belong to several different power domains. The power switch 1403 controls whether the power supply voltage is supplied to circuits in the same power domain. The power controller 1402 has a function of controlling the operation of the power switch 1403.

The semiconductor device 1400 having the above structure is capable of performing power gating. An example of the flow of the power gating operation will be described.

First, the CPU core 1401 sets the timing for stopping the supply of the power supply voltage in a register of the power controller 1402. Next, an instruction to start power gating is sent from the CPU core 1401 to the power controller 1402. Then, the registers and the cache 1404 in the semiconductor device 1400 start data saving. Subsequently, the power switch 1403 stops the supply of the power supply voltage to the circuits other than the power controller 1402 in the semiconductor device 1400. Then, an interrupt signal is input to the power controller 1402, thereby starting the supply of the power supply voltage to the circuits included in the semiconductor device 1400. Note that a counter may be provided in the power controller 1402 to be used to determine the timing of starting the supply of the power supply voltage regardless of input of an interrupt signal. Next, the registers and the cache 1404 start data restoration. After that, execution of an instruction is resumed in the control unit 1407.

This power gating can be performed in the entire processor or one or more logic circuits included in the processor. The supply of power can be stopped even for a short time. Accordingly, power consumption can be reduced at a fine granularity in space or time.

In performing power gating, data held by the CPU core 1401 or the peripheral circuit 1422 is preferably restored in a short time. In that case, the power can be turned on or off in a short time, and an effect of saving power becomes significant.

In order that the data held by the CPU core 1401 or the peripheral circuit 1422 be restored in a short time, the data is preferably restored to a flip-flop circuit itself (referred to as a flip-flop circuit capable of backup operation). Furthermore, the data is preferably restored to an SRAM cell itself (referred to as an SRAM cell capable of backup operation). The flip-flop circuit and SRAM cell which are capable of backup operation preferably include transistors including an oxide semiconductor (preferably an oxide containing In, Ga, and Zn) in a channel formation region. Consequently, the transistor has a low off-state current; thus, the flip-flop circuit and SRAM cell which are capable of backup operation can retain data for a long time without power supply. When the transistor has a high switching speed, the flip-flop circuit and SRAM cell which are capable of backup operation can restore and return data in a short time in some cases.

An example of the flip-flop circuit capable of backup operation is described with reference to FIG. 43.

Figure 43:
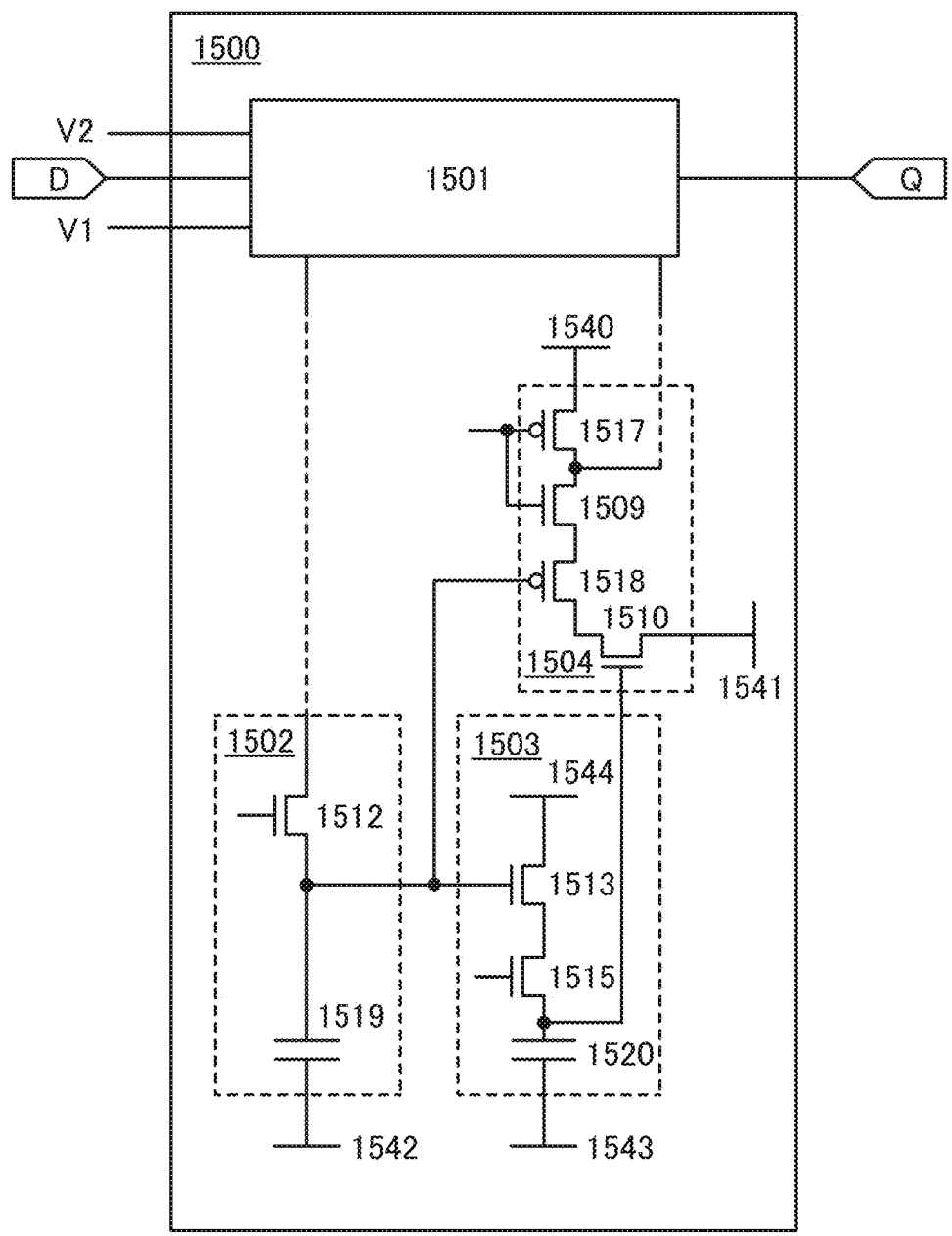
FIG. 43 is a circuit diagram illustrating a structure of a flip flop circuit of an embodiment.

A semiconductor device 1500 shown in FIG. 43 is an example of the flip-flop circuit capable of backup operation. The semiconductor device 1500 includes a first memory circuit 1501, a second memory circuit 1502, a third memory circuit 1503, and a read circuit 1504. As a power supply voltage, a potential difference between a potential V1 and a potential V2 is supplied to the semiconductor device 1500. One of the potential V1 and the potential V2 is at a high level, and the other is at a low level. An example of the structure of the semiconductor device 1500 when the potential V1 is at a low level and the potential V2 is at a high level is described below.

The first memory circuit 1501 has a function of retaining data when a signal D including the data is input in a period during which the power supply voltage is supplied to the semiconductor device 1500. The first memory circuit 1501 outputs a signal Q including the retained data in the period during which the power supply voltage is supplied to the semiconductor device 1500. On the other hand, the first memory circuit 1501 cannot retain data in a period during which the power supply voltage is not supplied to the semiconductor device 1500. That is, the first memory circuit 1501 can be referred to as a volatile memory circuit.

The second memory circuit 1502 has a function of reading the data held in the first memory circuit 1501 to store (or restore) it. The third memory circuit 1503 has a function of reading the data held in the second memory circuit 1502 to store (or restore) it. The read circuit 1504 has a function of reading the data held in the second memory circuit 1502 or the third memory circuit 1503 to store (or return) it in (to) the first memory circuit 1501.

In particular, the third memory circuit 1503 has a function of reading the data held in the second memory circuit 1502 to store (or restore) it even in the period during which the power supply voltage is not supplied to the semiconductor device 1500.

As shown in FIG. 43, the second memory circuit 1502 includes a transistor 1512 and a capacitor 1519. The third memory circuit 1503 includes a transistor 1513, a transistor 1515, and a capacitor 1520. The read circuit 1504 includes a transistor 1510, a transistor 1518, a transistor 1509, and a transistor 1517.

The transistor 1512 has a function of charging and discharging the capacitor 1519 in accordance with data held in the first memory circuit 1501. The transistor 1512 is desirably capable of charging and discharging the capacitor 1519 at a high speed in accordance with data held in the first memory circuit 1501. Specifically, the transistor 1512 desirably contains crystalline silicon (preferably polycrystalline silicon, more preferably single crystal silicon) in a channel formation region.

The on/off state of the transistor 1513 is determined in accordance with the charge held in the capacitor 1519. The transistor 1515 has a function of charging and discharging the capacitor 1520 in accordance with the potential of a wiring 1544 when the transistor 1513 is in a conduction state. It is preferable that the off-state current of the transistor 1515 be extremely small. Specifically, the transistor 1515 desirably contains an oxide semiconductor (preferably an oxide containing In, Ga, and Zn) in a channel formation region.

Specific connection relations between the elements are as follows. One of a source and a drain of the transistor 1512 is connected to the first memory circuit 1501. The other of the source and the drain of the transistor 1512 is connected to one electrode of the capacitor 1519, a gate of the transistor 1513, and a gate of the transistor 1518. The other electrode of the capacitor 1519 is connected to a wiring 1542. One of a source and a drain of the transistor 1513 is connected to the wiring 1544. The other of the source and the drain of the transistor 1513 is connected to one of a source and a drain of the transistor 1515. The other of the source and the drain of the transistor 1515 is connected to one electrode of the capacitor 1520 and a gate of the transistor 1510. The other electrode of the capacitor 1520 is connected to a wiring 1543. One of a source and a drain of the transistor 1510 is connected to a wiring 1541. The other of the source and the drain of the transistor 1510 is connected to one of a source and a drain of the transistor 1518. The other of the source and the drain of the transistor 1518 is connected to one of a source and a drain of the transistor 1509. The other of the source and the drain of the transistor 1509 is connected to one of a source and a drain of the transistor 1517 and the first memory circuit 1501. The other of the source and the drain of the transistor 1517 is connected to a wiring 1540. Although a gate of the transistor 1509 is connected to a gate of the transistor 1517 in FIG. 43, it is not necessarily connected to the gate of the transistor 1517.

The transistor described in the above embodiment as an example can be applied to the transistor 1515. Because of the low off-state current of the transistor 1515, the semiconductor device 1500 can retain data for a long time without power supply. The favorable switching characteristics of the transistor 1515 allow the semiconductor device 1500 to perform high-speed backup and recovery.

At least part of this embodiment can be implemented in combination with any of the other embodiments described in this specification as appropriate.

Embodiment 12

In this embodiment, electronic devices each of which include a display device of one embodiment of the present invention are described with reference to FIGS. 44A to 44H.

FIGS. 44A to 44G illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 44A:
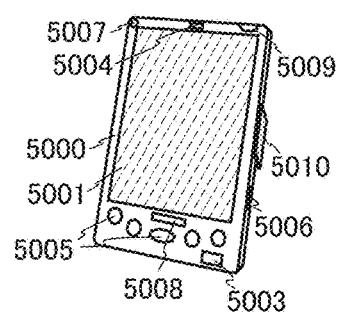
FIGS. 44A to 44H illustrate structures of electronic devices of an embodiment.
Figure 44B:
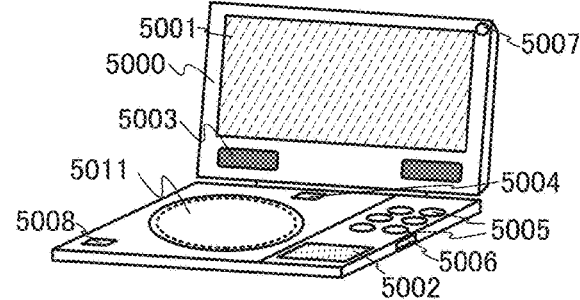
Figure 44C:
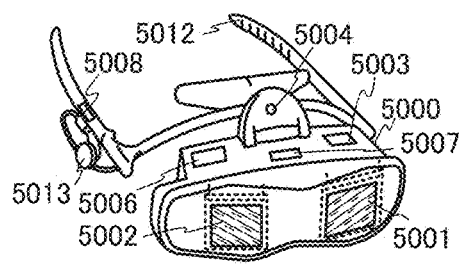
Figure 44D:
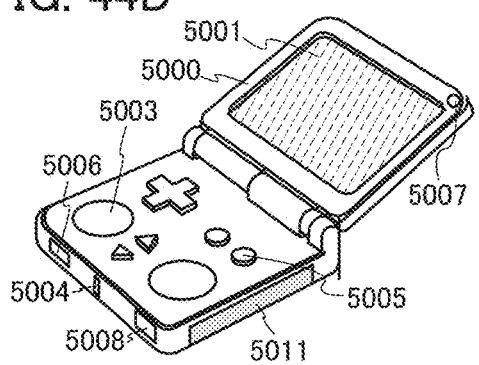
Figure 44E:
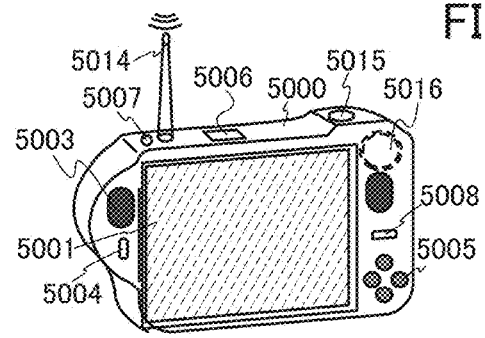
Figure 44F:
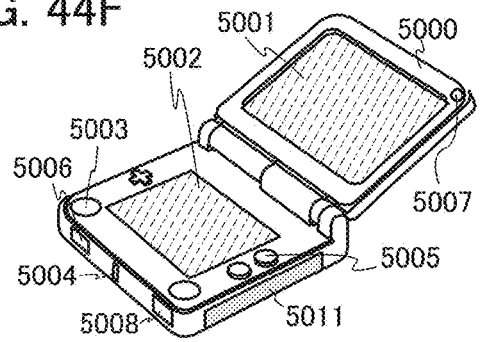
Figure 44G:
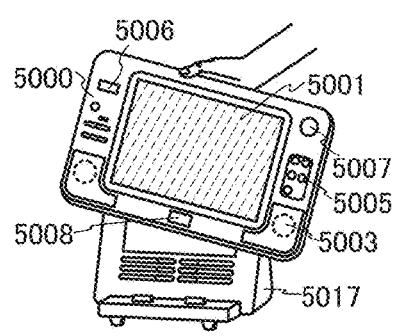

FIG. 44A illustrates a mobile computer, which can include a switch 5009, an infrared port 5010, and the like in addition to the above components. FIG. 44B illustrates a portable image reproducing device provided with a recording medium (e.g., a DVD reproducing device), which can include a second display portion 5002, a recording medium reading portion 5011, and the like in addition to the above components. FIG. 44C illustrates a goggle-type display, which can include the second display portion 5002, a support portion 5012, an earphone 5013, and the like in addition to the above components. FIG. 44D illustrates a portable game machine, which can include the recording medium reading portion 5011 and the like in addition to the above components. FIG. 44E illustrates a digital camera that has a television reception function, which can include an antenna 5014, a shutter button 5015, an image receiving portion 5016, and the like in addition to the above components. FIG. 44F illustrates a portable game machine, which can include the second display portion 5002, the recording medium reading portion 5011, and the like in addition to the above components. FIG. 44G illustrates a portable television receiver, which can include a charger 5017 capable of transmitting and receiving signals, and the like in addition to the above components.

The electronic devices in FIGS. 44A to 44G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of shooting a moving image, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 44A to 44G are not limited thereto, and the electronic devices can have a variety of functions.

Figure 44H:

FIG. 44H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 44H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using a light-emitting element for the display panel 7304.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

REFERENCE NUMERALS

AF1: alignment film, AF2: alignment film, C: capacitor, C1: conductive film, C2: conductive film, CA: conductive film, CB: conductive film, C (g, h): conductive film, CD (g, h): conductive film, CE(g, h): conductive film, CF (g, h): conductive film, CG (g, h): conductive film, CL: control line, CL2: control line, COM: wiring, CF: coloring film, DC1: sensor circuit, DC1A: sensor circuit, DC1B: sensor circuit, DC11: sensor circuit, DC12: sensor circuit, DC13: sensor circuit, DC14: sensor circuit, DC2: sensor circuit, DC3: sensor circuit, FPC: flexible printed circuit board, GD: driver circuit, GDA: driver circuit, GDB: driver circuit, LS: line, LV: line, MA: transistor, MC: transistor, MD: transistor, ME: transistor, MDB: transistor, MDC: transistor, MDE: transistor, ML1: signal line, ML2: signal line, ML3: signal line, ML4: signal line, ML5:
signal line, ML6: signal line, MLA: signal line, MLB: signal line, MLC: signal line, MLD: signal line, ML (g, h): signal line, MUX: selection circuit, S (j): signal line, SD: driver circuit, SW: switch, PIC1: image data, PIC2: image data, PIC3: image data, PIC4: image data, T(V): period, T1: period, T2: period, V: image data, VCOM: wiring, 100: transistor, 102: substrate, 104: conductive film, 106: insulating film, 107: insulating film, 108: oxide semiconductor film, 108a: oxide semiconductor film, 108b: oxide semiconductor film, 108c: oxide semiconductor film, 112a: conductive film, 112b: conductive film, 114: insulating film, 116: insulating film, 118: insulating film, 120a: conductive film, 120b: conductive film, 150: transistor, 200: data processing device, 200B: data processing device, 200C: data processing device, 210: arithmetic device, 211: arithmetic portion, 212: memory portion, 214: transmission path, 215: input/output interface, 220: input/output device, 230: display portion, 230B: display portion, 231: display region, 232: pixel, 235LC: display element, 240: input portion, 250: sensor portion, 290: communication portion, 301: shift register, 302: selection circuit, 303: circuit, 312: pulse signal output circuit, 316: capacitor, 318A: switch, 318B: switch, 318C: switch, 318D: switch, 700: input/output device, 700C: input/output device, 700D: input/output device, 700E: input/output device, 700F: input/output device, 700G: input/output device, 700H: input/output device, 700T: input device, 700TC: input device, 701: insulating film, 701C: insulating film, 702: pixel, 703: driver circuit, 703A: driver circuit, 703B: driver circuit, 703C: driver circuit, 704: conductive film, 706: insulating film, 708: semiconductor film, 710: base, 710P: optical film, 711: wiring, 712A: conductive film, 712B: conductive film, 716: insulating film, 718: semiconductor film, 718A: region, 718B: region, 718C: region, 719: terminal, 721A: insulating film, 721B: insulating film, 724: conductive film, 724B: conductive film, 728: insulating film, 728A: insulating film, 728B: insulating film, 730: sealant, 750: display element, 751: pixel electrode, 753: layer containing a liquid crystal material, 770: base, 770P: optical film, 771: insulating film, 775A: region, 775B: region, 1400: semiconductor device, 1401: CPU core, 1402: power controller, 1403: power switch, 1404: cache, 1405: bus interface, 1406: debug interface, 1407: control unit, 1408: PC, 1409: pipeline register, 1410: pipeline register, 1411: ALU, 1412: register file, 1421: power management unit, 1422: peripheral circuit, 1423: data bus, 1500: semiconductor device, 1501: memory circuit, 1502: memory circuit, 1503: memory circuit, 1504: circuit, 1509: transistor, 1510: transistor, 1512: transistor, 1513: transistor, 1515: transistor, 1517: transistor, 1518: transistor, 1519: capacitor, 1520: capacitor, 1540: wiring, 1541: wiring, 1542: wiring, 1543: wiring, 1544: wiring, 3001: wiring, 3002: wiring, 3003: wiring, 3004: wiring, 3005: wiring, 3200: transistor, 3300: transistor, 3400: capacitor, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: recording medium reading portion, 5012: support portion, 5013: earphone, 5014: antenna, 5015: shutter button, 5016: image receiving portion, 5017: charger, 7302: housing, 7304: display panel, 7305: icon, 7306: icon, 7311: operation button, 7312: operation button, 7313: connection terminal, 7321: band, 7322: clasp.

This application is based on Japanese Patent Application serial no. 2016-008612 filed with Japan Patent Office on Jan. 20, 2016, the entire contents of which are hereby incorporated by reference.

The invention claimed is:
1. An input device comprising:
a first conductive film electrically connected to a first signal line;
a second conductive film electrically connected to a second signal line; and
a driver circuit electrically connected to a sensor circuit and a wiring configured to supply a common potential,
wherein the second conductive film comprises a region that does not overlap with the first conductive film,
wherein each of the first conductive film and the second conductive film is configured to be capacitively coupled to an approaching object,
wherein the driver circuit comprises a first switch between the first signal line and the wiring, a second switch between the first signal line and the sensor circuit, and a third switch between the second signal line and the wiring,
wherein one terminal of the first switch is directly connected to the first signal line,
wherein the other terminal of the first switch is directly connected to the wiring, and
wherein one terminal of the third switch is directly connected to the wiring.
2. The input device according to claim 1,
wherein the driver circuit is configured to select the first signal line or the second signal line,
wherein the driver circuit is configured to electrically connect the first signal line to the sensor circuit in a period during which the first signal line is selected,
wherein the driver circuit is configured to electrically connect the second signal line to the sensor circuit in a period during which the second signal line is selected,
wherein the sensor circuit is configured to supply a search signal,
wherein the first signal line is configured to receive the search signal,
wherein the first signal line is configured to supply a potential or a current that is changed in accordance with the search signal and a capacitance coupled to the first conductive film, and
wherein the sensor circuit is configured to supply a sensing signal based on the potential or the current.
3. An input/output device comprising:
a display device; and
the input device according to claim 2,
wherein the input device is configured to sense an object approaching a display surface side of the display device,
wherein the display device comprises a first pixel that comprises a region overlapping with the first conductive film,
wherein the display device comprises a second pixel that comprises a region overlapping with the second conductive film,
wherein the first pixel comprises a first display element, and
wherein the second pixel comprises a second display element.

4. The input/output device according to claim 3,
wherein the driver circuit is configured to electrically connect the second signal line to the wiring in the period during which the first signal line is selected,
wherein the driver circuit is configured to electrically connect the first signal line to the wiring in the period during which the second signal line is selected,
wherein the first display element comprises a first pixel electrode and a layer comprising a liquid crystal material,
wherein the first pixel electrode is disposed such that an electric field that controls orientation of the liquid crystal material is formed between the first conductive film and the first pixel electrode,
wherein the second display element comprises a second pixel electrode and the layer comprising the liquid crystal material, and
wherein the second pixel electrode is disposed such that an electric field that controls orientation of the liquid crystal material is formed between the second conductive film and the second pixel electrode.

5. A data processing device comprising:
an arithmetic device; and
the input/output device according to claim 3,
wherein the arithmetic device is configured to receive a positional data and supply image data and control data,
wherein the arithmetic device is configured to determine a moving speed of a pointer in accordance with the positional data, and
wherein the arithmetic device is configured to determine contrast or brightness of the image data in accordance with the moving speed of the pointer.

6. The data processing device according to claim 5, further comprising an input portion,
wherein the input portion comprises at least one of a keyboard, a hardware button, a pointing device, a touch sensor, an illuminance sensor, an imaging device, an audio input device, a viewpoint input device, and a posture detection device.

7. The input device according to claim 1,
wherein the second conductive film is disposed such that an electric field that is shielded by the approaching object is formed between the first conductive film and the second conductive film,
wherein the driver circuit is configured to select the first signal line and the second signal line,
wherein the driver circuit is configured to electrically connect the first signal line and the second signal line to the sensor circuit in a period during which the first signal line and the second signal line are selected,
wherein the sensor circuit is configured to supply a search signal,
wherein the first signal line is configured to receive the search signal,
wherein the second signal line is configured to supply a potential or a current that is changed in accordance with the search signal and the electric field formed between the first conductive film and the second conductive film, and
wherein the sensor circuit is configured to supply a sensing signal based on the potential or the current.

8. An input/output device comprising:
a display device; and
the input device according to claim 7,
wherein the input device is configured to sense an object approaching a display surface side of the display device,
wherein the display device comprises a first pixel that comprises a region overlapping with the first conductive film,
wherein the display device comprises a second pixel that comprises a region overlapping with the second conductive film,
wherein the first pixel comprises a first display element, and
wherein the second pixel comprises a second display element.

9. The input/output device according to claim 8,
wherein the driver circuit is configured to electrically connect another signal line to the wiring in the period during which the first signal line and the second signal line are selected,
wherein the driver circuit is configured to electrically connect the first signal line and the second signal line to the wiring in a period during which the other signal line is selected,
wherein the first display element comprises a first pixel electrode and a layer comprising a liquid crystal material,
wherein the first pixel electrode is disposed such that an electric field that controls orientation of the liquid crystal material is formed between the first conductive film and the first pixel electrode,
wherein the second display element comprises a second pixel electrode and the layer comprising the liquid crystal material, and
wherein the second pixel electrode is disposed such that an electric field that controls orientation of the liquid crystal material is formed between the second conductive film and the second pixel electrode.

10. A data processing device comprising:
an arithmetic device; and
the input/output device according to claim 8,
wherein the arithmetic device is configured to receive a positional data and supply image data and control data,
wherein the arithmetic device is configured to determine a moving speed of a pointer in accordance with the positional data, and
wherein the arithmetic device is configured to determine contrast or brightness of the image data in accordance with the moving speed of the pointer.

11. The data processing device according to claim 10, further comprising an input portion,
wherein the input portion comprises at least one of a keyboard, a hardware button, a pointing device, a touch sensor, an illuminance sensor, an imaging device, an audio input device, a viewpoint input device, and a posture detection device.

12. The input device according to claim 1,
wherein the driver circuit further comprises a third switch between the second signal line and the wiring and a fourth switch between the second signal line and the sensor circuit, and
wherein one terminal of the third switch is directly connected to the second signal line.

13. The input device according to claim 1, wherein the driver circuit further comprises a shift register configured to control the first switch and the second switch.

14. The input device according to claim 1, wherein the driver circuit further comprises a shift register electrically connected to the first switch and the second switch.

15. The input device according to claim 1,
wherein the sensor circuit comprises:
- a pulse signal output circuit; and
- a current measurement unit between the driver circuit and the pulse signal output circuit.

16. The input device according to claim 15, wherein the current measurement unit comprises a resistor and a voltage measurement unit.

17. The input device according to claim 15, wherein the current measurement unit comprises an operational amplifier and a capacitor.

* * * * *